(12) United States Patent
Averbeck et al.

(10) Patent No.: US 9,010,361 B2
(45) Date of Patent: Apr. 21, 2015

(54) CONTROL VALVE ASSEMBLY

(75) Inventors: David J. Averbeck, Dousman, WI (US);
George Shoemaker Ellis, Slinger, WI (US)

(73) Assignee: Pentair Residential Filtration, LLC, Glendale, WI (US)

( * ) Notice: Subject to any disclaimer, the term of this patent is extended or adjusted under 35 U.S.C. 154(b) by 307 days.

(21) Appl. No.: 13/283,189

(22) Filed: Oct. 27, 2011

(65) Prior Publication Data
US 2013/0105326 A1    May 2, 2013

(51) Int. Cl.
F16K 31/04 (2006.01)
C02F 1/46 (2006.01)
C02F 1/469 (2006.01)
C02F 1/00 (2006.01)

(52) U.S. Cl.
CPC ............ *C02F 1/469* (2013.01); *C02F 1/008* (2013.01); *C02F 1/4691* (2013.01); *C02F 1/4693* (2013.01); *C02F 1/4695* (2013.01); *C02F 2201/005* (2013.01); *C02F 2201/46145* (2013.01); *C02F 2209/02* (2013.01); *C02F 2209/03* (2013.01); *C02F 2209/05* (2013.01); *C02F 2209/40* (2013.01); *C02F 2301/043* (2013.01)

(58) Field of Classification Search
USPC .......... 137/487.5, 625, 625.48, 597; 210/424, 210/434
See application file for complete search history.

(56) References Cited

U.S. PATENT DOCUMENTS

| | | |
|---|---|---|
| 1,022,523 A | 4/1912 | Whitney |
| 1,117,185 A | 11/1914 | Griffin |
| 1,131,859 A | 3/1915 | Parks |
| 1,769,192 A | 7/1930 | Smith |
| 2,788,319 A | 4/1957 | Pearson |
| 2,891,900 A | 6/1959 | Kollsman |
| 2,923,674 A | 2/1960 | Kressman |
| 2,981,671 A | 4/1961 | Griffiths |
| 3,149,062 A | 9/1964 | Gottschal et al. |
| 3,216,920 A | 11/1965 | Nellen |
| 3,223,606 A | 12/1965 | Chen |
| 3,251,763 A | 5/1966 | Carey |
| 3,287,251 A | 11/1966 | Home et al. |
| 3,341,441 A | 9/1967 | Giuffrida et al. |
| 3,398,091 A | 8/1968 | Greatorex |
| 3,411,630 A | 11/1968 | Alwall et al. |
| 3,544,436 A | 12/1970 | Francis et al. |
| 3,585,122 A | 6/1971 | King |
| 3,630,378 A | 12/1971 | Bauman |
| 3,669,267 A | 6/1972 | Hutton |
| 3,755,134 A | 8/1973 | Francis et al. |
| 3,838,774 A | 10/1974 | Dolan et al. |
| 3,872,004 A * | 3/1975 | Grout et al. ............. 210/127 |
| 3,874,412 A * | 4/1975 | Fleckenstein et al. ... 137/624.13 |

(Continued)

FOREIGN PATENT DOCUMENTS

| | | |
|---|---|---|
| EP | 1343923 | 2/2005 |
| EP | 2322486 | 5/2011 |

(Continued)

*Primary Examiner* — John Rivell
*Assistant Examiner* — Minh Le
(74) *Attorney, Agent, or Firm* — Quarles & Brady LLP

(57) ABSTRACT

Embodiments of the invention provide a control valve assembly and method of fault detection that includes adjusting a valve between an operating position and a fault position in response to various fault conditions. The control valve assembly is adjustable to accommodate fault conditions encountered in a variety of electrochemical deionization systems.

29 Claims, 29 Drawing Sheets

(56) References Cited

U.S. PATENT DOCUMENTS

| | | | |
|---|---|---|---|
| 3,878,086 A | 4/1975 | Haswell et al. | |
| 3,933,617 A | 1/1976 | Yamamoto et al. | |
| 3,985,636 A | 10/1976 | Schneider | |
| 4,102,752 A | 7/1978 | Rugh, II | |
| 4,104,165 A * | 8/1978 | Braswell | 210/191 |
| 4,115,274 A | 9/1978 | Boddeker et al. | |
| 4,187,086 A | 2/1980 | Walmet et al. | |
| 4,228,014 A | 10/1980 | Timm et al. | |
| 4,233,371 A | 11/1980 | Dorrestijn | |
| 4,255,012 A | 3/1981 | Parent et al. | |
| 4,274,939 A | 6/1981 | Bjaareklint | |
| 4,290,451 A * | 9/1981 | Fleckenstein et al. | 137/624.15 |
| 4,319,978 A | 3/1982 | Millman | |
| 4,334,992 A | 6/1982 | von Bonin et al. | |
| 4,345,009 A | 8/1982 | Fahle et al. | |
| 4,426,294 A * | 1/1984 | Seal | 210/662 |
| 4,427,549 A | 1/1984 | Brown et al. | |
| 4,465,573 A | 8/1984 | O'Hare | |
| 4,519,913 A | 5/1985 | Baldwin et al. | |
| 4,539,091 A | 9/1985 | Kaneda et al. | |
| 4,569,747 A | 2/1986 | Kedem et al. | |
| 4,622,123 A | 11/1986 | Nejame, Jr. | |
| 4,622,133 A | 11/1986 | Furuno | |
| 4,632,745 A | 12/1986 | Giuffrida et al. | |
| 4,655,909 A | 4/1987 | Furuno | |
| 4,666,603 A | 5/1987 | Madsen et al. | |
| 4,698,154 A | 10/1987 | Mohn et al. | |
| 4,715,939 A | 12/1987 | Ball et al. | |
| 4,728,585 A | 3/1988 | Briggs | |
| 4,747,929 A | 5/1988 | Siu et al. | |
| 4,752,373 A | 6/1988 | Korngold | |
| 4,755,305 A | 7/1988 | Fremont et al. | |
| 4,804,451 A | 2/1989 | Palmer | |
| 4,808,287 A | 2/1989 | Hark | |
| 4,849,073 A | 7/1989 | Dotson et al. | |
| 4,871,431 A | 10/1989 | Parsi | |
| 4,925,541 A | 5/1990 | Giuffrida et al. | |
| 4,931,160 A | 6/1990 | Giuffrida et al. | |
| 5,006,216 A | 4/1991 | Dietrich et al. | |
| 5,026,465 A | 6/1991 | Katz et al. | |
| 5,066,375 A | 11/1991 | Parsi et al. | |
| 5,073,255 A | 12/1991 | Chili et al. | |
| 5,089,140 A | 2/1992 | Brane et al. | |
| 5,094,732 A | 3/1992 | Oldani et al. | |
| 5,120,416 A | 6/1992 | Parsi et al. | |
| 5,132,094 A | 7/1992 | Godec et al. | |
| 5,154,809 A | 10/1992 | Oren et al. | |
| 5,164,080 A | 11/1992 | Furuno | |
| 5,185,048 A | 2/1993 | Guerif | |
| 5,192,432 A | 3/1993 | Andelman | |
| 5,196,115 A | 3/1993 | Andelman | |
| 5,200,046 A | 4/1993 | Chlanda et al. | |
| 5,203,976 A | 4/1993 | Parsi et al. | |
| 5,292,422 A | 3/1994 | Liang et al. | |
| 5,300,230 A * | 4/1994 | Brane et al. | 210/662 |
| 5,308,466 A | 5/1994 | Ganzi et al. | |
| 5,316,637 A | 5/1994 | Ganzi et al. | |
| 5,360,540 A | 11/1994 | Andelman | |
| 5,425,858 A | 6/1995 | Farmer | |
| 5,431,788 A | 7/1995 | Jones | |
| 5,443,991 A | 8/1995 | Godec et al. | |
| 5,460,723 A | 10/1995 | Bourbigot et al. | |
| 5,503,735 A | 4/1996 | Vinas et al. | |
| 5,527,450 A | 6/1996 | Burrows | |
| 5,538,611 A | 7/1996 | Otowa | |
| 5,538,746 A | 7/1996 | Levy | |
| 5,558,753 A | 9/1996 | Gallagher et al. | |
| 5,565,072 A | 10/1996 | Faita et al. | |
| 5,620,597 A | 4/1997 | Andelman | |
| 5,637,204 A | 6/1997 | Botte | |
| 5,681,438 A | 10/1997 | Proulx | |
| 5,716,503 A | 2/1998 | Dean et al. | |
| 5,718,828 A | 2/1998 | Jangbarwala et al. | |
| 5,736,023 A | 4/1998 | Gallagher et al. | |
| 5,751,598 A * | 5/1998 | Zabinski et al. | 700/266 |
| 5,756,874 A | 5/1998 | Steward | |
| 5,762,774 A | 6/1998 | Tessier | |
| 5,776,340 A | 7/1998 | Jangbarwala et al. | |
| 5,779,911 A | 7/1998 | Haug et al. | |
| 5,788,826 A | 8/1998 | Nyberg | |
| 5,837,110 A | 11/1998 | Dean | |
| 5,837,124 A | 11/1998 | Su et al. | |
| 5,879,559 A * | 3/1999 | Schreiner et al. | 210/662 |
| 5,891,328 A | 4/1999 | Goldstein | |
| 5,919,373 A * | 7/1999 | Naaktgeboren | 210/750 |
| 5,925,230 A | 7/1999 | Fajt et al. | |
| 5,925,240 A | 7/1999 | Wilkins et al. | |
| 5,943,204 A | 8/1999 | Jones et al. | |
| 5,954,937 A | 9/1999 | Farmer | |
| 5,961,805 A | 10/1999 | Terada et al. | |
| 5,980,718 A | 11/1999 | Van Konynenburg et al. | |
| 6,017,433 A | 1/2000 | Mani | |
| 6,040,072 A | 3/2000 | Murphy et al. | |
| 6,056,878 A | 5/2000 | Tessier et al. | |
| 6,096,179 A | 8/2000 | Fajt et al. | |
| 6,117,297 A | 9/2000 | Goldstein | |
| 6,123,823 A | 9/2000 | Mani | |
| 6,126,805 A | 10/2000 | Batchelder et al. | |
| RE36,972 E | 11/2000 | Baker et al. | |
| 6,149,788 A | 11/2000 | Tessier et al. | |
| 6,156,180 A | 12/2000 | Tessier et al. | |
| 6,187,162 B1 | 2/2001 | Mir | |
| 6,190,553 B1 | 2/2001 | Lee | |
| 6,193,869 B1 | 2/2001 | Towe et al. | |
| 6,214,214 B1 | 4/2001 | Hansen et al. | |
| 6,235,166 B1 | 5/2001 | Towe et al. | |
| 6,241,893 B1 | 6/2001 | Levy | |
| 6,258,265 B1 | 7/2001 | Jones | |
| 6,274,018 B1 | 8/2001 | Hidaka | |
| 6,296,751 B1 | 10/2001 | Mir | |
| 6,303,037 B1 | 10/2001 | Tamura et al. | |
| 6,309,532 B1 | 10/2001 | Tran et al. | |
| 6,344,122 B1 | 2/2002 | Deguchi et al. | |
| 6,346,187 B1 | 2/2002 | Tran et al. | |
| 6,365,023 B1 | 4/2002 | De Los Reyes et al. | |
| 6,379,518 B1 | 4/2002 | Osawa et al. | |
| 6,391,178 B1 | 5/2002 | Garcia et al. | |
| 6,391,188 B1 | 5/2002 | Goosey | |
| 6,402,920 B1 | 6/2002 | Sato et al. | |
| 6,402,944 B1 * | 6/2002 | Vaughan | 210/190 |
| 6,413,409 B1 | 7/2002 | Otowa et al. | |
| 6,436,264 B1 | 8/2002 | Tamura | |
| 6,444,127 B1 | 9/2002 | Vaughan et al. | |
| 6,461,512 B1 | 10/2002 | Hirayama et al. | |
| 6,461,756 B1 | 10/2002 | Blanchet et al. | |
| 6,462,935 B1 | 10/2002 | Shiue et al. | |
| 6,482,304 B1 | 11/2002 | Emery et al. | |
| 6,490,777 B1 | 12/2002 | Proulx et al. | |
| 6,508,937 B1 | 1/2003 | Kawashima et al. | |
| 6,565,725 B2 | 5/2003 | Sugaya et al. | |
| 6,569,298 B2 | 5/2003 | Merida-Donis | |
| 6,580,598 B2 | 6/2003 | Shiue et al. | |
| 6,607,647 B2 | 8/2003 | Wilkins et al. | |
| 6,607,668 B2 | 8/2003 | Rela | |
| 6,625,863 B2 | 9/2003 | Proulx et al. | |
| 6,628,505 B1 | 9/2003 | Andelman | |
| 6,644,349 B2 * | 11/2003 | Scanlan et al. | 137/625.48 |
| 6,645,383 B1 | 11/2003 | Lee et al. | |
| 6,649,037 B2 | 11/2003 | Liang et al. | |
| 6,657,546 B2 | 12/2003 | Navarro et al. | |
| 6,661,643 B2 | 12/2003 | Shiue et al. | |
| 6,709,560 B2 | 3/2004 | Andelman et al. | |
| 6,726,822 B2 | 4/2004 | Garcia et al. | |
| 6,745,903 B2 | 6/2004 | Grandics | |
| 6,758,954 B2 | 7/2004 | Liang et al. | |
| 6,761,809 B2 | 7/2004 | Tran et al. | |
| 6,761,823 B2 | 7/2004 | Maddux et al. | |
| 6,764,787 B2 | 7/2004 | Grasso et al. | |
| 6,783,666 B2 | 8/2004 | Takeda et al. | |
| 6,793,801 B2 | 9/2004 | Holland | |
| 6,795,298 B2 | 9/2004 | Shiue et al. | |
| 6,830,595 B2 | 12/2004 | Reynolds, III | |
| 6,835,486 B2 | 12/2004 | Prediger et al. | |
| 6,866,757 B2 | 3/2005 | Gilmore | |

(56) References Cited

U.S. PATENT DOCUMENTS

| | | | |
|---|---|---|---|
| 6,896,814 B2 | 5/2005 | Chidambaran et al. |
| 6,908,546 B2 | 6/2005 | Smith |
| 6,926,878 B2 | 8/2005 | Santina |
| 6,929,748 B2 | 8/2005 | Avijit et al. |
| 6,929,765 B2 | 8/2005 | Cotton et al. |
| 6,998,044 B2 | 2/2006 | Jangbarwala |
| 7,018,522 B2 | 3/2006 | Holland |
| 7,026,364 B2 | 4/2006 | Inoue et al. |
| 7,033,472 B2 | 4/2006 | Yamanaka et al. |
| 7,037,618 B2 | 5/2006 | Andrews et al. |
| 7,083,733 B2 | 8/2006 | Freydina et al. |
| 7,094,325 B2 | 8/2006 | Mack et al. |
| 7,097,752 B2 | 8/2006 | Li et al. |
| 7,101,468 B1 | 9/2006 | Botte |
| 7,138,042 B2 | 11/2006 | Tran et al. |
| 7,138,045 B2 | 11/2006 | Sferrazza |
| 7,144,735 B2 | 12/2006 | Saini |
| 7,147,785 B2 | 12/2006 | Arba et al. |
| 7,201,832 B2 | 4/2007 | Yamanaka et al. |
| 7,206,189 B2 | 4/2007 | Reynolds, III |
| 7,214,301 B2 | 5/2007 | Thorstensen |
| 7,247,225 B2 | 7/2007 | Miwa et al. |
| 7,252,752 B2 | 8/2007 | Holland |
| 7,261,802 B2 | 8/2007 | Xu et al. |
| 7,264,737 B2 | 9/2007 | Godec et al. |
| 7,300,569 B2 * | 11/2007 | Petty ........................... 210/138 |
| 7,306,709 B2 | 12/2007 | Grebenyuk et al. |
| 7,326,325 B2 | 2/2008 | Liang et al. |
| 7,329,358 B2 | 2/2008 | Wilkins et al. |
| 7,338,595 B2 | 3/2008 | VanNewenhizen et al. |
| 7,338,600 B2 | 3/2008 | Chidambaran et al. |
| 7,393,445 B2 | 7/2008 | Inoue et al. |
| 7,407,585 B2 | 8/2008 | Gaignet |
| 7,425,583 B2 | 9/2008 | Inoue et al. |
| 7,449,093 B2 | 11/2008 | Dudziak et al. |
| 7,470,366 B2 | 12/2008 | Queen et al. |
| 7,481,929 B2 | 1/2009 | Wilkins et al. |
| 7,485,213 B2 | 2/2009 | Miwa et al. |
| 7,501,064 B2 | 3/2009 | Schmidt et al. |
| 7,563,351 B2 | 7/2009 | Wilkins et al. |
| 7,572,359 B2 | 8/2009 | Liang et al. |
| 7,578,416 B2 | 8/2009 | Underwood |
| 7,582,198 B2 | 9/2009 | Wilkins et al. |
| 7,582,216 B2 | 9/2009 | Arnott et al. |
| 7,604,725 B2 | 10/2009 | Ganzi et al. |
| 7,632,406 B2 | 12/2009 | Wilson et al. |
| 7,658,828 B2 | 2/2010 | Freydina et al. |
| 7,662,266 B2 | 2/2010 | Heydecke et al. |
| 7,666,288 B2 | 2/2010 | Sato |
| 7,686,950 B2 | 3/2010 | Gaignet |
| 7,704,361 B2 | 4/2010 | Garde et al. |
| 7,761,981 B2 | 7/2010 | Rosenthal et al. |
| 7,763,157 B2 | 7/2010 | Bejtlich, III et al. |
| 7,766,981 B2 | 8/2010 | Bourcier et al. |
| 7,767,097 B1 | 8/2010 | Campbell |
| 7,820,024 B2 | 10/2010 | Freydina |
| 7,846,340 B2 | 12/2010 | Freydina et al. |
| 7,862,700 B2 | 1/2011 | Wilkins et al. |
| 8,072,343 B2 * | 12/2011 | Flanders ........................ 340/679 |
| 8,138,706 B2 * | 3/2012 | Ochsenbein et al. ......... 318/563 |
| 8,328,162 B2 * | 12/2012 | Prescott et al. ............... 251/289 |
| 2002/0144954 A1 | 10/2002 | Arba et al. |
| 2002/0182472 A1 | 12/2002 | Molter et al. |
| 2003/0038089 A1 | 2/2003 | Levy |
| 2003/0041908 A1 | 3/2003 | Scanlan et al. |
| 2003/0079993 A1 | 5/2003 | Miwa |
| 2003/0089609 A1 | 5/2003 | Liang et al. |
| 2003/0098266 A1 | 5/2003 | Shiue et al. |
| 2004/0013918 A1 | 1/2004 | Merida-Donis |
| 2004/0060819 A1 | 4/2004 | Pizzamiglio et al. |
| 2004/0060823 A1 | 4/2004 | Carson et al. |
| 2004/0104166 A1 | 6/2004 | Tessier et al. |
| 2004/0118780 A1 | 6/2004 | Willman et al. |
| 2004/0173535 A1 | 9/2004 | Li |
| 2005/0103622 A1 | 5/2005 | Jha et al. |
| 2005/0103631 A1 | 5/2005 | Freydina et al. |
| 2005/0103717 A1 | 5/2005 | Jha et al. |
| 2005/0103722 A1 | 5/2005 | Freydina et al. |
| 2005/0109703 A1 | 5/2005 | VanNewenhizen |
| 2005/0263457 A1 | 12/2005 | Wilkins et al. |
| 2006/0096899 A1 | 5/2006 | Lillback |
| 2006/0144789 A1 | 7/2006 | Cath et al. |
| 2006/0157422 A1 | 7/2006 | Freydina et al. |
| 2006/0231403 A1 | 10/2006 | Riviello |
| 2006/0231406 A1 | 10/2006 | Freydina et al. |
| 2006/0243604 A1 | 11/2006 | Nakagawa et al. |
| 2006/0254919 A1 | 11/2006 | Jangbarwala |
| 2007/0034573 A1 | 2/2007 | Jangbarwala |
| 2007/0051684 A1 | 3/2007 | Grebenyuk et al. |
| 2007/0108056 A1 | 5/2007 | Nyberg et al. |
| 2007/0209942 A1 | 9/2007 | Shyu |
| 2007/0272550 A1 | 11/2007 | Shiue et al. |
| 2007/0278099 A1 | 12/2007 | Barber |
| 2008/0023333 A1 | 1/2008 | Johnson |
| 2008/0023400 A1 | 1/2008 | Kloos et al. |
| 2008/0029395 A1 | 2/2008 | Fan |
| 2008/0035548 A1 | 2/2008 | Fan |
| 2008/0057398 A1 | 3/2008 | Wei et al. |
| 2008/0073215 A1 | 3/2008 | Barber et al. |
| 2008/0073288 A1 | 3/2008 | Fan et al. |
| 2008/0078672 A1 | 4/2008 | Atlas |
| 2008/0093225 A1 | 4/2008 | Cline et al. |
| 2008/0093282 A1 | 4/2008 | Ukon |
| 2008/0105548 A1 | 5/2008 | Liang et al. |
| 2008/0116136 A1 | 5/2008 | Wilkins et al. |
| 2008/0128349 A1 | 6/2008 | Chen |
| 2008/0144256 A1 | 6/2008 | Cai et al. |
| 2008/0185294 A1 | 8/2008 | Cai et al. |
| 2008/0185346 A1 | 8/2008 | Xiong et al. |
| 2008/0198531 A1 | 8/2008 | Shiue et al. |
| 2008/0230376 A1 | 9/2008 | Brauns |
| 2008/0290546 A1 | 11/2008 | Andelman et al. |
| 2009/0035631 A1 | 2/2009 | Zagaja et al. |
| 2009/0045048 A1 | 2/2009 | Bourcier et al. |
| 2009/0045074 A1 | 2/2009 | Hoover et al. |
| 2009/0127119 A1 | 5/2009 | Witte et al. |
| 2009/0139932 A1 | 6/2009 | Haas et al. |
| 2009/0152117 A1 | 6/2009 | Akahori et al. |
| 2009/0194478 A1 | 8/2009 | Saveliev et al. |
| 2009/0218227 A1 | 9/2009 | Noh et al. |
| 2009/0223825 A1 | 9/2009 | Lee et al. |
| 2009/0255815 A1 | 10/2009 | Shiue et al. |
| 2010/0006438 A1 | 1/2010 | Antich et al. |
| 2010/0007301 A1 * | 1/2010 | Ochsenbein et al. ......... 318/563 |
| 2010/0012503 A1 | 1/2010 | Hinatsu et al. |
| 2010/0025247 A1 | 2/2010 | Daily, III |
| 2010/0059378 A1 | 3/2010 | Elson et al. |
| 2010/0059382 A1 | 3/2010 | Sun et al. |
| 2010/0065439 A1 | 3/2010 | Sullivan |
| 2010/0065511 A1 | 3/2010 | Knapp et al. |
| 2010/0078327 A1 | 4/2010 | Noh et al. |
| 2010/0096269 A1 | 4/2010 | Kaku et al. |
| 2010/0108521 A1 | 5/2010 | Riviello |
| 2010/0126937 A1 | 5/2010 | Felch |
| 2010/0140095 A1 | 6/2010 | Telepciak et al. |
| 2010/0200522 A1 * | 8/2010 | Tischendorf et al. ......... 210/798 |
| 2010/0213051 A1 | 8/2010 | Ishikawa et al. |
| 2010/0230277 A1 | 9/2010 | Sullivan et al. |
| 2010/0296999 A1 | 11/2010 | Campbell |
| 2010/0297000 A1 | 11/2010 | Campbell |
| 2010/0326833 A1 | 12/2010 | Messalem et al. |
| 2011/0000789 A1 | 1/2011 | Grabowski |
| 2011/0005933 A1 | 1/2011 | Kawaguchi et al. |
| 2011/0005934 A1 | 1/2011 | Barber et al. |
| 2011/0017666 A1 | 1/2011 | Cath et al. |
| 2011/0042219 A1 | 2/2011 | Wei et al. |
| 2011/0073191 A1 | 3/2011 | Gray, Jr. |
| 2011/0146822 A1 * | 6/2011 | Hellenbrand et al. ........ 137/625 |

FOREIGN PATENT DOCUMENTS

| | | |
|---|---|---|
| GB | 2383275 | 6/2003 |

(56) References Cited

FOREIGN PATENT DOCUMENTS

| JP | 53088671 | 8/1978 |
| JP | 2006088004 | 4/2006 |
| KR | 20030038621 | 5/2003 |
| KR | 20040103625 | 12/2004 |
| WO | WO2007/044609 | 4/2007 |

* cited by examiner

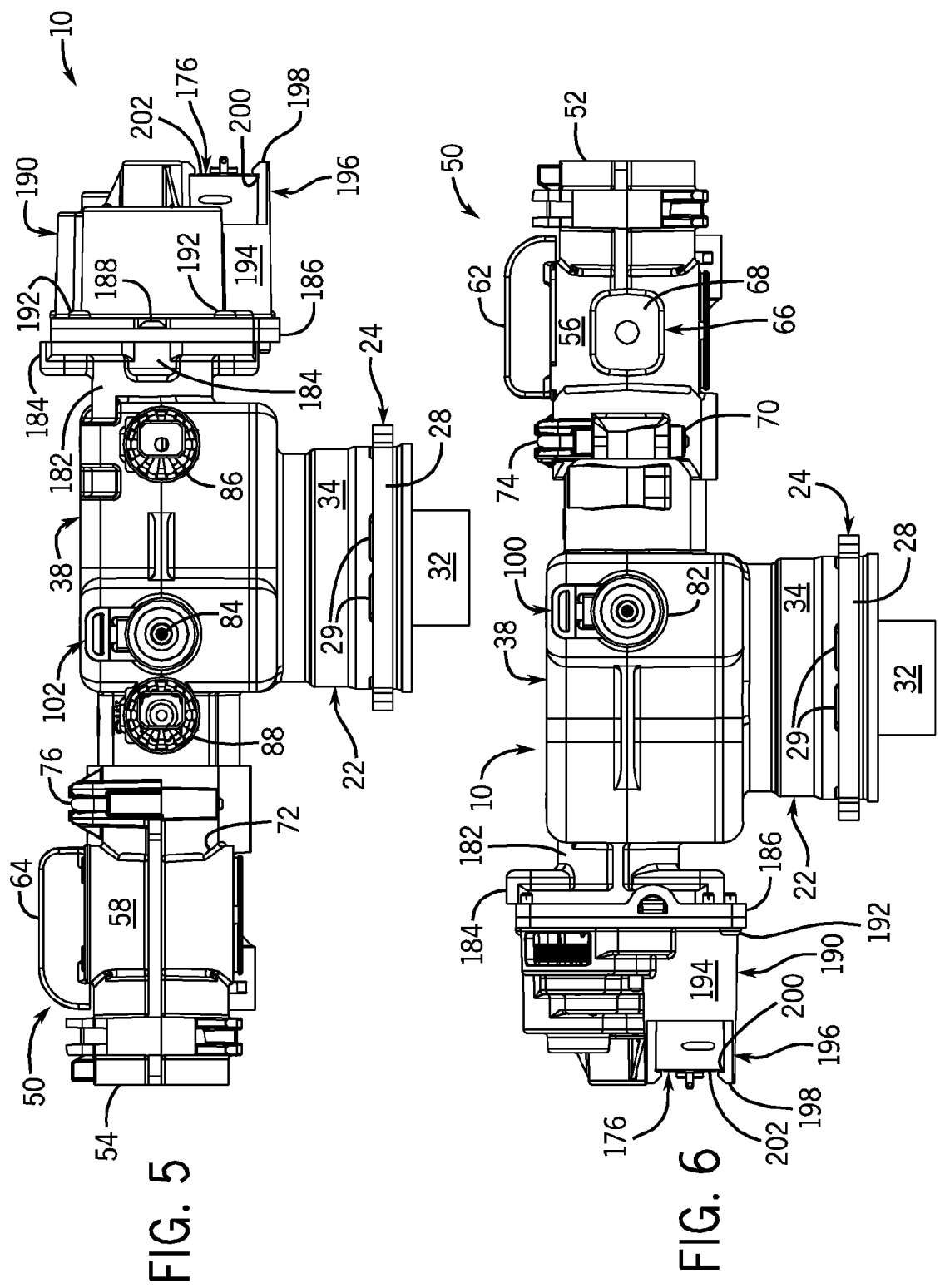

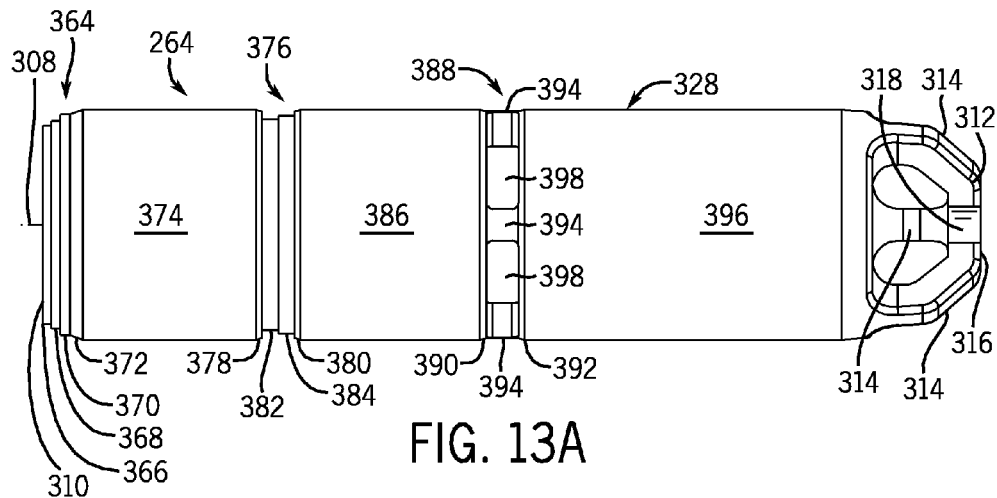
FIG. 13A
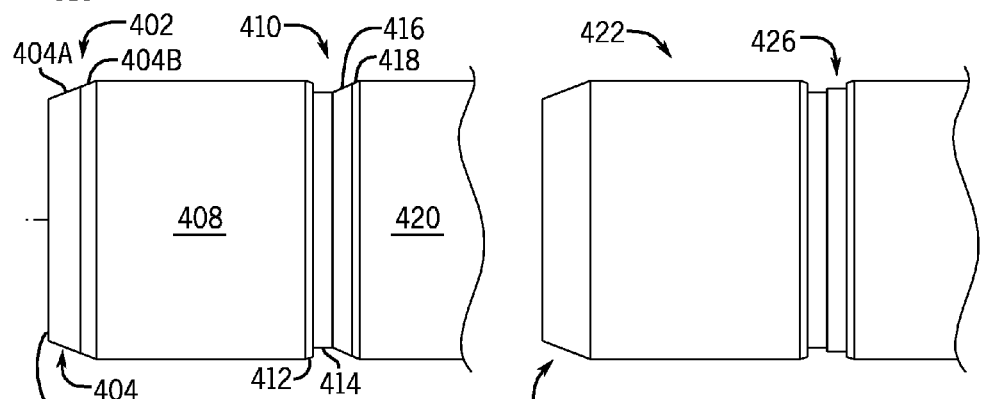
FIG. 13B
FIG. 13C
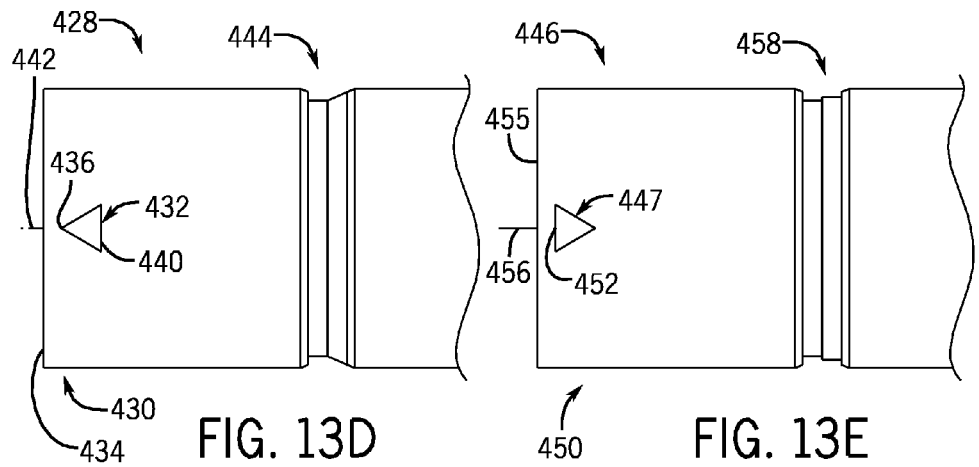
FIG. 13D
FIG. 13E

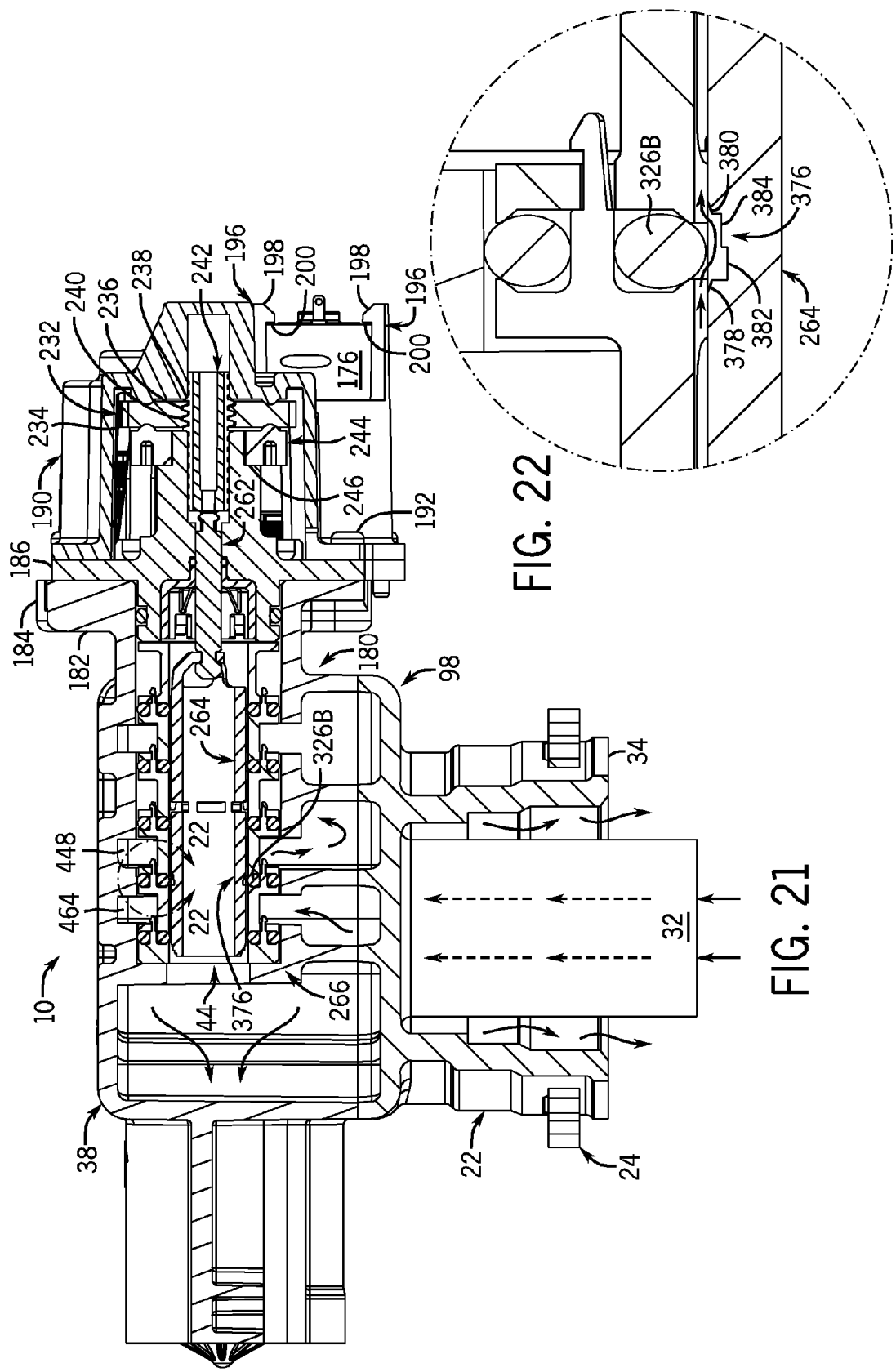

CONTROL VALVE ASSEMBLY

BACKGROUND OF THE INVENTION

Valves are used in a wide variety of applications to generally control and/or direct the flow of fluids. In one example application, valves are used to control the flow of water through water treatment systems installed in residential and/or commercial settings. These water treatment systems include, for instance, water treatment devices such as water filters and conditioners that extract and/or replace undesirable constituents in the supplied water.

One type of water treatment device, generally referred to as a capacitive deionization device, can be used to remove electrically-charged impurities, such as ions, from a water supply. In capacitive deionization devices, a stream of water passes through one or more flow-through capacitors that include pairs of polarized electrode plates. To remove impurities from the supply water passing between the electrode plates, a voltage potential is established between the electrode plates that causes many impurities in the supply water to be attracted to and (at least temporarily) retained on one of the electrode plates, while the comparatively purified water flows from the capacitor.

The efficiency and capacity of the electrode plates are reduced during use as impurities extracted from the supply water increasingly saturate the electrode plates. To regenerate the capacity of a flow-through capacitor, the flow-through capacitor can be set to discharge the captured impurities by removing the voltage potential or by temporarily applying a voltage potential in an opposite polarity to the voltage potential established during purification. During discharge, the effluent water carrying the impurities is typically routed to a drain line.

In general, operation of most water treatment devices includes some form of a service/cleaning cycle. One or more valves can be used to adjust the water treatment device between a service state and a cleaning state. If the cycle is interrupted (e.g., a loss of line power or fluid pressure to the water treatment device), the effectiveness and efficiency of a particular cycle or of the overall device can be reduced. Sophisticated water treatment devices, such as capacitive deionization devices, are susceptible to malfunction if operated under certain conditions (e.g., without adequate fluid flow, without proper regeneration cycles, etc.). Operation of water treatment devices relies, at least in part, on adequate control of fluid to, through, and from the water treatment device, even when fault conditions are encountered.

SUMMARY OF THE INVENTION

In light of at least the above, a need exists for a control valve assembly incorporating an improved design concept that can accommodate the unreliable and fluctuating operating conditions in which water treatment systems encounter fault conditions.

A control valve assembly comprises a controller, a valve body, and a valve that is seated within the valve body and movable between an operating position and a fault position. A motor is in communication with the controller and is coupled to the valve to move the valve between the operating position and the fault position. A sensor is in communication with the controller, the sensor provides a fault signal to the controller indicating a fault condition of the control valve assembly. The controller operates the motor to drive the valve to the fault position in response to the fault signal.

BRIEF DESCRIPTION OF THE DRAWINGS

FIG. 5 is a left side plan view of the example control valve assembly.

FIG. 6 is a right side plan view of the example control valve assembly.

FIG. 13A is a plan view of an example piston shown in FIGS. 11 and 12.

FIG. 13B-13E are partial plan views of alternative example pistons.

FIG. 21 is a section view illustrating the example control valve assembly in the drain position shown in FIG. 20.

FIG. 22 is a detail view of the portion of FIG. 21 circumscribed by arc 22-22 shown in FIG. 21.

DETAILED DESCRIPTION

Figure 1:
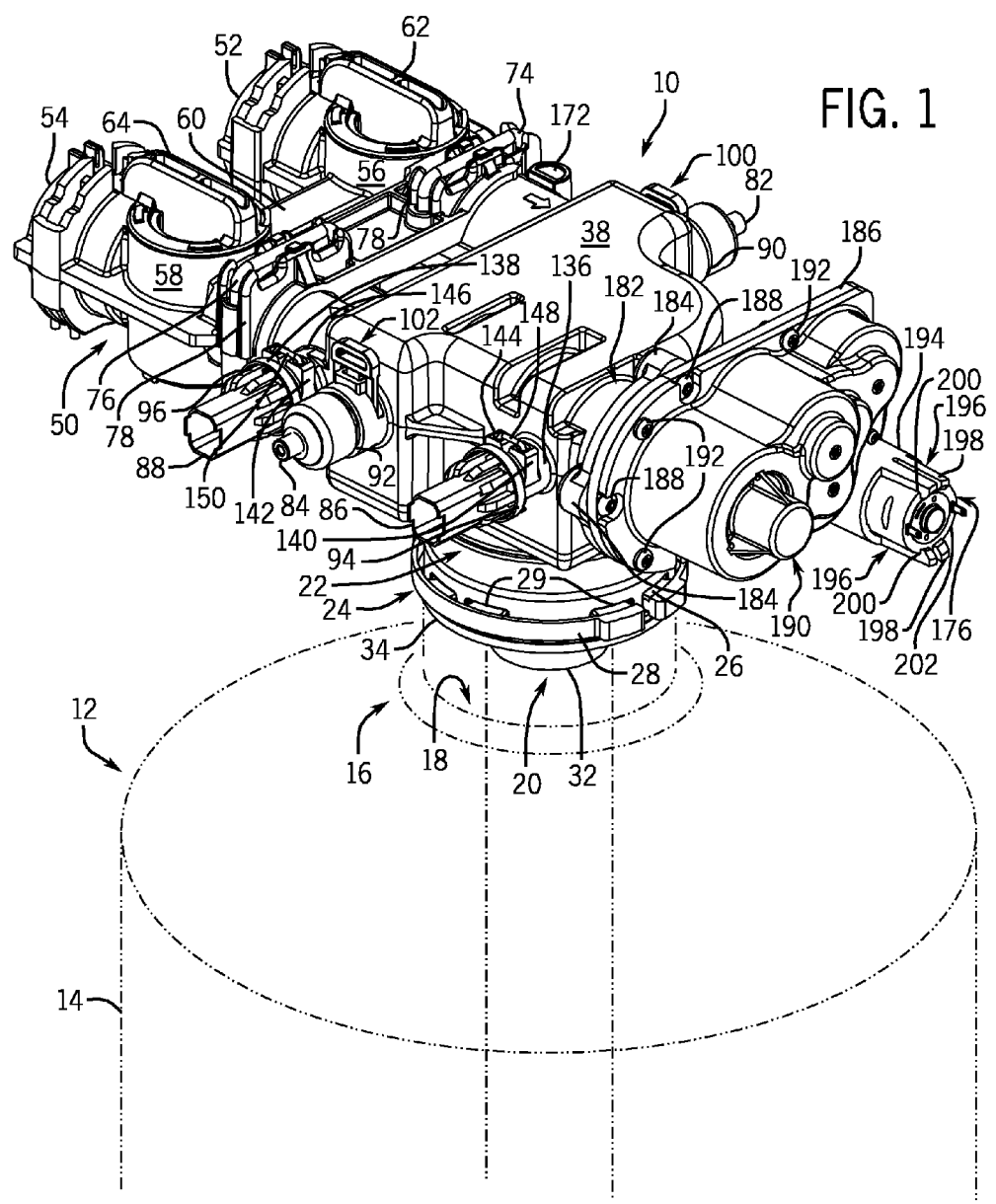
FIG. 1 is an isometric view of an example control valve assembly coupled to an example water treatment device.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

One embodiment of a control valve assembly with multi-port blending ("control valve assembly 10") is described in the context of a fluid treatment device. The fluid treatment device is shown and described in the form of a capacitive deionization device 12. However, the embodiments described herein can be incorporated into other suitable types of fluid treatment devices, such as an electrodeionization device, a continuous electrodeionization device, an electrodialysis device, a capacitive deionization device including a flow-through capacitor, a carbon filter device, a reverse osmosis device, or a water softener device (e.g., including a resin bed). In one embodiment, an electrodeionization device performs a process that uses electrically active media and electrical potential to influence ion movement within a liquid. Electrodeionization devices can include media that has a permanent or a temporary charge and is operated to cause electrochemical reactions, with or without electrically active membranes (e.g., semi-permeable ion exchange or bipolar membranes). Continuous electrodeionization devices incorporate a process typically including alternating electroactive semi-permeable anion and cation exchange membranes. Fluid flows between the membranes and a DC electrical field is supplied to attract ions to respective electrodes. Electrode compartments can be included to separate reaction product from the other flow compartments. In general, embodiments of the invention can be incorporated into a fluid treatment system that is susceptible to fluctuating demands for treated water.

FIG. 1 illustrates the control valve assembly 10 in fluid communication with the capacitive deionization device 12. The control valve assembly 10 is configured to control the flow of supply fluid and treated fluid through the control valve assembly in response to fluctuating fluid demands. The capacitive deionization device 12 includes a container 14 that houses the various water treatment components (e.g., flow-through capacitors). The container 14 tappers to an upper neck 16 that defines an outer, circular treatment inlet port 18 and an inner, circular treatment outlet port 20 that is nested radially inward of the treatment inlet port 18. Alternatively, various other fluid treatment devices can be configured in fluid communication with the control valve assembly 10, and the structure of the control valve assembly 10 can be modified to establish the application specific fluid communication.

Figure 2:
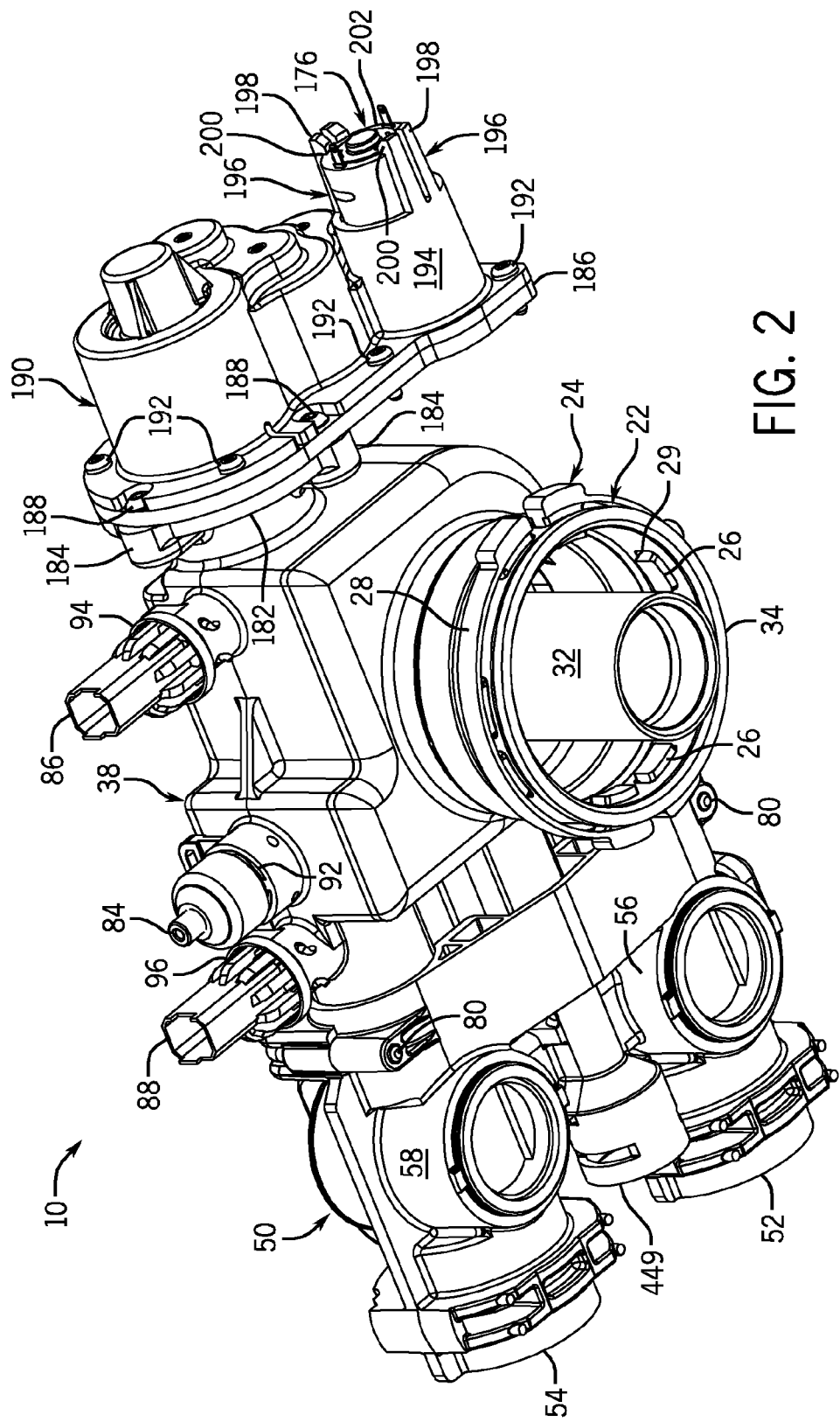
FIG. 2 is a bottom isometric view of the example control valve assembly.
Figure 3:
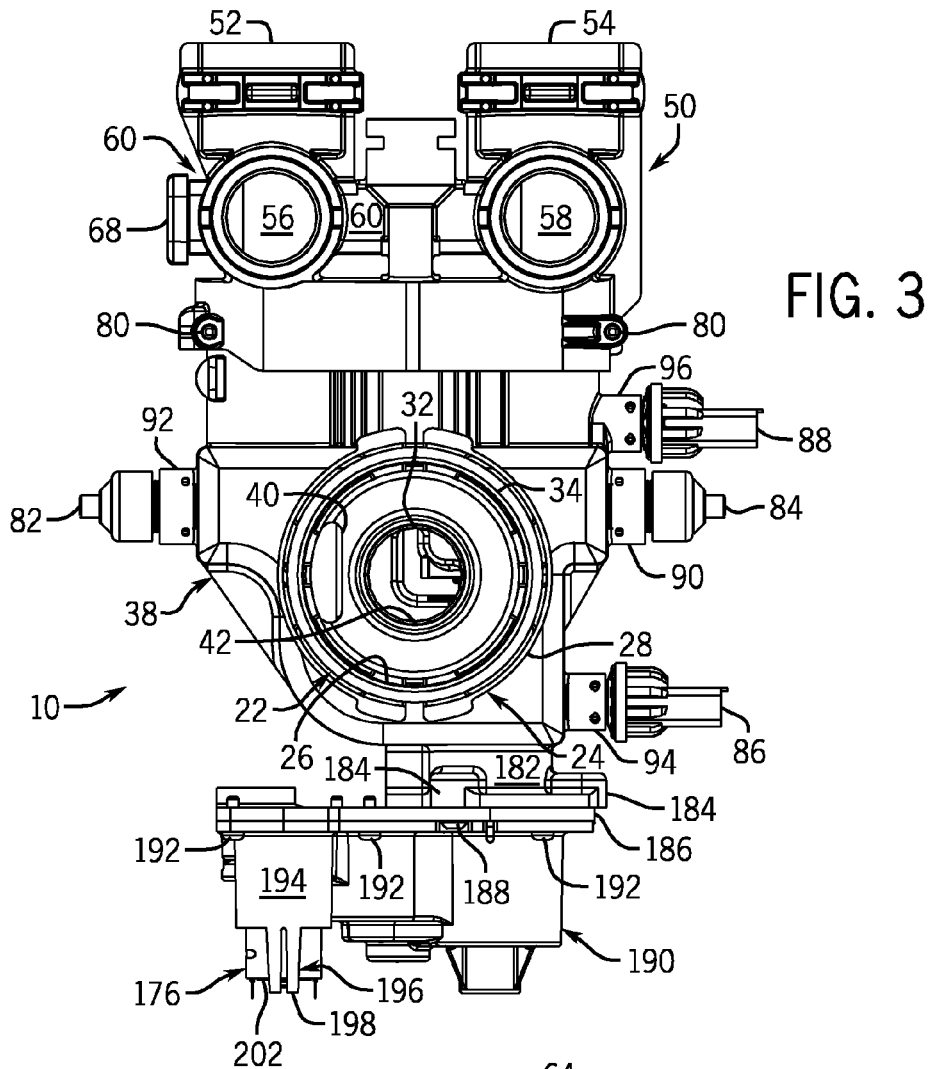
FIG. 3 is a bottom plan view of the example control valve assembly.

FIGS. 2 and 3 illustrate that the control valve assembly 10 is coupled to the upper neck 16 by a collar 22. The collar 22 is sized to receive the upper neck 16 of the container 14 and is coupled to an annular lip of the upper neck 16 by a split lock ring 24. The lock ring 24 has circumferentially spaced tabs 26 that extend radially inward from an outer band 28 of the split lock ring 24. When seated, the tabs 26 extend through aligned rectangular slots 29 formed through the collar 22 and engage the annular lip of the upper neck 16, thus inhibiting removal of the control valve assembly 10 from the capacitive deionization device 12. One or more seals can be arranged between the upper neck 16 and the collar 22 to prevent undesirable fluid leakage at the coupling.

Coupling the control valve assembly 10 to the capacitive deionization device 12 places respective ports of the control valve assembly 10 into fluid communication with the treatment inlet port 18 and the treatment outlet port 20, thus establishing passageways for fluid communication. As shown in FIGS. 2 and 3, the control valve assembly 10 includes an inner tube 32 that is coaxially aligned with an outer tube 34 defined by the collar 22. When the control valve assembly 10 is seated on the upper neck 16, the inner tube 32 is brought into fluid communication with the treatment outlet port 20 and the outer tube 34 is similarly brought into fluid communication with the treatment inlet port 18. The inner tube 32 is sealed with the treatment outlet port 20 so that a supply fluid flowing from the control valve assembly 10 into the capacitive deionization device 12 is inhibited from mixing with a treated fluid flowing out of the capacitive deionization device 12. A flow path is defined from the outer tube 34 of the control valve assembly 10, into the treatment inlet port 18, through the capacitive deionization device 12, out of the treatment outlet port 20, and into the inner tube 32 of the control valve assembly 10.

The collar 22, the outer tube 34, and the inner tube 32 extend from a valve body 38 of the control valve assembly 10. As shown in FIG. 3, the valve body 38 defines an outlet port 40 and an inlet port 42 that both provide fluid communication into a valve chamber 44 (as also shown in FIGS. 12 and 14-21.

Furthermore, the outlet port 40 also establishes fluid communication with the outer tube 34 and the corresponding treatment inlet port 18; similarly, the inlet port 42 establishes fluid communication with the inner tube 32 and corresponding treatment outlet port 20. As a result, in one mode of operation, the treatment inlet port 18 will receive a supply fluid from the control valve assembly 10. The supply fluid can flow through the balance of the capacitive deionization device 12 to be treated. A treated fluid can then flow out of the capacitive deionization device 12 through the treatment outlet port 20 back into the control valve assembly 10.

The control valve assembly 10 can be in fluid communication with a point of entry (e.g., a residential or commercial water source, such as a well, pressure tank, municipal connection, an upstream fluid treatment device, etc.) that provides the supply fluid, and a point of use (e.g., a residential or commercial water service, such as a water heater, potable water spigot, a downstream fluid treatment device, etc.) that receives the fluid (e.g., treated, untreated, partially treated, blended, etc.) that flows from the control valve assembly 10. As shown in FIGS. 4, 7, 14, 16, 18, and 20, the valve body 38 of the control valve assembly 10 defines a supply port 46 and a service port 48 that provide the fluid communication between the control valve assembly 10 and the respective point of entry and point of use. In some embodiments, the valve body 38 can be made, for example, from brass, stainless steel, plastics, or composites, and can be constructed, for instance, by casting, machining, or molding.

FIGS. 4-8 illustrate a manual bypass body 50 that is coupled to the control valve assembly 10 and connects to a supply conduit and a service conduit. The manual bypass body 50 is generally H-shaped and defines a cylindrical external supply port 52 and a cylindrical external service port 54, which are configured to couple with the supply conduit and the service conduits, respectively. The external supply port 52 defines a supply chamber 56 and the external service port 54 defines a similar service chamber 58. A bypass chamber 60 extends between the supply chamber 56 and the service chamber 58, so that fluid can be directed through the bypass chamber 60 when a supply valve 62 and a service valve 64 are oriented accordingly.

The supply valve 62 is rotatably seated within the supply chamber 56 so that the supply valve 62 can be rotated ninety-degrees between a flow-through position (shown in FIG. 7) and a divert position. When the supply valve 62 is in the flow-through position, fluid is allowed to pass though the supply chamber 56 and into the supply port 46 of the control valve assembly 10; in the divert position, fluid is inhibited by the supply valve 62 from flowing into the supply port 46 and is instead redirected into the bypass chamber 60. Similarly, the service valve 64 is rotatably seated within the service chamber 58 so that the service valve 64 can be rotated ninety-degrees between a flow-through position (shown in FIG. 7) and a divert position. When the service valve 64 is in the flow-through position, fluid is allowed to pass though the service chamber 58 from the service port 54 of the control valve assembly 10; in the divert position, fluid is inhibited by the service valve 64 from flowing from the service port 54 but fluid within the bypass chamber 60 is directed into the service chamber 58. The supply chamber 56 also defines an auxiliary port 66 (shown covered by a cap 68) that can be connected in fluid communication with an auxiliary device (e.g., a drain).

The manual bypass body 50 further includes a cylindrical supply tube 70 and a cylindrical service tube 72 that are coupled to the valve body 38 by U-clips 74, 76. The supply tube 70 is slid over the supply port 46 and the service tube 72 is slid over the service port 48, then the respective U-clips 74, 76 are inserted into openings 78 through the manual bypass body 50 to seat in a series of cylindrical openings 80 formed in the valve body 38. The engagement between the U-clips 74, 76, the manual bypass body 50, and the valve body 38 restrains the manual bypass body 50.

The manual bypass body 50 can be made, for example, from brass, stainless steel, plastics, or composites, and can be constructed, for instance, by casting, machining, or molding. In other embodiments, the manual bypass body 50 (and/or its function) can be integral with the valve body 38.

The control valve assembly 10 also includes a series of sensors that are positioned within the valve body 38 to monitor various properties of the fluid flowing into, through, and/or out of the control valve assembly 10. Other sensors can be incorporated in the overall fluid treatment system to monitor additional properties of the system, such as an ambient temperature and a fluid level or pressure within a treated water storage vessel. The sensors monitor aspects of operation and communicate parameters indicative of operation to a controller (e.g., a computer, programmable logic controller, a microcontroller, etc.). In some embodiments, the controller can control the operation of the control valve assembly 10 in response to and in view of those sensed parameters, as is described below in more detail. In one embodiment, the controller can be monitoring sensors for parameters that indicate the fluid demand is or will likely exceed the real-time flow capacity of the fluid treatment device. The controller can operate the control valve assembly 10 to move the control valve assembly 10 into a position, so that the fluid demand is fulfilled, albeit with partially treated (or blended) fluid. Many other control logics can be implemented and tailored to the specific application, including the specifications of the fluid treatment device and other devices incorporated into the overall fluid treatment system.

Figure 8:
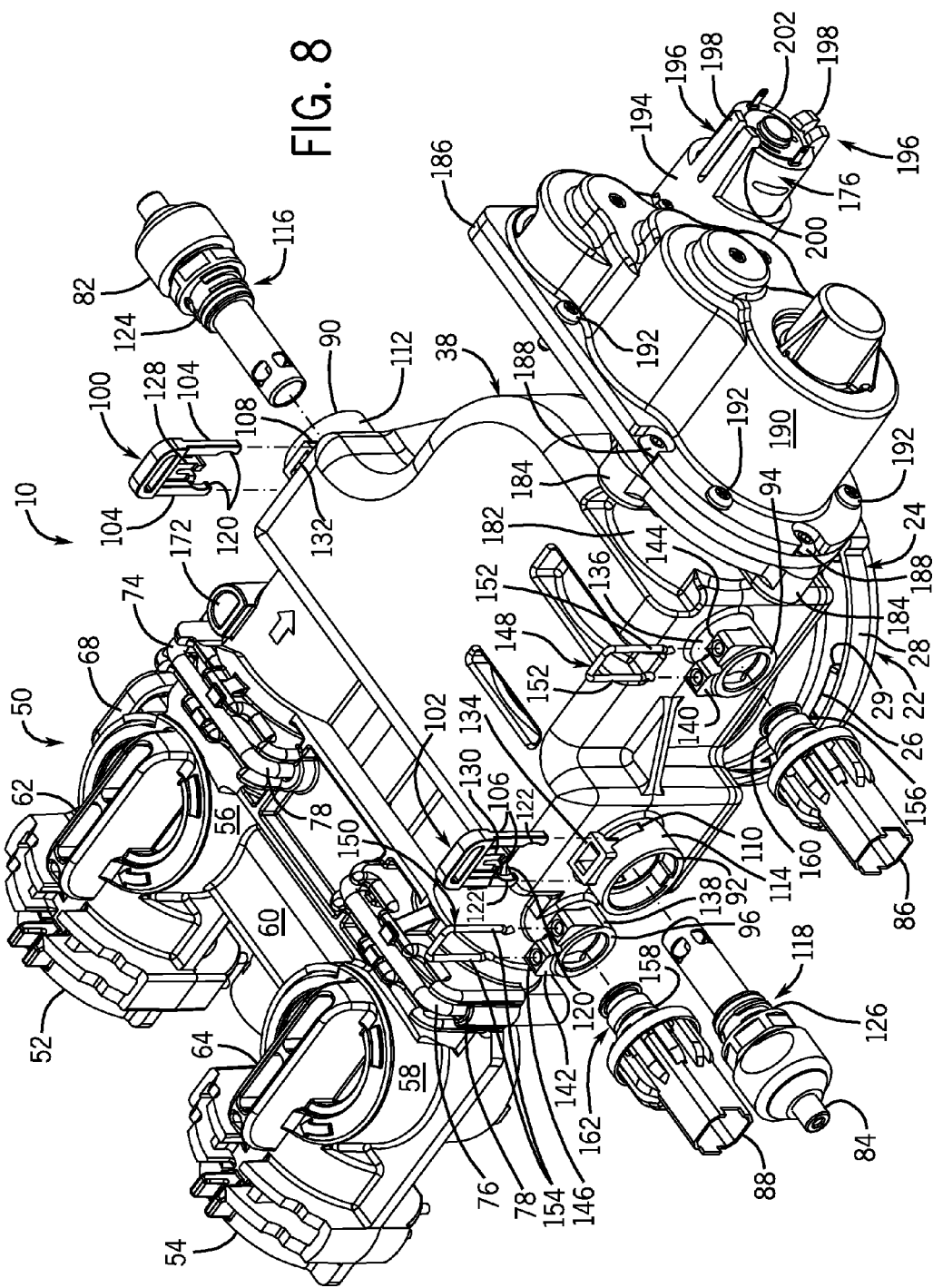
FIG. 8 is a partially exploded, isometric view of the example control valve assembly illustrating example pressure sensors and example conductivity sensors.

As shown in FIG. 8, a supply pressure sensor 86, a service pressure sensor 88, a supply conductivity sensor 82, and a service conductivity sensor 84 are seated in respective sensor ports 94, 96, 90, 92 formed in the valve body 38. The sensor ports 94, 96, 90, 92 extend into desired locations of a manifold 98 that is defined within the valve body 38, and the control logic related to the sensors is discussed in greater detail below. The supply conductivity sensor 82 and the service conductivity sensor 84 are coupled to respective ports 90, 92 by individual multi-prong clips 100, 102. Specifically, each multi-prong clip 100, 102 includes resilient arms 104, 106 that are inserted into slots 108, 110 formed in respective port collars 112, 114 that extend from the valve body 38. As the multi-prong clips 100, 102 are slid into engagement with the slots 108, 110, the resilient arms 104, 106 flex about the respective bodies 116, 118 of the supply conductivity sensor 82 and the service conductivity sensor 84 until arcuate surfaces 120, 122 conform to a circumferential groove 124, 126 in the bodies 116, 118. Each multi-prong clip 100, 102 also includes a central split prong 128, 130 that seats into a central slot 132, 134 formed in the respective port collar 112, 114.

Similarly, the supply pressure sensor 86 and the service pressure sensor 88 are coupled to respective port collars 136, 138 formed by the valve body 38. Each port collar 136, 138 defines a pair of standoffs 140, 142 that define respective cylindrical openings 144, 146 into which U-shaped clips 148, 150 are inserted. The U-shaped clips 148, 150 include opposing arms 152, 154 that extend into circumferential grooves 156, 158 formed in bodies 160, 162 of the supply pressure sensor 86 and the service pressure sensor 88.

The communication connections are not shown in FIG. 8 for clarity, however, the supply pressure sensor 86, the service pressure sensor 88, the supply conductivity sensor 82, and the service conductivity sensor 84 can be in communication (e.g., wired, wireless, one-way, two-way, etc.) with a controller, so that a representative parameter is provided by each sensor to the controller. The supply pressure sensor 86 and the service pressure sensor 88 can be part number 2066 manufactured by Marquardt of Rietheim-Weilheim, Germany, and the supply conductivity sensor 82 and the service conductivity sensor 84 can be any suitable conductivity sensor having specifications that accommodate the particular application requirements.

Figure 7:
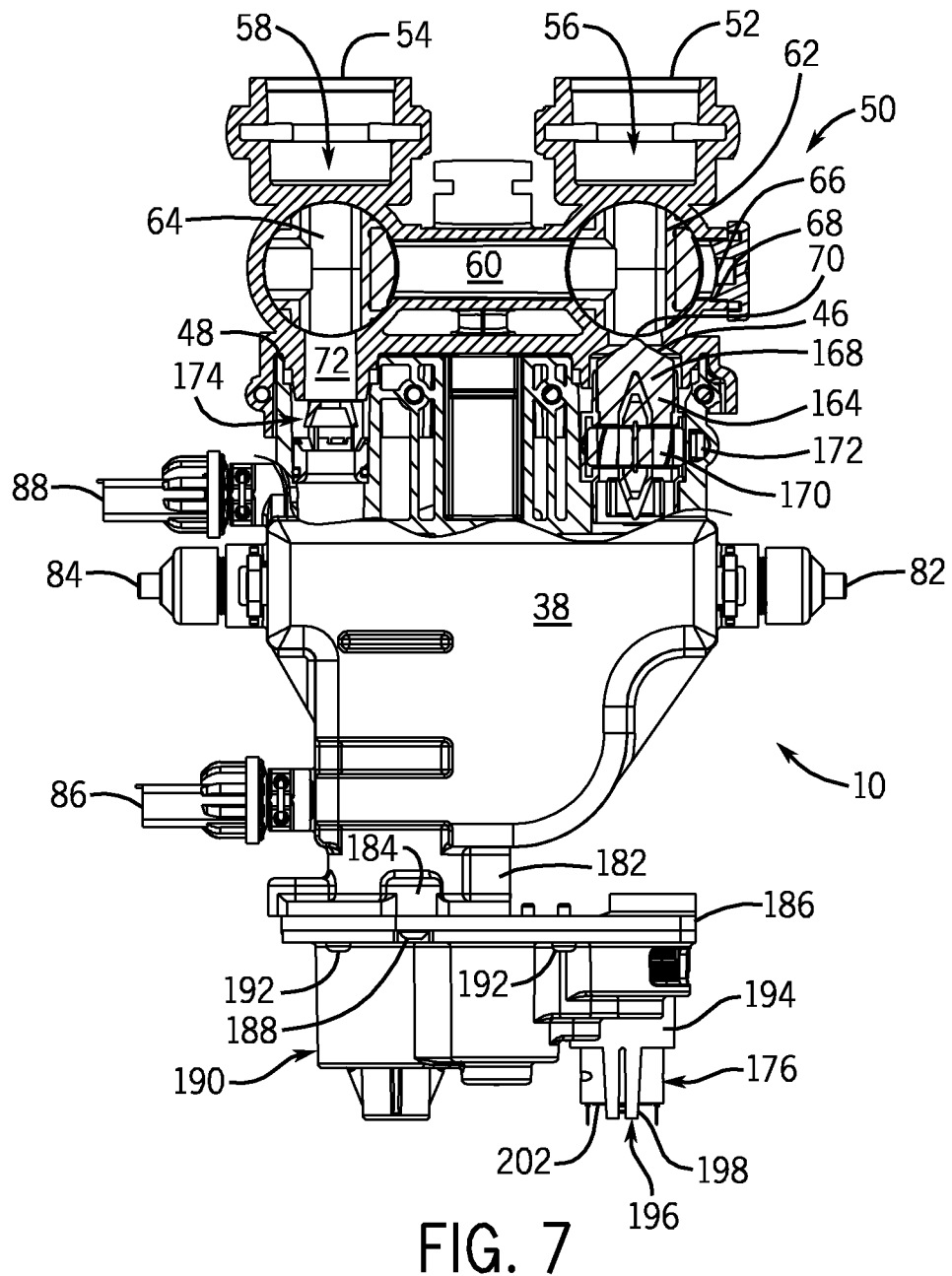
FIG. 7 is a top plan, partial section view of the example control valve assembly.
Figure 9:
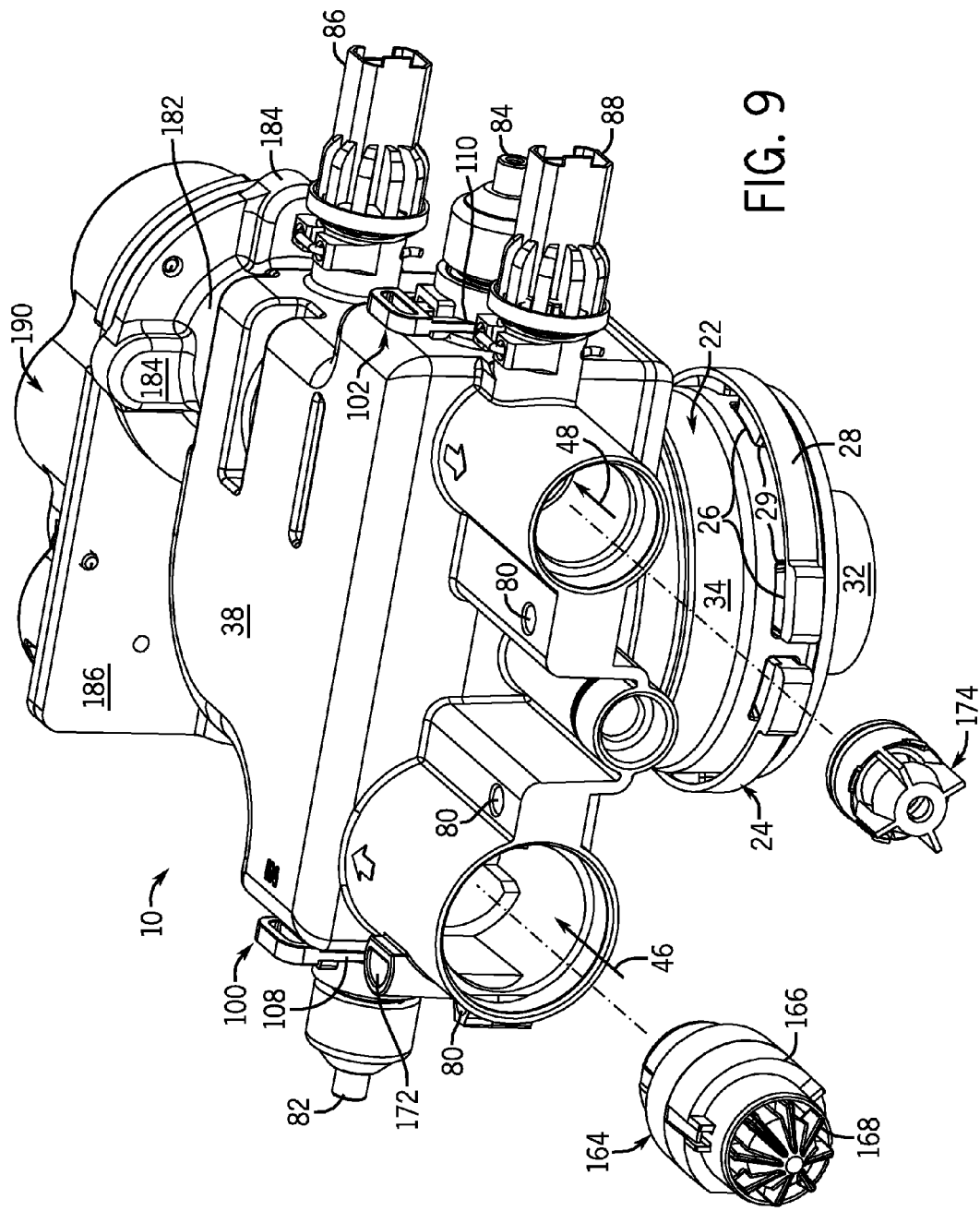
FIG. 9 is a partially exploded, isometric view of the example control valve assembly illustrating an example check valve and an example flow meter.

FIGS. 7 and 9 illustrate an additional sensor and a flow control device being incorporated into the control valve assembly 10 (the manual bypass body 50 has been removed in FIG. 9 for clarity). A flow meter 164 is seated within the supply port 46 and includes an outer shell 166 that houses a series of guide vanes 168 and a rotatable blade ring 170. The flow meter 164 can be part number GL3027839 manufactured by Pentair Residential Filtration, LLC of Milwaukee, Wis. The valve body 38 defines a mount 172 in which a pickup is secured; the pickup can be in communication with the controller to communicate a parameter indicating the flow of the supply fluid into the supply port 46 (e.g., flow or no flow, flow rate, etc.). A check valve 174 is seated within the service port 48 to inhibit backflow through the service port 48 into the manifold 98 of the control valve assembly 10. The check valve 174 can be part number NV25-25M manufactured by Neoperl, Inc. of Waterbury, Conn. The manual bypass body 50 captures the flow meter 164 and the check valve 174 within the respective supply port 46 and the respective service port 48 when the manual bypass body 50 is secured to valve body 38, as described above and illustrated in FIG. 7.

A controller executing predefined logic can be configured to adjust the operation of the control valve assembly 10 to alter how fluid flows (or is inhibited from flowing) through the manifold 98 of the valve body 38. In the control valve assembly 10, a motor in the form of an electric motor 176 (e.g., a direct current electric motor having a magnetic Hall effect pickup in communication with the controller) is incorporated to ultimately adjust the available flow passageways through the control valve assembly 10. The electric motor 176 can be a DC motor, an AC motor, a stepper motor, and the like, such as part number GLBDC-1227-01 manufactured by Global.

Figure 10:
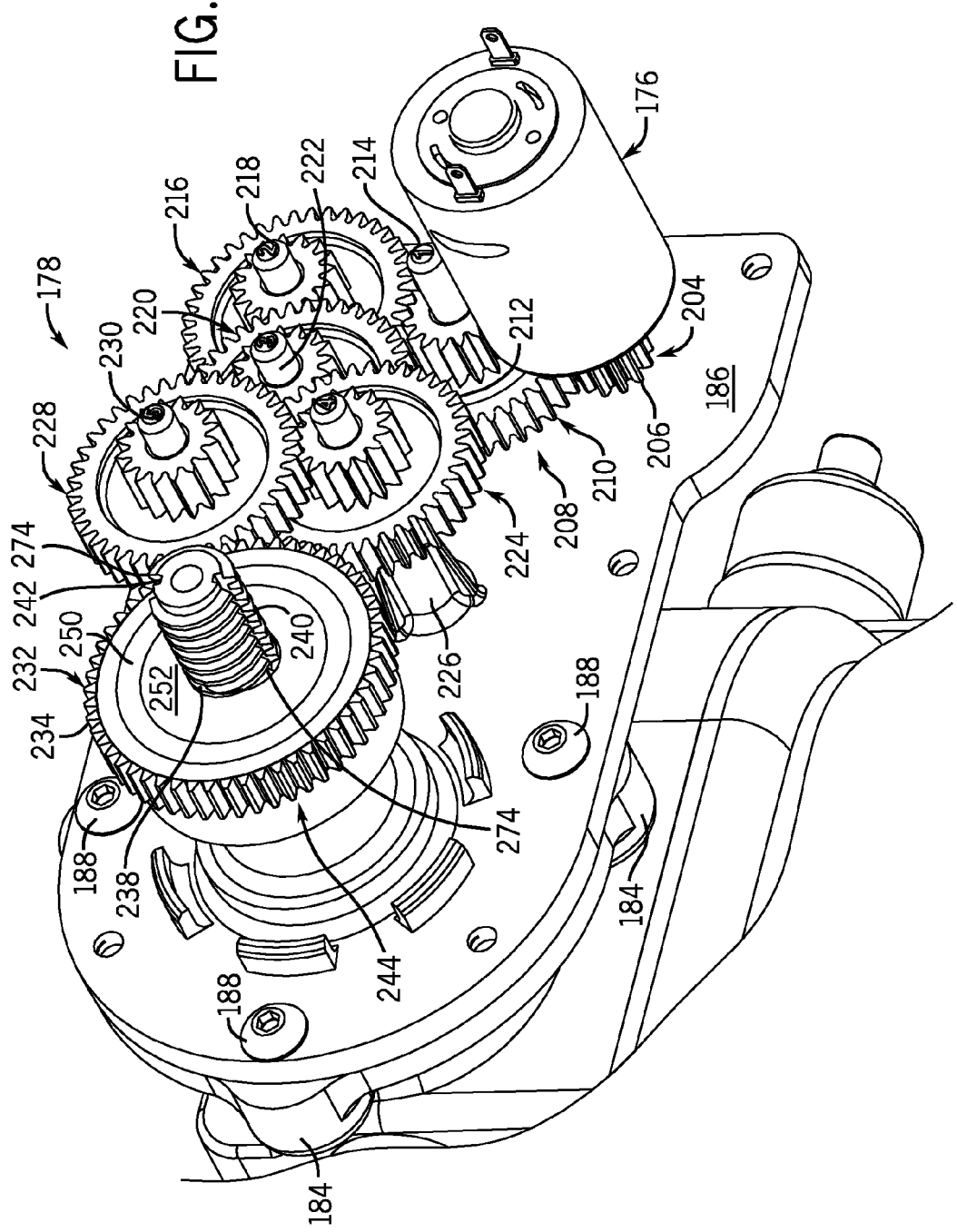
FIG. 10 is a partial isometric view of an example gear train of the example control valve assembly.

As shown in FIGS. 2 and 10, the electric motor 176 and a gear train 178 are mounted to the valve body 38 so that, in some embodiments, rotational movement of the electric motor 176 results in translation of a valve 180. The valve 180 is seated within the valve body 38 intersecting the manifold 98 to alter or adjust the operation of the control valve assembly 10. The valve body 38 forms a cylindrical mounting flange 182 with a series of fastener bores 184. A generally rectangular mounting plate 186 is secured to the mounting flange 182 with several fasteners 188, and a cover 190 is positioned over the gear train 178 and secured to the mounting plate 186 by additional fasteners 192. The cover 190 both shields the gear train 178 and provides a mounting location for the electric motor 176. As shown in FIGS. 2 and 8, the cover 190 forms a cylindrical receptacle 194 having resilient arms 196 that extend from the cover 190 to capture the electric motor 176 to the cover 190. The resilient arms 196 define beveled tips 198 that cam against the electric motor 176 during installation and undercuts 200 that engage an end face 202 of the electric motor 176 when fully seated in the cylindrical receptacle 194, thus capturing the electric motor 176. The mounting plate 186 and the cover 190 can be made, for example, from brass, stainless steel, plastics, or composites, and can be constructed, for instance, by casting, machining, or molding.

FIG. 10 illustrates the gear train 178 with the cover 190 removed. The electric motor 176 includes a drive motor gear 204 that is rotatably fixed to an output shaft of the electric motor 176. The drive motor gear 204 includes teeth 206 that mesh with a first stacked transfer gear 208. The first stacked transfer gear 208 includes an outer gear 210 adjacent to an inner gear 212, which is fixed to the outer gear 210, so that the teeth 206 of the drive motor gear 204 are positioned to mesh with the outer gear 210. The first stacked transfer gear 208 is rotatably secured to a first spindle standoff 214 extending from the mounting plate 186. In a similar manner, a second stacked gear 216 supported by a second spindle standoff 218 meshes with both the first stacked transfer gear 208 and a third stacked gear 220 supported by a third spindle standoff 222. The third stacked gear 220 meshes with a fourth stacked gear 224 supported by a forth spindle standoff 226, and the fourth stacked gear 224 is in turn meshed with a fifth stacked gear 228 supported by a fifth spindle standoff 230. As a result, the gear train 178 transfers the rotational movement of the electric motor 176 (in either rotational direction) to a positioning gear 232. The various gears can be, for instance, machined, cast, formed from powder metal, or injection molded.

The positioning gear 232 works in combination with a longitudinal drive gear 242 to convert rotational motion of the electric motor 176 to translational movement of the valve 180. The positioning gear 232 is fixed from translation and includes external gear teeth 234 that are engaged by the fifth stacked gear 228 and defines helical threads 236 within a central bore 238. The helical threads 236 are configured to engage mating external threads 240 on the longitudinal drive gear 242 that is rotationally fixed. The relative rotation of the positioning gear 232 will cause the longitudinal drive gear 242 to translate through the central bore 238 of the positioning gear 232.

Figure 11:
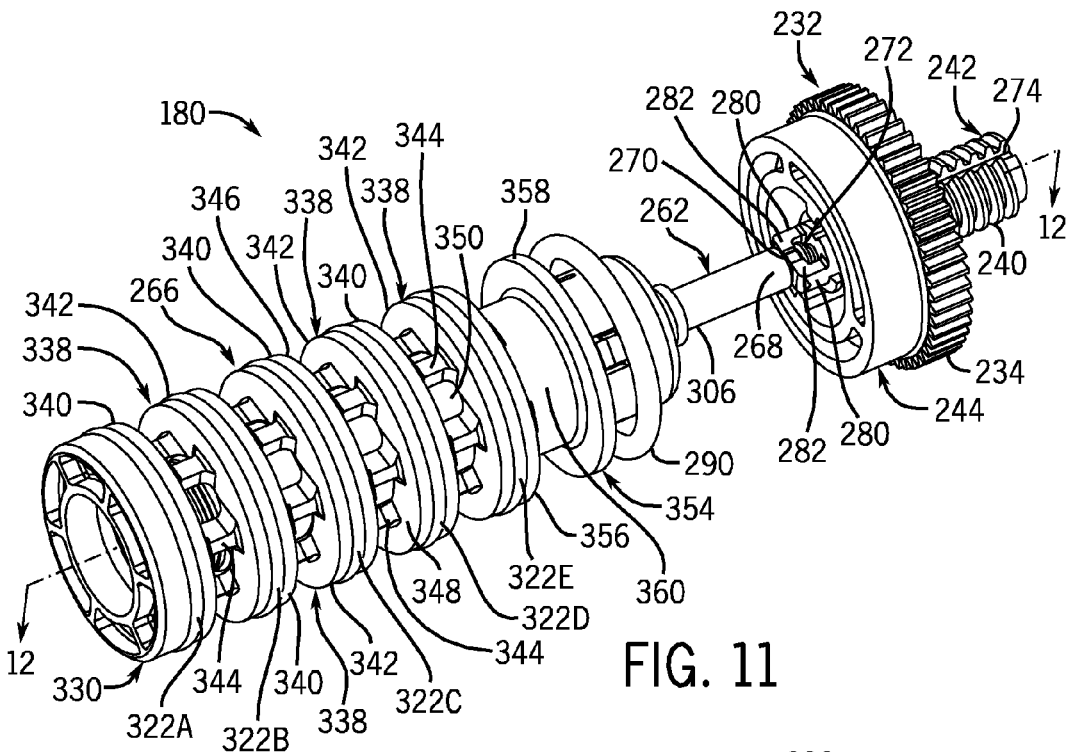
FIG. 11 is an isometric view of a portion of the example control valve assembly.
Figure 14:
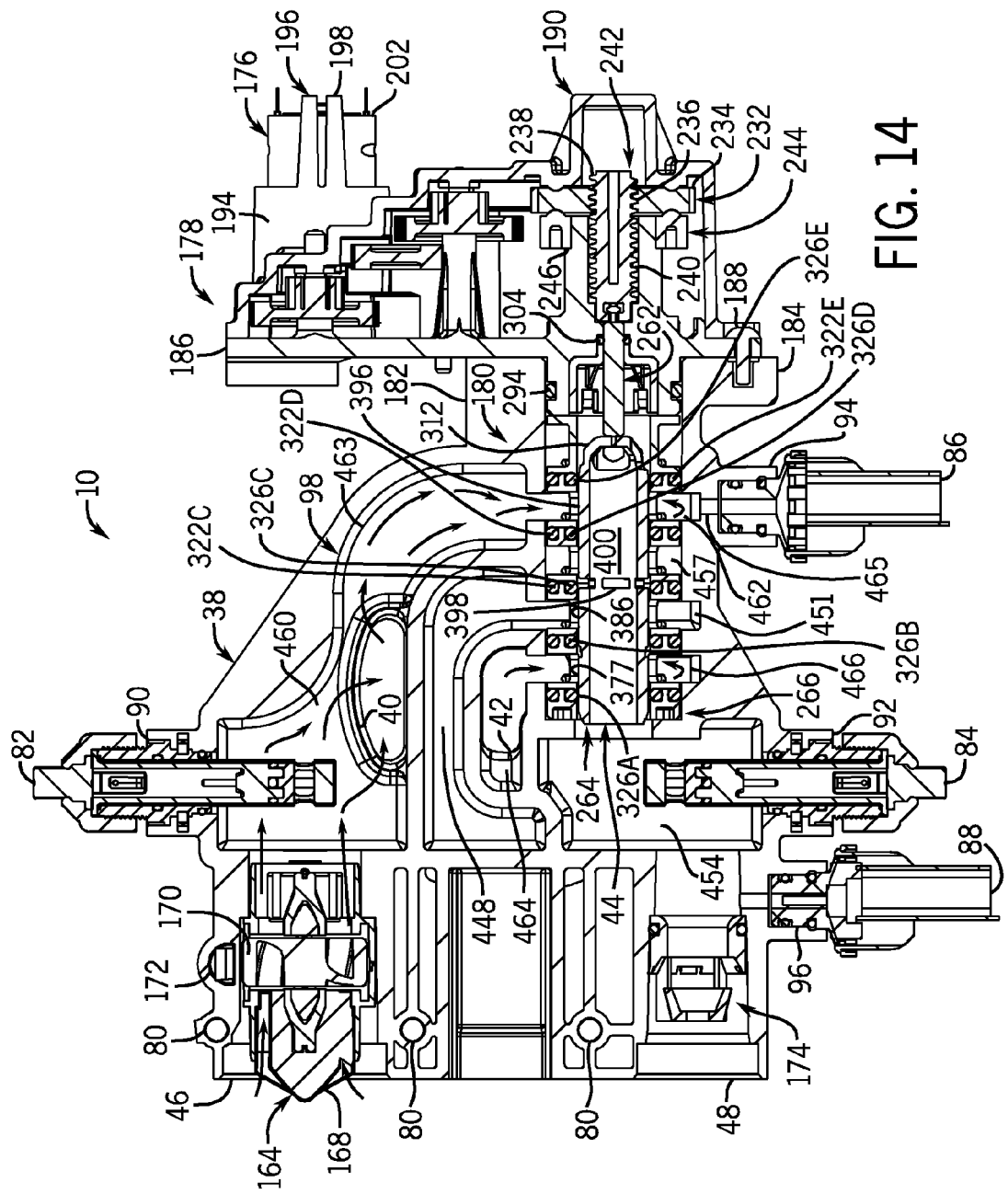
FIG. 14 is a section view along line 14-14 shown in FIG. 4 illustrating the example control valve assembly in an off position.
Figure 15:
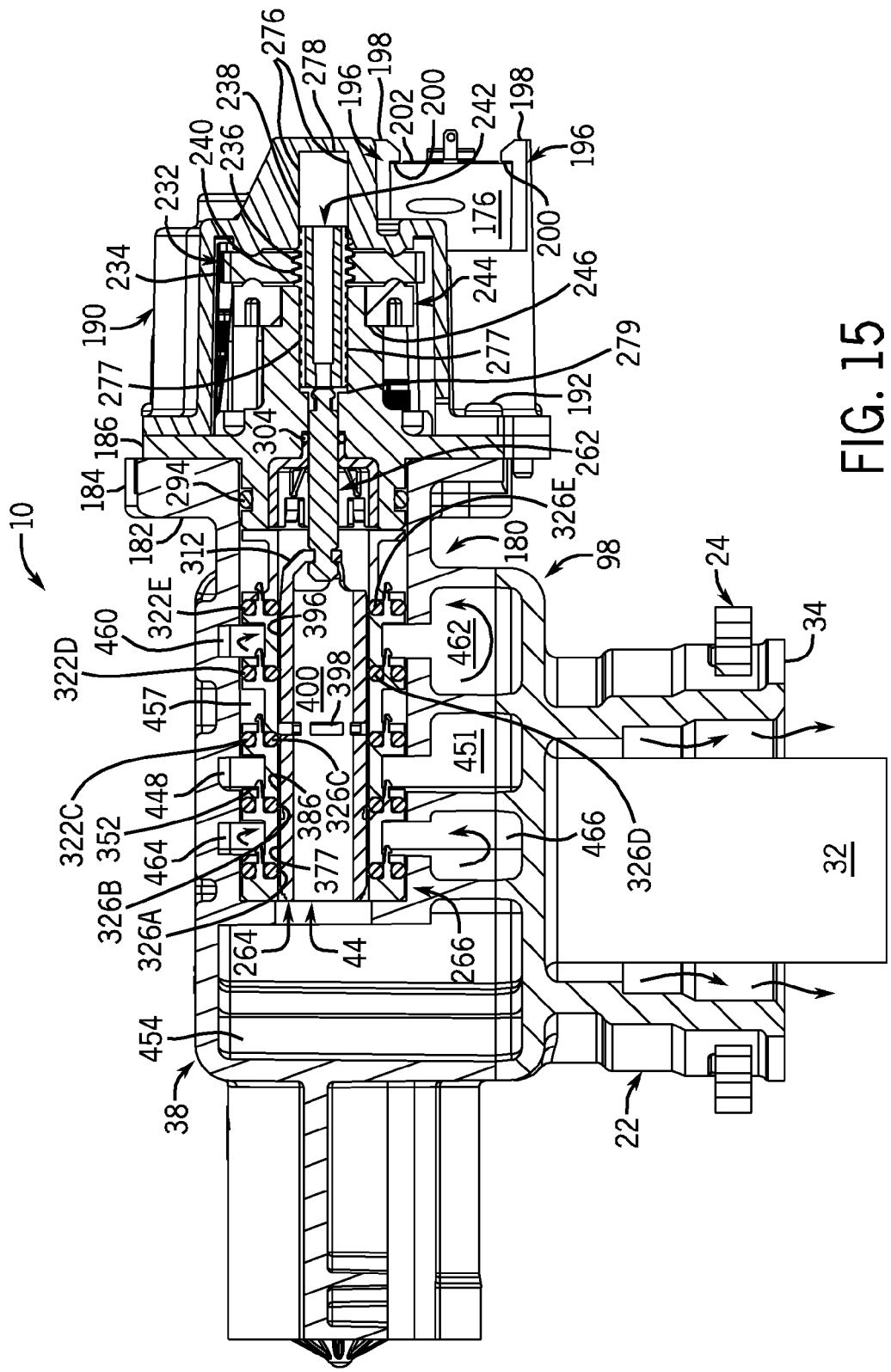
FIG. 15 is a section view along line 15-15 shown in FIG. 4 illustrating the example control valve assembly in the off position shown in FIG. 14.

FIGS. 11, 12, 14, and 15 illustrate the interaction between the positioning gear 232, the longitudinal drive gear 242, and the valve 180. The positioning gear 232 is inhibited from axial movement but is allowed to rotate. The positioning gear 232 is axially restrained or laterally fixed as it is positioned between the cover 190 and a ring-shaped bushing 244 seated on a ledge 246 defined by the mounting plate 186 (as shown in FIGS. 14 and 15). The cover 190 includes an annular, arcuate projection 248 that engages a mating annular, arcuate recess 250 formed on an outside face 252 of the positioning gear 232. Similarly, the bushing 244 defines an annular, arcuate projection 254 that engages another mating annular, arcuate recess 256 formed on an inside face 258 of the positioning gear 232. The sliding, rotational engagement between the projections 248, 254 and the recesses 250, 256 allows the positioning gear 232 to rotate and also inhibits translation along a valve axis 260. Rotation of the longitudinal drive gear 242 is restrained due to engagement between opposing slots 274 formed axially along the longitudinal drive gear 242 (one of which is shown in FIG. 11) and pairs of mating rectangular protrusions 276, 277 (as shown in FIG. 15) that extend from an internal surface 278, 279 of the cover 190 and the mounting plate 186, respectively, into the respective slots 274.

As the positioning gear 232 is rotationally driven by the electric motor 176 through the gear train 178, the internal helical threads 236 cam against the external threads 240 on the longitudinal drive gear 242, thus translating the longitudinal drive gear 242 along the valve axis 260. In order to move the valve 180 within the valve chamber 44, a rod 262 connects the longitudinal drive gear 242 to a piston 264 that is slidably seated within a cartridge cage 266. Specifically, a drive end 268 of the rod 262 defines a groove 270 and a head 272 that is captured to the longitudinal drive gear 242. The longitudinal drive gear 242 includes a pair of resilient arms 280 with fingers 282 that extend radially inward toward the groove 270 to capture the rod 262. The rod 262 extends from the drive end 268 through an opening 284 in the mounting plate 186 and into the valve chamber 44. The mounting plate 186 further includes a cylindrical plug 286 that seats within an end 288 of the valve chamber 44. The cylindrical plug 286 includes an annular groove 290 formed in an exterior annular surface 292 in which an o-ring 294 is seated. The o-ring 294 seals between the groove 290 and an interior surface 296 of the valve chamber 44. An end cup 298 is seated in the cylindrical plug 286 and includes a smaller diameter nipple 300 that extends into a smaller diameter cavity 302 in the cylindrical plug 286 to capture another o-ring 304. This o-ring 304 is sized to engage the rod 262 as the rod 262 is translated through the opening 284.

The rod 262 further defines a valve end 306 that is opposite to the drive end 268 and configured to be captured to the piston 264. When seated, the piston 264 can be moved within the cartridge cage 266 along a piston axis 308, which is generally collinear with the valve axis 260. As shown in FIG. 13A, the piston 264 is generally cylindrical and extends from a tip end 310 to a base end 312. At the base end 312, three resilient arms 314 are circumferentially spaced about the base end 312 and are canted radially inward whereat the resilient arms 314 are coupled by a split ring 316. The resilient arms 314 and the split ring 316 define an opening 318 that captures another head 320 formed near the valve end 306 of the rod 262.

In the control valve assembly 10, the piston 264 is moveable within the cartridge cage 266 to various positions that adjust the flow of fluid through the control valve assembly 10. In order to define the various flow passageways, the cartridge cage 266 is seated within the valve chamber 44 and the piston 264 is sized to slidably seat within the cartridge cage 266. The cartridge cage 266 includes multiple external seals 322 to seal against an interior cylindrical surface 324 of the valve chamber 44 and additional internal seals 326 to slidably seal against an exterior surface 328 of the piston 264.

The cartridge cage 266 includes multiple disc-shaped segments that are snap-fit together to establish seats for the various external seals 322 and the internal seals 326. Specifically, a circular end cap 330 is seated in the valve chamber 44 adjacent to an end wall 332 of the valve chamber 44. Resilient tabs 334 extend axially from an interior face 335 of the end cap 330 and include interlocking tips 336 (e.g., an undercut) to engage an adjacent flow disc 338. A series of flow discs 338 are interlocked with one or more adjacent flow discs 338. Each flow disc 338 includes offset, first and second parallel plates 340, 342 connected by a series of longitudinal spokes 344 proximate interior rims 346, 348 of each plate 340, 342. Radial openings 350 are defined between the plates 340, 342 and the spokes 344. In addition, an annular lip 351 extends axially from the second plate 342 to define a partial seat for an external seal 322 and an internal seal 326. A full seat is formed when adjacent flow discs 338 are coupled. To couple the adjacent flow discs 338, the resilient tabs 334 of a first flow disc 338 are aligned with and inserted into arcuate openings 352 (as shown in FIG. 15) formed in the first plate 340 of an adjacent flow disc 338, so that the interlocking tips 336 of the first flow disc 338 are engaged with the first plate 340 of the adjacent flow disc 338. An end spool 354 includes a first plate 356 similar to the first plates 340 of the flow discs 338, but includes a solid second plate 358 that is coupled to the first plate 356 by a solid cylindrical wall 360.

The bushing 244, the rod 262, the piston 264, the end cap 330, the flow disc 338, and the end spool 354 can be manufactured from a variety of materials and by numerous techniques. For instance, the end cap 330, the flow disc 338, and the end spool 354 can be cast from non-corroding metal or injection molded from plastic. The rod 262 and the piston 264 can be made from a plastic or metal coated with a friction reducing materials, such as polytetrafluoroethlyene under the trademark Teflon sold by DuPont. In addition, given the benefit of this disclosure, one skilled in the art will appreciate that the various components can be modified (e.g., integrated with each other), yet the modified structures remain within the scope of the control valve assembly concept.

Given the benefit of this disclosure, one skilled in the art will appreciate that the cartridge cage 266 can include a single sleeve or multiple disc-shaped segments that are not coupled to adjacent segments. For instance, the end cap 330, the flow discs 338, and the end spool 354 can be integrally formed or abut (without coupling). In alternative constructions, the cartridge cage 266 can be eliminated, such as by integrating the seals into the valve chamber 44 (e.g., o-rings seated in annular recesses formed in an interior surface of the valve chamber 44).

As the piston 264 is translated within the cartridge cage 266, contours about the exterior surface 328 of the piston 264 influence the available flow area and, in conjunction with the manifold 98, establish or inhibit flow passageways through the valve body 38. As shown in FIG. 13A, the piston 264 further defines several flow zones and surfaces between the tip end 310 and the base end 312. A tip flow zone 364 is near the tip end 310 and includes three stepped rings 366, 368, 370 of increasing diameter (moving away from the tip end 310 along the piston axis 308). A skewed ring 372 having the shape of a conical frustum is adjacent to the final stepped ring 370. Adjusting the position of the stepped rings 366, 368, 370 and skewed ring 372 relative to the internal seals 326 will alter the area and hence flow rate of fluid flowing between the tip flow zone 364 and the valve chamber 44. For instance, a larger annular gap between a particular stepped ring 366, 368, 370 and a particular internal seal 326 will allow increased fluid flow through the annular gap, provided other factors remain constant.

A cylindrically shaped tip seal surface 374 extends from an edge of the skewed ring 372 toward an intermediate flow zone 376. The tip seal surface 374 is sized to selectively engage at least one of the internal seals 326 when the piston 264 is seated within the valve chamber 44. The intermediate flow zone 376 includes opposing beveled rims 378, 380 and two stepped rings 382, 384. Again, the relative position of the stepped rings 382, 384 can influence the flow of fluid through the intermediate flow zone 376.

A cylindrically shaped intermediate seal surface 386 extends between the intermediate flow zone 376 and a cylindrically shaped base flow zone 388. Similarly to the tip seal surface 374, the intermediate seal surface 386 is sized to selectively engage at least one of the internal seals 326 when the piston 264 is seated within the valve chamber 44. Continuing toward the base end 312 of the piston 264, the base flow zone 388 includes opposing beveled rims 390, 392 bridged by several fingers 394 that extend axially to couple the intermediate seal surface 386 and a base seal surface 396. The fingers 394 define circumferentially spaced gaps 398 that allow fluid to flow through the gaps 398 into an interior chamber 400 defined within the piston 264 and along the piston axis 308. Again, the base seal surface 396 is further configured to selectively engage at least one of the internal seals 326 when the piston 264 is seated within the valve chamber 44.

While the specific operation of the piston 264 will be described in connection with the control valve assembly 10, there are alternative configurations available for the piston 264. Several alternative embodiments are illustrated in FIGS. 13B, 13C, 13D, and 13E. FIG. 13B illustrates a second embodiment of a piston 402 defining a tip flow zone 404 having a generally conical form factor that expands radially outward from a tip end 406 toward a tip seal surface 408. The tip flow zone 404 defines a first segment 404A with a first slope and a second segment 404B with a second slope that is less than the first slope of the first segment 404A; thus, the initial and subsequent flow of fluid can be metered. An intermediate flow zone 410 includes a beveled rim 412 adjacent to a necked cylindrical portion 414. Another conical surface 416 flares radially outward from the cylindrical portion 414 to another beveled rim 418 having a lesser slope than that defined by the conical surface 416. The beveled rim 418 is adjacent to a cylindrical intermediate seal surface 420, and the balance of the piston 402 is similar to the piston 264 shown in FIG. 13A.

FIG. 13C illustrates a third embodiment of a piston 422 with a tip flow zone 424 similar to that shown in FIG. 13C. The tip flow zone 424 of the piston 422, however, defines a conical form factor with a generally uniform slope. An intermediate flow zone 426 is similar to the stepped version shown in FIG. 13A. A fourth embodiment of a piston 428 is shown in FIG. 13D and includes a tip flow zone 430 that incorporates a series of geometric openings 432 circumferentially spaced about the piston 428 near a tip end 434 of the piston 428. As shown in FIG. 13D, the geometric openings 432 are in the form of an equilateral triangle having a peak 436 proximate to the tip end 434 and a base 440 oriented perpendicular to a piston axis 442 of the piston 428. An intermediate flow zone 444 is similar to the piston 402 shown in FIG. 13B. FIG. 13E illustrates a fifth embodiment of a piston 446 having a geometric opening 447 in a tip flow zone 450 oriented so that a base 452 of the geometric opening 447 (e.g., in the form of a triangle) is proximate a tip end 455 and perpendicular to the orientation of a piston axis 456. An intermediate flow zone 458 is similar to the piston 264 shown in FIG. 13A.

Figure 16:
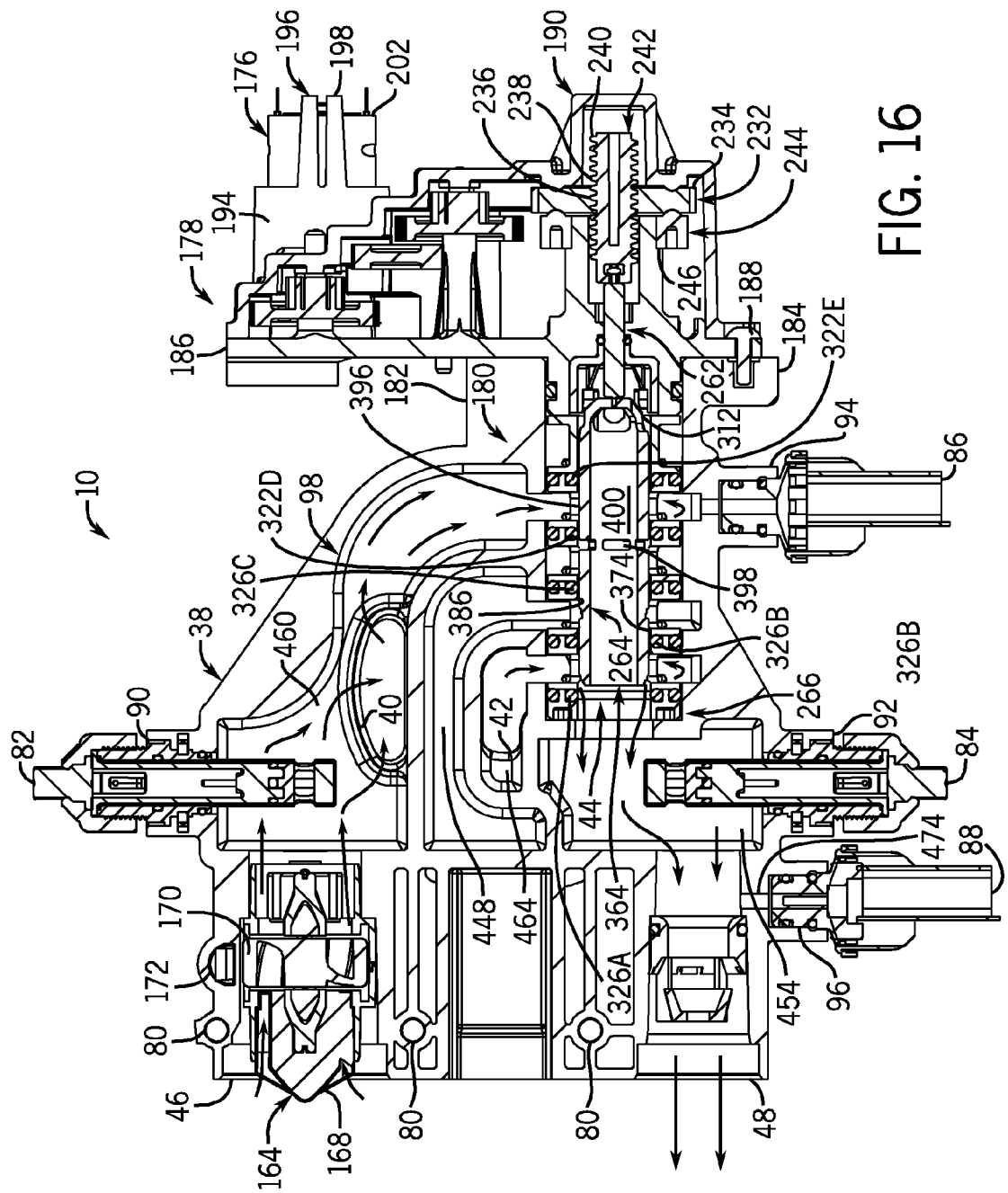
FIG. 16 is a section view illustrating the example control valve assembly in a service position.
Figure 17:
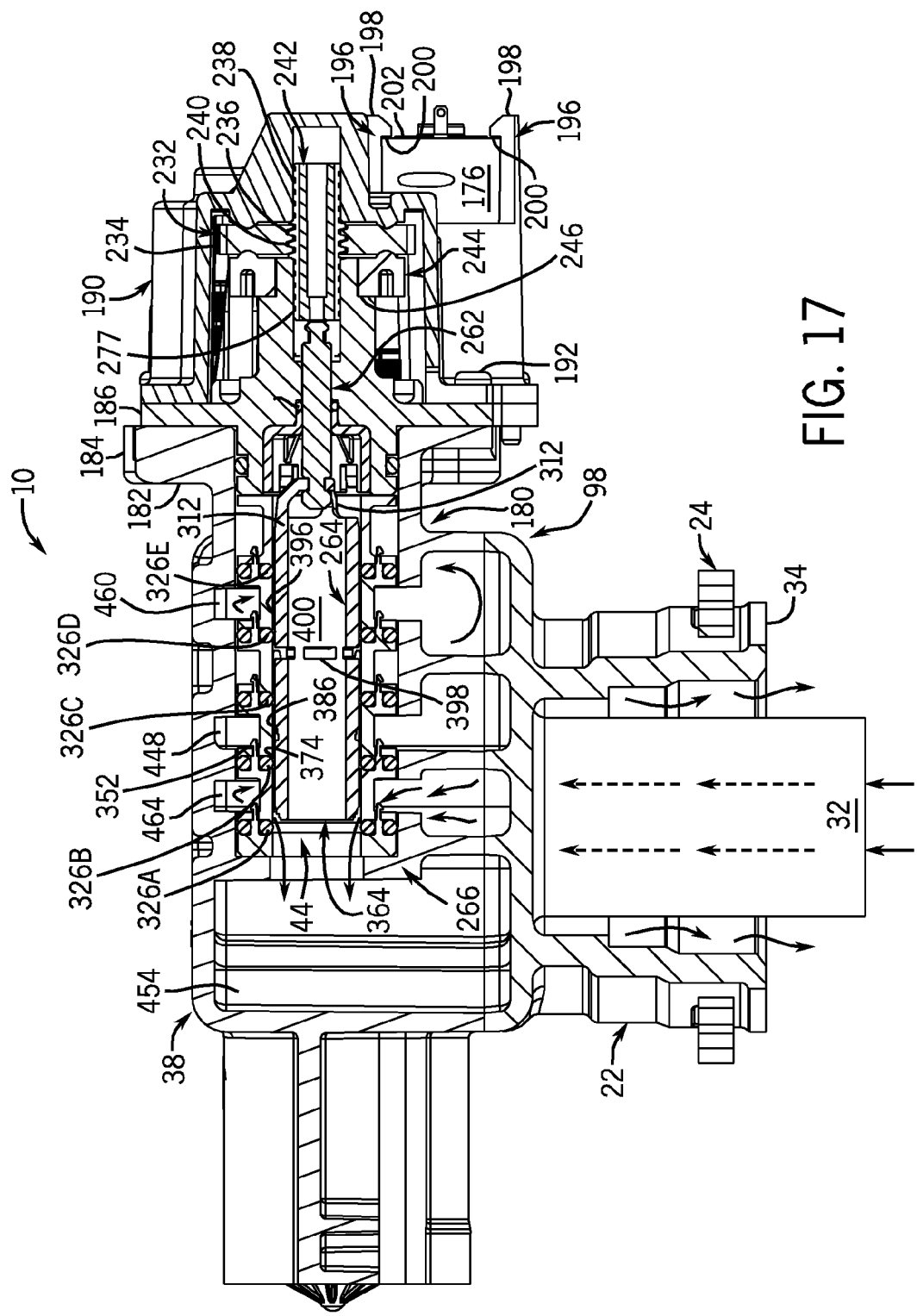
FIG. 17 is a section view illustrating the example control valve assembly in the service position shown in FIG. 16.
Figure 18:
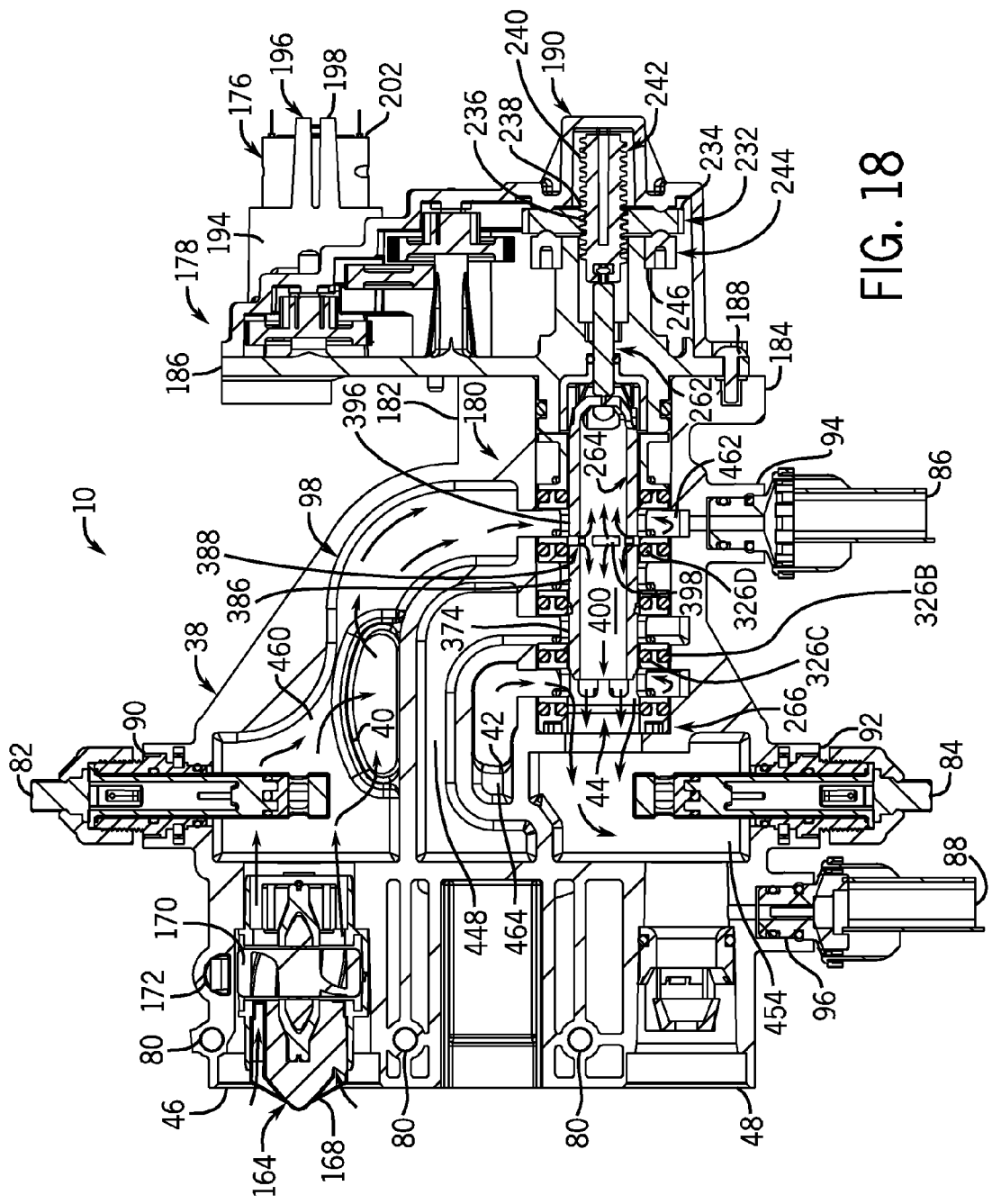
FIG. 18 is a section view illustrating the example control valve assembly in a blend position.
Figure 19:
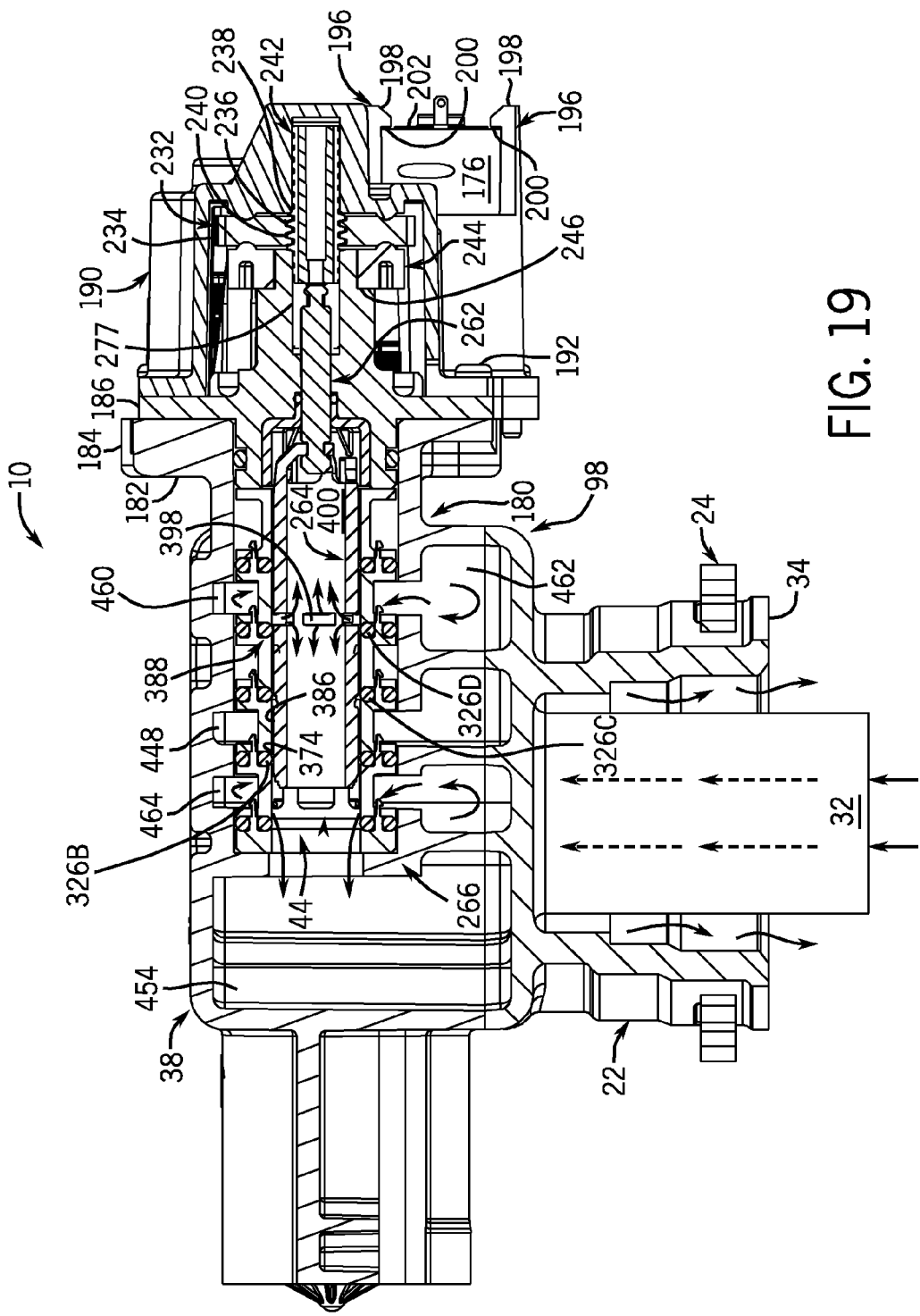
FIG. 19 is a section view illustrating the example control valve assembly in the blend position shown in FIG. 18.
Figure 20:
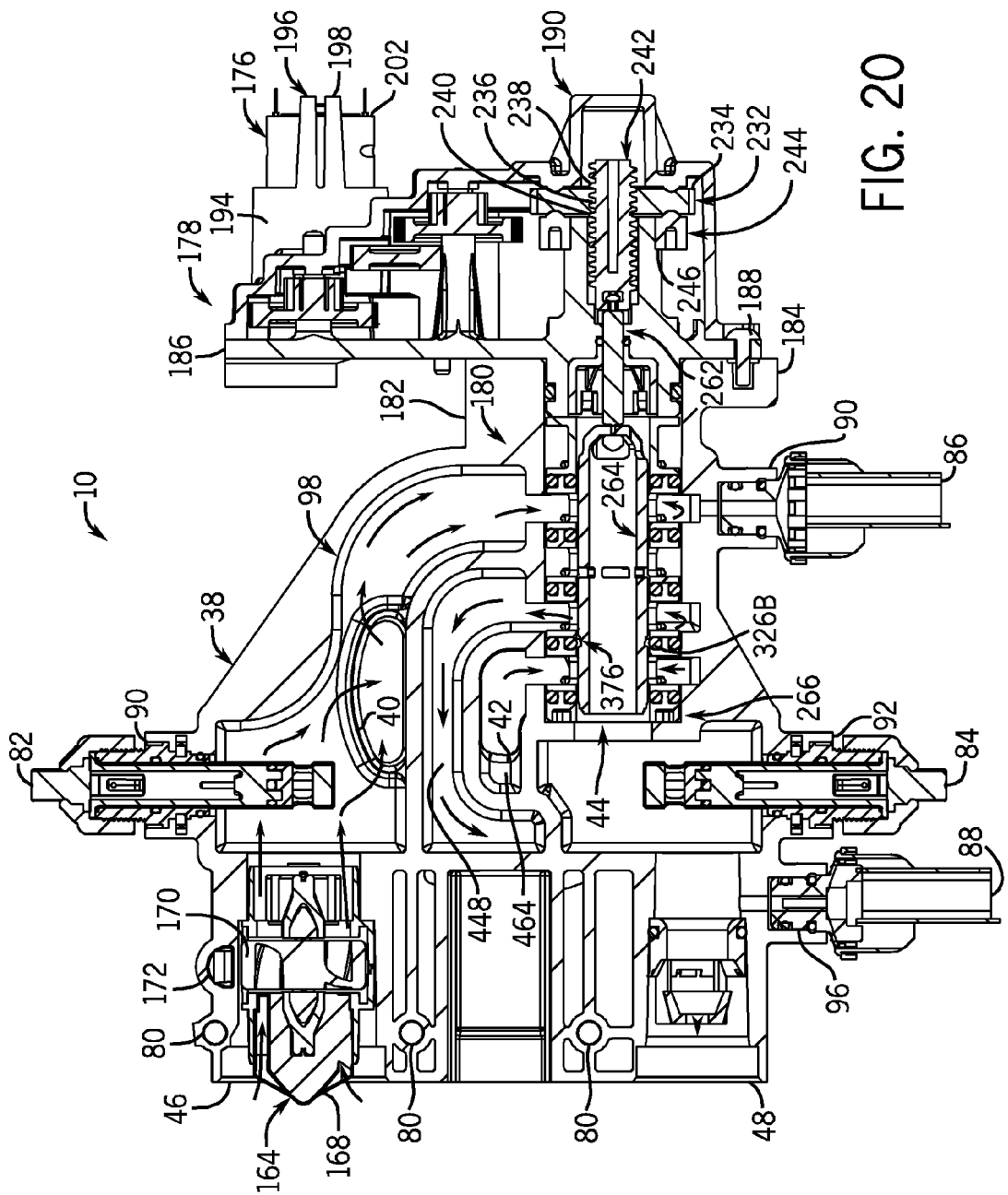
FIG. 20 is a section view illustrating the example control valve assembly in a drain position.

Returning to the overall operation of the control valve assembly 10, the valve 180 can be manipulated to adjust the internal passageways available through the manifold 98 defined within the valve body 38. The position of the piston 264 within the valve chamber 44 adjusts the control valve assembly 10 in to or out of an off position (as shown in FIGS. 14 and 15), a service position (as shown in FIGS. 16 and 17), a blend position (as shown in FIGS. 18 and 19), and a drain position (as shown in FIGS. 20 and 21). In addition to directing the flow of fluid through the manifold 98, the control valve assembly 10 can further influence the flow rate of fluid, such as by controlling the size of the passageway through which the fluid flows (e.g., an annular space between the piston 264 and the internal seals 326). The various operational modes of the control valve assembly 10 are described below with reference to FIGS. 14-22. In FIGS. 14-21, the flow of fluid in each position is generally illustrated with flow arrows and the manual bypass body 50 is not shown in the drawings for clarity.

As shown in FIGS. 14 and 15, the control valve assembly 10 is in an off position at which the valve 180 is configured to inhibit fluid communication between the supply port 46 and the service port 48. Specifically, fluid (e.g., treated fluid) flowing from the treatment outlet port 20 of the capacitive deionization device 12 into the inlet port 42 of the valve body 38 is inhibited from flowing into the valve chamber 44, and thus through the valve chamber 44 into the service port 48.

When the point of entry is coupled to the control valve assembly 10 and is configured to provide a supply fluid to the manifold 98 of the control valve assembly 10, the supply fluid is directed to the supply port 46 and into a supply passageway 460 of the manifold 98. The supply conductivity sensor 82 secured to the valve body 38 extends into the supply passageway 460 and provides a conductivity parameter to a controller that is indicative of the fluid conductivity within the supply passageway 460. The supply passageway 460 includes arcuate walls 463 that curve toward the valve chamber 44. The supply passageway 460 further includes an opening 465 through the valve body 38 into which the supply pressure sensor 86 extends and provides a pressure parameter to a controller that is indicative of a pressure of the supply fluid.

As also shown in FIGS. 14 and 15, the base seal surface 396 of the piston 264 is configured to seal with the internal seals 326D, 326E captured in the cartridge cage 266, in order to inhibit the supply fluid within the supply passageway 460 from entering the valve chamber 44. The supply passageway 460 establishes a ring-shaped portion 462 about the base seal surface 396 into and through which the supply fluid can flow. With the valve 180 in the off position, supply fluid within the supply passageway 460 can flow out of the manifold 98 through the generally oval outlet port 40, and between the inner tube 32 and the outer tube 34 into the treatment inlet port 18 of the capacitive deionization device 12.

Any fluid (e.g., treated fluid) within the capacitive deionization device 12 is also inhibited from flowing into the valve chamber 44. Specifically, treated fluid entering the manifold 98 through the inlet port 42, which is in fluid communication with the treatment outlet port 20 via the inner tube 32, flows into a treated passageway 464. The treated passageway 464 establishes a ring-shaped portion 466 about the tip seal surface 374 and the intermediate seal surface 386. The tip seal surface 374 and the intermediate seal surface 386 are engaged by respective internal seals 326A, 326B to inhibit treated fluid from entering the valve chamber 44.

Figure 4:
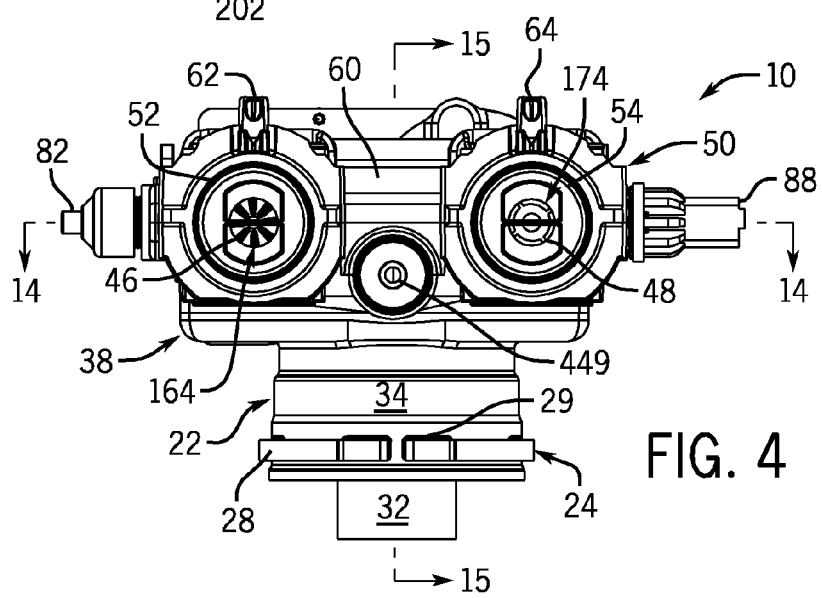
FIG. 4 is an end plan view of the example control valve assembly.

A drain passageway 448 is also formed within the manifold 98 and extends from a drain port 449 (as best shown in FIGS. 2 and 4) to the valve chamber 44. The drain passageway 448 establishes a ring-shaped portion 451 about the intermediate seal surface 386. The intermediate seal surface 386 of the piston 264 seals against the internal seals 326B, 326C to inhibit fluid from flowing between the valve chamber 44 and the drain passageway 448.

Lastly, any fluid within a service passageway 454, which is in fluid communication with the service port 48, is allowed to flow into the valve chamber 44 through the interior chamber 400. The fluid can flow through the gaps 398 and past the base end 312 of the piston 264. Fluid flowing through the gaps 398 is directed into an annular compartment 457 that is defined and sealed by external seals 322C, 322D engaged against the valve chamber 44, and internal seal 326C engaged against the intermediate seal surface 386 and internal seal 326D engaged against the base seal surface 396. Fluid flowing past the base end 312 is inhibited from flowing out of the valve chamber 44 by the internal seal 326E, the external seal 322E, the o-ring 304, and the o-ring 294. Therefore, when the valve 180 is in the off position, fluid (e.g., supply fluid, treated fluid, blended fluid) is inhibited from flowing through the manifold 98 and being urged from the service port 48. The check valve 174 further inhibits fluid from flowing into the manifold 98.

If the valve 180 is not in the off position, the electric motor 176 can be actuated by, for instance, a controller to drive the valve 180 to the off position via the gear train 178. Specifically, the rotation of the positioning gear 232 will cause translation of the longitudinal drive gear 242 to the off position illustrated in FIGS. 14 and 15. The actuation of the electric motor 176 is orchestrated by the controller. For instance, the controller can monitor a magnet embedded in, or otherwise fixed to, the first stacked transfer gear 208, so that the controller can monitor rotation of the magnet to "count" the number of rotations of the first stacked transfer gear 208. Given the known gear ratios, each rotation of the first stacked transfer gear 208 corresponds to a linear movement of the longitudinal drive gear 242. In one embodiment, full travel of the piston 264 corresponds to approximately one thousand rotations of the first stacked transfer gear 208, representing approximately one thousand pulses monitored by the controller.

Figure 12:
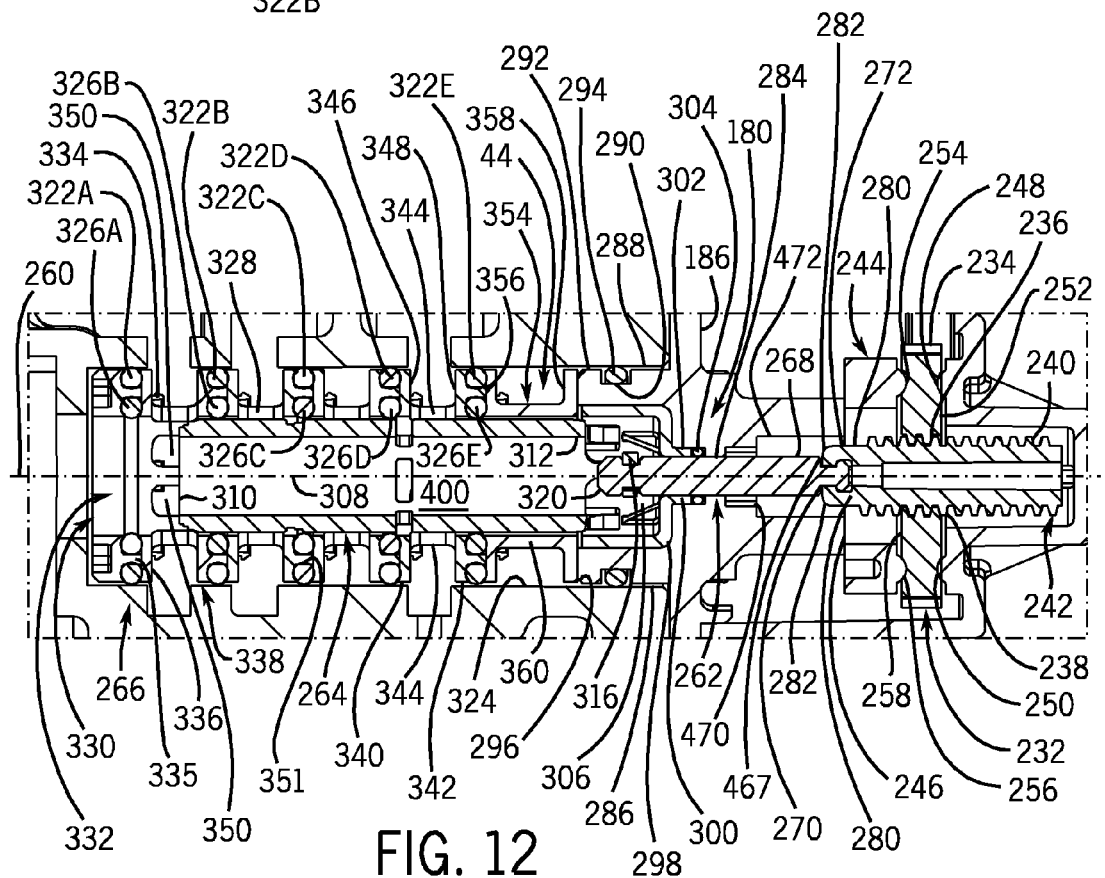
FIG. 12 is a section view along line 12-12 shown in FIG. 11 illustrating the portion of the example control valve assembly in an example valve chamber.

As shown in FIG. 12, the control valve assembly 10 is configured so that an axial end face 467 of the longitudinal drive gear 242 engages a stop surface 470 formed in a cylindrical cavity 472 of the mounting plate 186. The engagement between the stop surface 470 and the axial end face 467 ultimately limits translation of the coupled piston 264, thus not imparting any additional stresses on the piston 264 when positioned in the off position.

As shown in FIGS. 16 and 17, the control valve assembly 10 is illustrated in a service position, at which the valve 180 is configured to direct supply fluid flowing into the supply port 46 into the capacitive deionization device 12 and to direct treated fluid flowing from the capacitive deionization device 12 out of the service port 48. In one embodiment, the control valve assembly 10 provides fluid communication through the manifold 98 to direct supply fluid in the supply port 46 through the supply passageway 460 and into the outlet port 40 that is in fluid communication with the treatment inlet port 18. Treated fluid is also directed from the treatment outlet port 20 into the inlet port 42, through the treated passageway 464 into the valve chamber 44, from the valve chamber 44 into the service passageway 454, and ultimately out of the service port 48 to a point of use.

Similar to when the control valve assembly 10 is in the off position, the service position directs supply fluid into the supply passageway 460 of the manifold 98 where the base seal surface 396 of the piston 264 remains in sealing engagement with the internal seals 326D, 326E, in order to inhibit the supply fluid within the supply passageway 460 from entering the valve chamber 44. Supply fluid within the supply passageway 460 flows out of the manifold 98 through the outlet port 40 and into the treatment inlet port 18 of the capacitive deionization device 12. While the relative position of the piston 264 has slid rightward (as shown in FIG. 16), flow from the valve chamber 44 through the drain passageway 448 also remains restricted as the intermediate seal surface 386 of the piston 264 seals against the internal seal 326C and the tip seal surface 374 seals against the internal seal 326B, in order to inhibit fluid from flowing between the valve chamber 44 and the drain passageway 448.

As the piston 264 is slid along the valve axis 260 within the valve chamber 44, the contoured tip flow zone 364 will be gradually positioned adjacent to the internal seal 326A). Treated fluid will begin to flow through the treated passageway 464, between the internal seal 326A) and the tip flow zone 364, into the valve chamber 44, and along the service passageway 454. The skewed ring 372 of the tip flow zone 364 can be positioned relative to the internal seal 326A) to meter the flow of treated fluid. Similarly, the stepped rings 366, 368, 370 of varying diameter can also be positioned relative to the internal seal 326A) to achieve the desired flow rate as the available fluid flow area is adjusted.

Similar to the configuration described when the control valve assembly 10 is in the off position, fluid within the service passageway 454 is allowed to flow into the valve chamber 44 through the interior chamber 400. The fluid can flow through the gaps 398 and past the base end 312 of the piston 264, but remains sealed in the annular compartment 457 and the valve chamber 44.

The service conductivity sensor 84 secured to the valve body 38 extends into the service passageway 454 and provides a conductivity parameter to a controller that is indicative of the fluid conductivity within the service passageway 454. The service passageway 454 further includes an opening 474 through the valve body 38 into which the service pressure sensor 88 extends (as discussed above) and provides a pressure parameter to a controller that is indicative of a pressure of the treated fluid (when the control valve assembly 10 is in the service position).

Again, the positioning of the valve 180 is accomplished via a controller actuating the electric motor 176, which in turn drives the gear train 178 coupled to the positioning gear 232 resulting in translation of the longitudinal drive gear 242 and the coupled piston 264. In one form, a controller can monitor a flow rate parameter provided by the flow meter 164 and adjust the position of the valve 180 to achieve a desired flow rate. In other forms, a controller can monitor and compare a supply pressure parameter and a service pressure parameter, and adjust the position of the valve 180 to maintain a desired pressure differential. In other forms, the service conductivity sensor 84 can be monitored, so that when the properties of the service fluid exceed a predetermined threshold, the valve 180 can be positioned in the blend position to mix supply fluid with the service fluid thereby adjusting the properties of the blended fluid within a preferred range.

As shown in FIGS. 18 and 19, the control valve assembly 10 is in a blend position at which the valve 180 is configured to direct a portion of the supply fluid flowing into the supply port 46 toward the capacitive deionization device 12, to direct treated fluid flowing from the capacitive deionization device 12 out of the service port 48, and to direct a portion of the supply fluid to bypass the capacitive deionization device 12 and into the service port 48. In one embodiment, the control valve assembly 10 provides fluid communication through the manifold 98 to direct supply fluid in the supply port 46 through the supply passageway 460 and into the outlet port 40 that is in fluid communication with the treatment inlet port 18. Treated fluid is also directed from the treatment outlet port 20 into the inlet port 42, through the treated passageway 464, into the valve chamber 44, from the valve chamber 44 into the service passageway 454, and ultimately out of the service port 48 to a point of use. These two flow paths are similar to those established when the control valve assembly 10 is in the service position. The blend position defines an additional flow path that allows the supply fluid and the treated fluid to mix in various ratios to establish a blended fluid that flows from the service port 48.

In the blend position, the piston 264 is slid further rightward from the service position shown in FIGS. 16 and 17. As the piston 264 approaches the blend position, the base flow zone 388 moves adjacent to the internal seal 326D), ultimately providing fluid communication between the ring-shaped portion 462 of the supply passageway 460 and the valve chamber 44 through which the supply fluid can flow. Specifically, the supply fluid flows through the gaps 398 into the interior chamber 400 defined within the piston 264. The supply fluid then can flow along the interior chamber 400 toward the service passageway 454 where the supply fluid ultimately mixes with treated fluid entering the valve chamber 44 via the treated passageway 464.

In the control valve assembly 10, a controller can receive and use parameters from the supply pressure sensor 86, the supply conductivity sensor 82, the service pressure sensor 88, and the service conductivity sensor 84 to determine the desired position of the valve 180 required to maintain the blended fluid within, for instance, a range of conductivity. As another embodiment, the service pressure sensor 88 can provide a service pressure parameter that indicates a fluid pressure in the service passageway 454 that is at or below a minimum threshold. In response, the controller can determine that the service fluid demands require an increase in fluid pressure and flow. Thus, moving the valve 180 to the blend position will allow additional supply fluid to, at least temporarily, meet the service demands placed on the control valve assembly 10. Once the increased demand has been met (e.g., pressure in the service passageway 454 exceeds a threshold), the valve 180 can be positioned in the service position or the drain position (discussed below) to allow, for instance, regeneration of the capacitive deionization device 12.

In the blend position, fluid remains inhibited from flowing from the valve chamber 44 into the drain passageway 448. Specifically, the tip seal surface 374 abuts with the internal seal 326B and the intermediate seal surface 386 abuts with the internal seal 326C.

FIGS. 20, 21, and 22 illustrate the control valve assembly 10 in a drain position. The drain position can be implemented to achieve a variety of functions, such as cleaning the manifold 98 and/or the fluid treatment device 12, regeneration of the fluid treatment device 12, and/or directing waste from the manifold 98 and/or the fluid treatment device 12. In the control valve assembly 10, the piston 264 is positioned to direct supply fluid into the capacitive deionization device 12 via the communication between the outlet port 40 in the valve body 38 and the treatment inlet port 18 in the capacitive deionization device 12, similar to the configuration illustrated for the off position. However, as shown in FIG. 22, the piston 264 has been slid or translated to generally position the intermediate flow zone 376 of the piston 264 adjacent to the internal seal 326B). As a result, fluid exiting the capacitive deionization device 12 and entering the manifold 98 via the inlet port 42 flows through the treated passageway 464 (even though the fluid may be waste fluid) where it is directed into and through the intermediate flow zone 376 toward the drain passageway 448. The relative positioning of the intermediate flow zone 376, and specifically the opposing beveled rims 378, 380 and the stepped rings 382, 384, can be altered to adjust the flow rate of fluid between the treated passageway 464 and the drain passageway 448.

The drain position, in addition to being usable during regeneration of the capacitive deionization device 12 or other water treatment device (e.g., a filter having a filter media), is also useable for cleaning and draining purposes. In some forms, the flow rate is adjusted to be above a minimum level required to prevent scaling and at or below a maximum level required to achieve the desired function (e.g., regeneration—flowing more fluid than required to regenerate the capacitive deionization device 12 is an inefficient use of fluid, which is preferably avoided).

Figure 23:
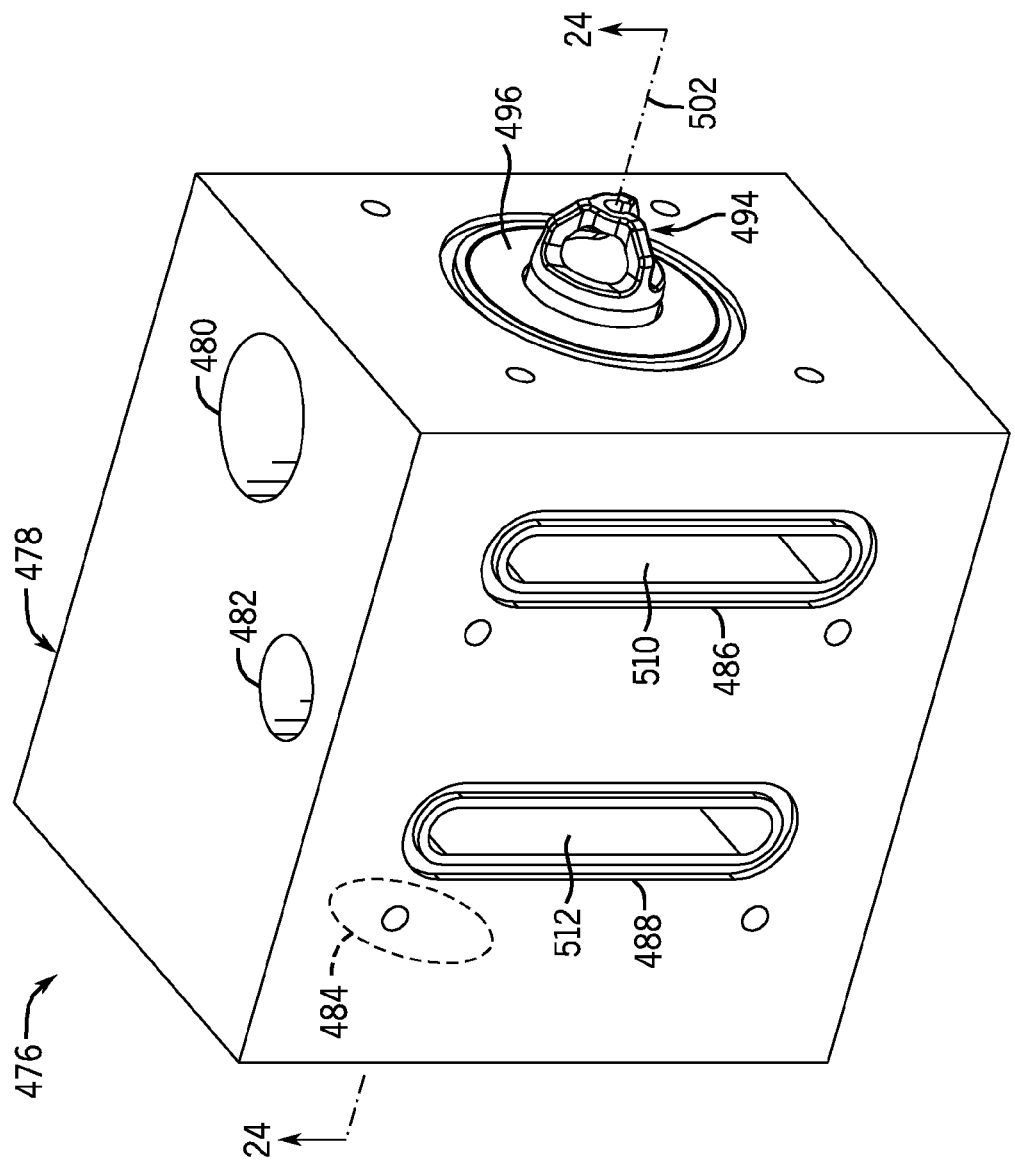
FIG. 23 is an isometric view of an alternative example control valve assembly.
Figure 24:
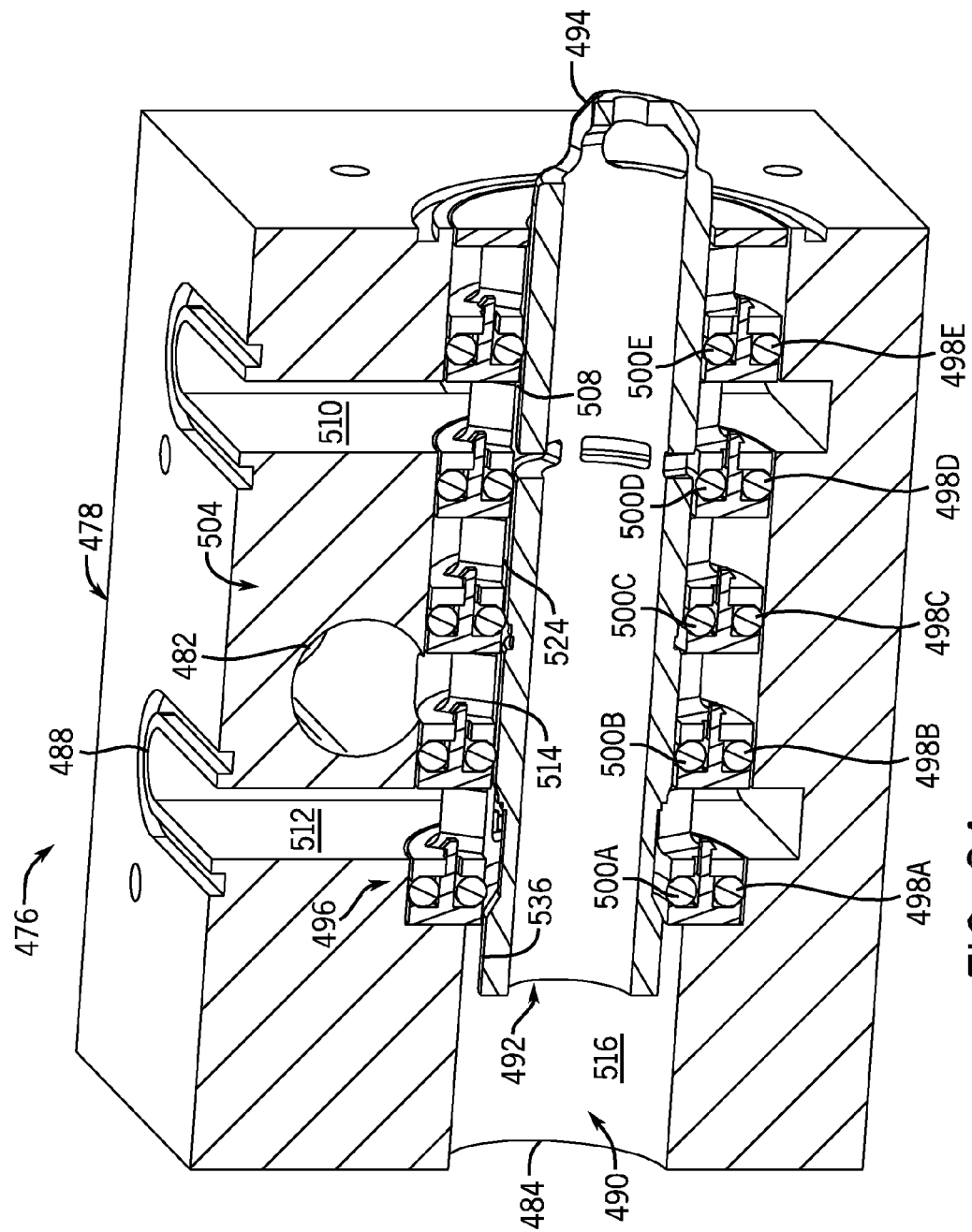
FIG. 24 is a partial section view along line 24-24 shown in FIG. 23 of the alternative example control valve assembly.

FIGS. 23-29 illustrate one alternative control valve assembly 476. As shown in FIGS. 23 and 24, the control valve assembly 476 includes a generally cubic valve body 478 defining a series of ports, including a supply port 480, a drain port 482, a service port 484, an outlet port 486, and an inlet port 488. A point of entry providing a supply fluid can be coupled in fluid communication with the supply port 480 and a point of use can be coupled in fluid communication with the service port 484. Also, the outlet port 486 and the inlet port 488 can be configured in fluid communication with respective inlet and outlet ports of a water treatment device (e.g., a capacitive deionization device). The control valve assembly 476 is configured to provide selective fluid communication to direct fluid (e.g., supply fluid, treated fluid, blended fluid, drain fluid) between desired ports and to establish multi-port blending.

A valve chamber 490 is formed within the valve body 478 to house a valve 492. The valve 492 includes a piston 494 slidably seated within a cartridge cage 496, which is seated within the valve chamber 490. The cartridge cage 496 further includes external seals 498 in engagement with the valve chamber 490 and internal seals 500 in engagement with the piston 494. As the piston 494 slides along a valve axis 502 within the valve chamber 490, the internal seals 500 wipe against the piston 494 to establish various flow passageways through a manifold 504 defined within the valve body 478. The piston 494 can be moved between various positions by a similar arrangement described above with reference to the piston 264 or by any other appropriate construction.

Figure 25:
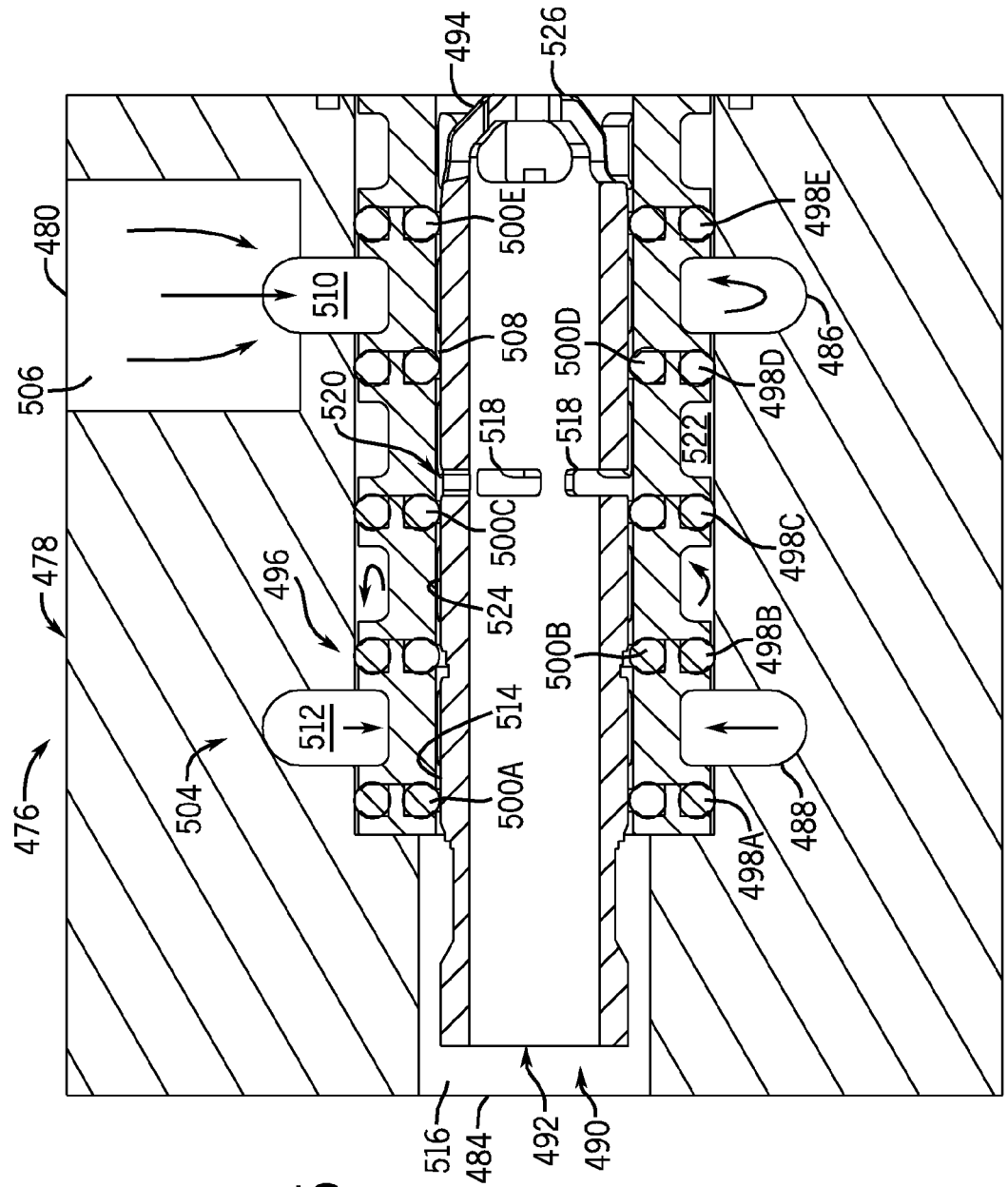
FIG. 25 is a partial section view of the alternative example control valve assembly in an off position.

FIG. 25 illustrates the alternative control valve assembly 476 in an off position at which fluid entering the inlet port 488 is inhibited from flowing out of the service port 484. Specifically, a supply fluid enters the supply port 480 and flows through a supply passageway 506 toward the valve chamber 490. The internal seals 500D, 500E seal against a base seal surface 508 of the piston 494 to inhibit supply fluid from entering the valve chamber 490. The supply fluid also flows along an elongated outlet passageway 510 to the coupled fluid treatment device. Fluid can enter the manifold 504 via the inlet port 488 where if flows along an inlet passageway 512 toward the valve chamber 490. However, sealing engagement between the internal seal 500A and a tip seal surface 514, and between the internal seal 500C and an internal seal surface 524 directs the fluid toward the drain port 482. Fluid within a service passageway 516 can flow through gaps 518 in a base flow zone 520 into a fluid receptacle 522, which is defined by internal seals 500C, 500D engaged with the internal seal surface 524 and the base seal surface 508, respectively. Fluid flowing toward a base end 526 of the piston 494 can be contained in a similar manner described with reference to the control valve assembly 10.

Figure 26:
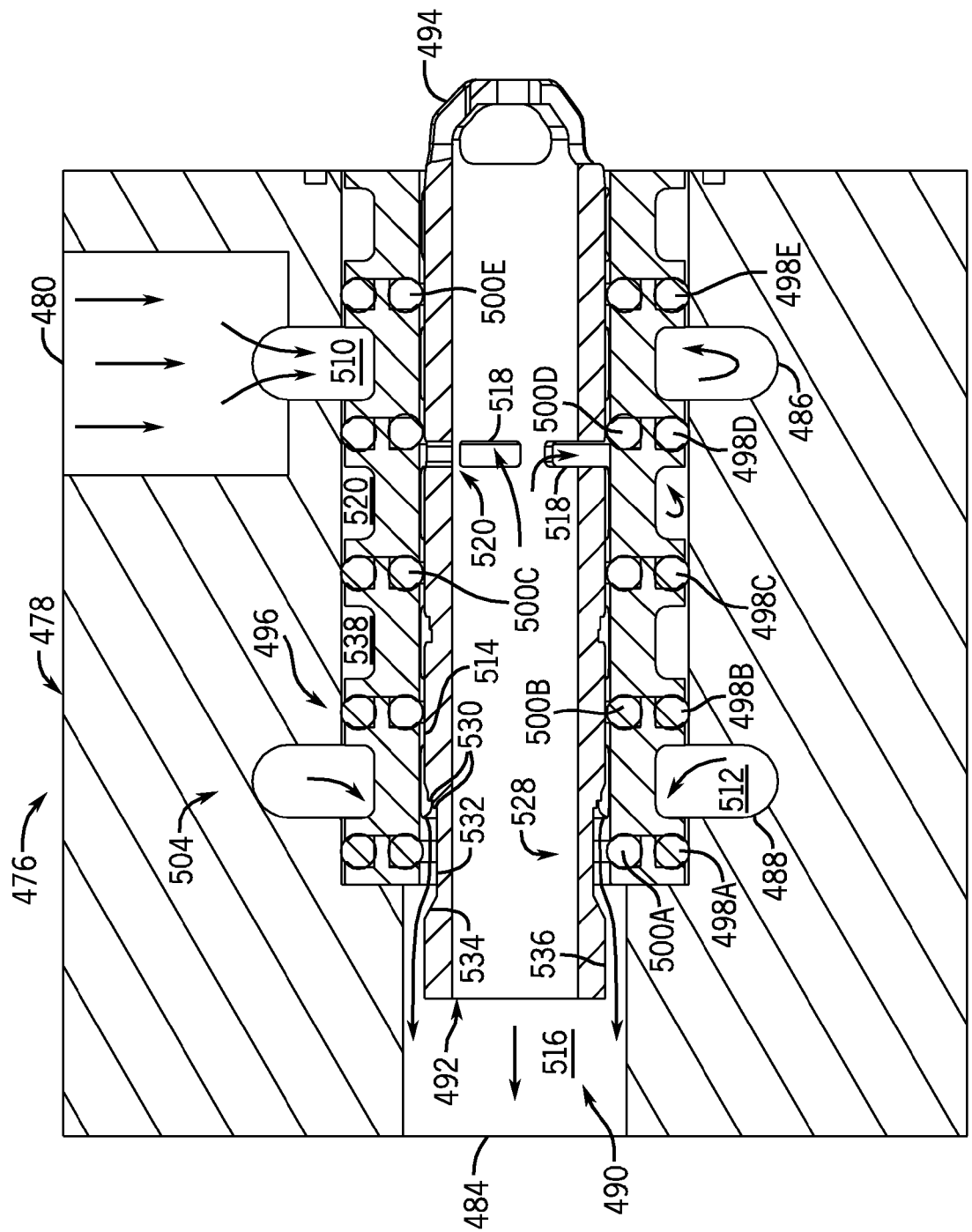
FIG. 26 is a partial section view of the alternative example control valve assembly in a service position.

FIG. 26 illustrates the control valve assembly 476 in a service position at which supply fluid is in fluid communication with the fluid treatment device and treated fluid is in fluid communication with the service port 484. Specifically, supply fluid is directed as described when the control valve assembly 476 is in the off position, but the piston 494 is moved to the position shown in FIG. 26. In the service position, treated fluid entering the inlet port 488 flows through the inlet passageway 512 to the valve chamber 490. The treated fluid then flows along a tip flow zone 528 between the piston 494 and the internal seal 500A into the service passageway 516. The tip flow zone 528 includes tapered steps 530 that transition to a necked portion 532 that can be positioned to adjust the flow rate of fluid passing through the tip flow zone 528. The necked portion 532 is adjacent to a beveled rim 534 that flares radially outward toward a bypass seal surface 536 (describe below). Internal seal 500B seals against the tip seal surface 514 to inhibit fluid from flowing along a drain passageway 538 to the drain port 482. Fluid flowing through the gaps 518 in the base flow zone 520 continues to be directed into the fluid receptacle 522.

Figure 27:
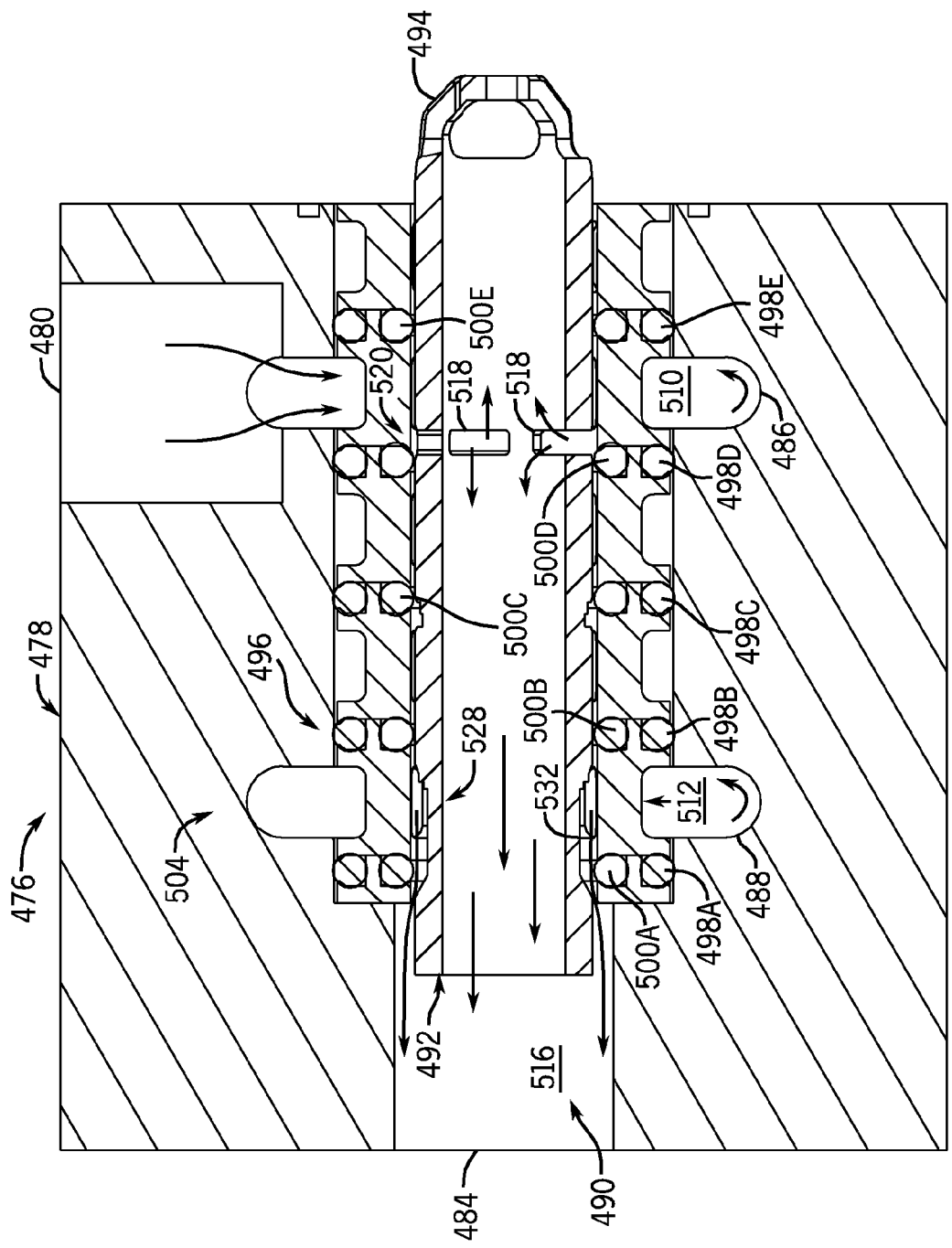
FIG. 27 is a partial section view of the alternative example control valve assembly in a blend position.

FIG. 27 illustrates the control valve assembly 476 in a blend position at which a blended fluid is directed from the service port 484. The piston 494 directs the supply fluid both through the outlet passageway 510 for treatment by the fluid treatment device and through the valve chamber 490 where it is mixed with treated water flowing through the inlet passageway 512. Specifically, supply fluid is directed through the gaps 518 in the base flow zone 520 toward the service passageway 516. Supply fluid is also directed along the outlet passageway 510, through the outlet port 486, and in to the fluid treatment device. Treated fluid from the fluid treatment device enters the valve body 478 via the inlet port 488 and flows along the inlet passageway 512 toward the valve chamber 490. In the blend position, the tip flow zone 528, specifically the necked portion 532, is positioned to extend across the internal seal 500A so that treated fluid can flow between the internal seal 500A and the necked portion 532 toward the service passageway 516. The treated fluid and the supply fluid mix to establish a blended fluid that then is directed from the service port 484.

Figure 28:
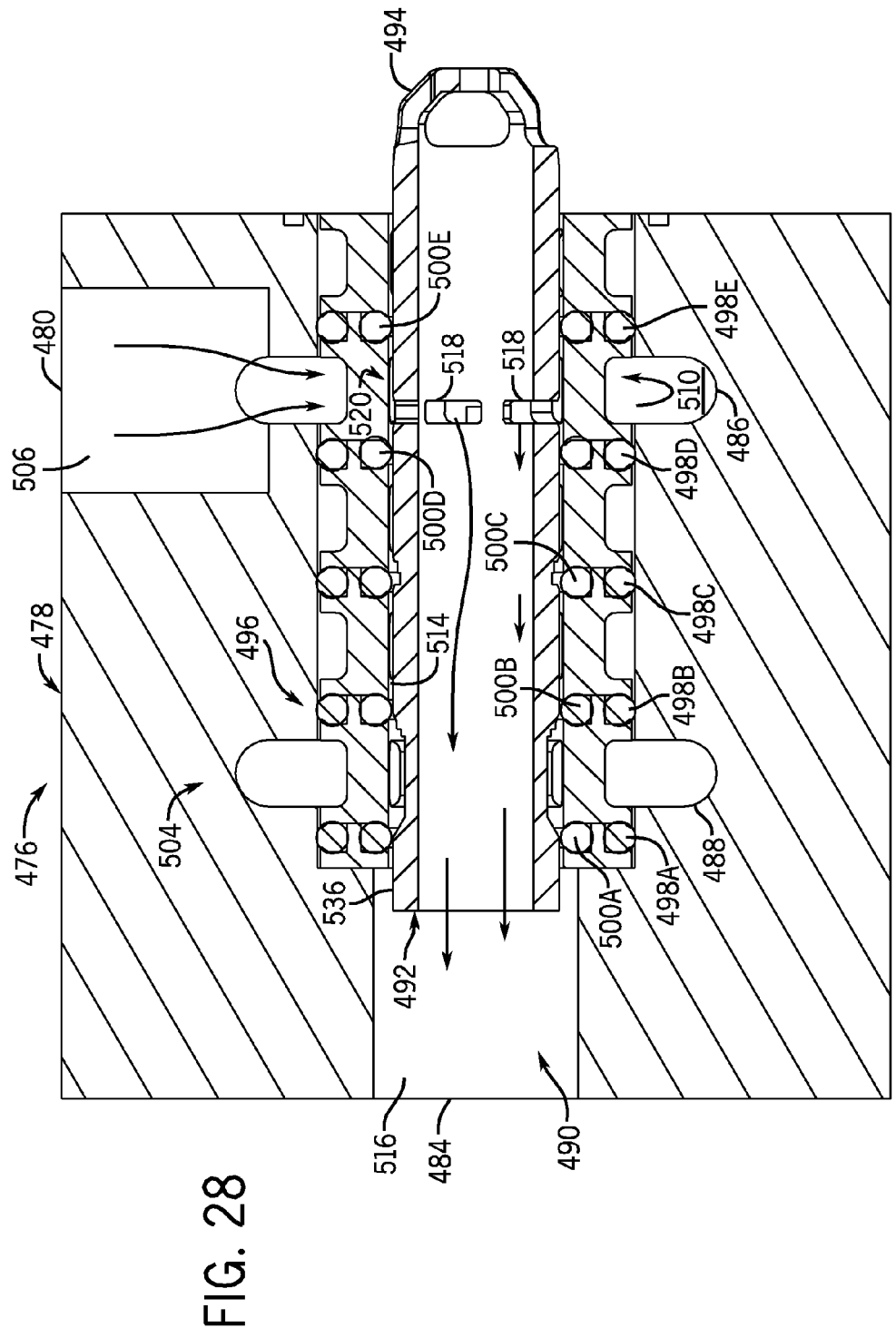
FIG. 28 is a partial section view of the alternative example control valve assembly in a bypass position.

The control valve assembly 476 further includes a bypass position (as shown in FIG. 28) at which supply fluid is directed from the supply port 480, through the valve chamber 490, and from the service port 484, without mixing with treated fluid provided by a fluid treatment device. The piston 494 is positioned so that the base flow zone 520 is adjacent to the supply passageway 506. Supply fluid flows through the gaps 518 and along the valve axis 502 toward the service passageway 516. Supply fluid can flow through the outlet passageway 510, however, internal seals 500A, 500B engage the bypass seal surface 536 and the tip seal surface 514, respectively, to inhibit treated fluid from entering the service passageway 516. As a result, the supply fluid bypasses the fluid treatment device and is directed downstream to the service port 484.

Figure 29:
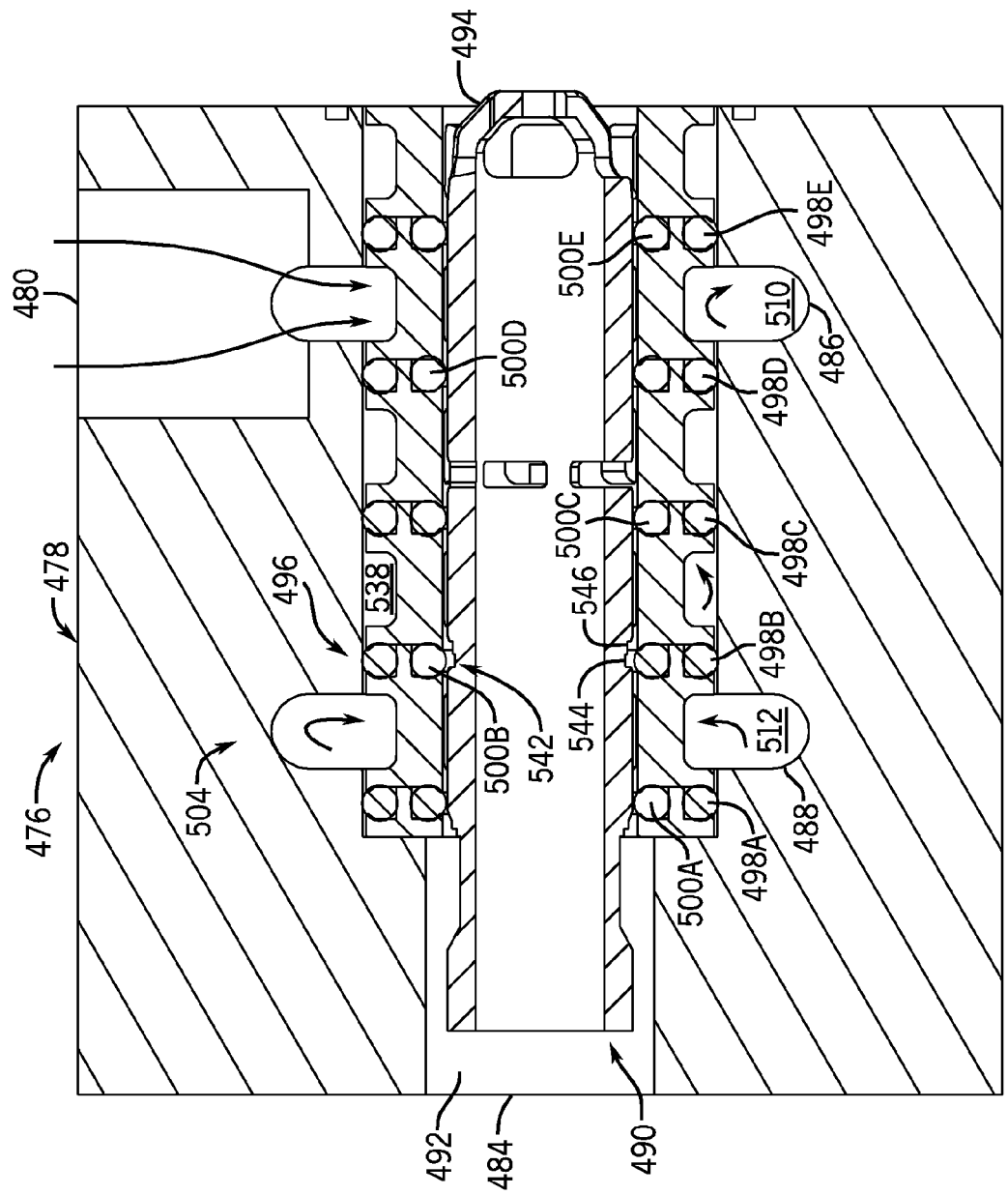
FIG. 29 is a partial section view of the alternative example control valve assembly in a drain position.

Similar to the control valve assembly 10, the control valve assembly 476 includes a drain position, as shown in FIG. 29. In the drain position, the control valve assembly 476 directs supply fluid though the outlet passageway 510 and directs fluid in the inlet passageway 512 through the valve chamber 490, to the drain passageway 538, and ultimately out of the drain port 482. Specifically, fluid enters the inlet port 488 and flows along the inlet passageway 512 to the valve chamber 490. The piston 494 is slid within the valve chamber 490 to the position shown in FIG. 29 to align an intermediate flow zone 542 and the internal seal 500B. The alignment results in fluid flowing between the piston 494 and the internal seal 500B toward the drain passageway 538 (as shown in FIG. 24). The intermediate flow zone 542 further includes stepped rings 544, 546 that can be positioned relative to the internal seal 500B to meter or adjust the flow of fluid as the size and form of the opening is altered.

Figure 30:
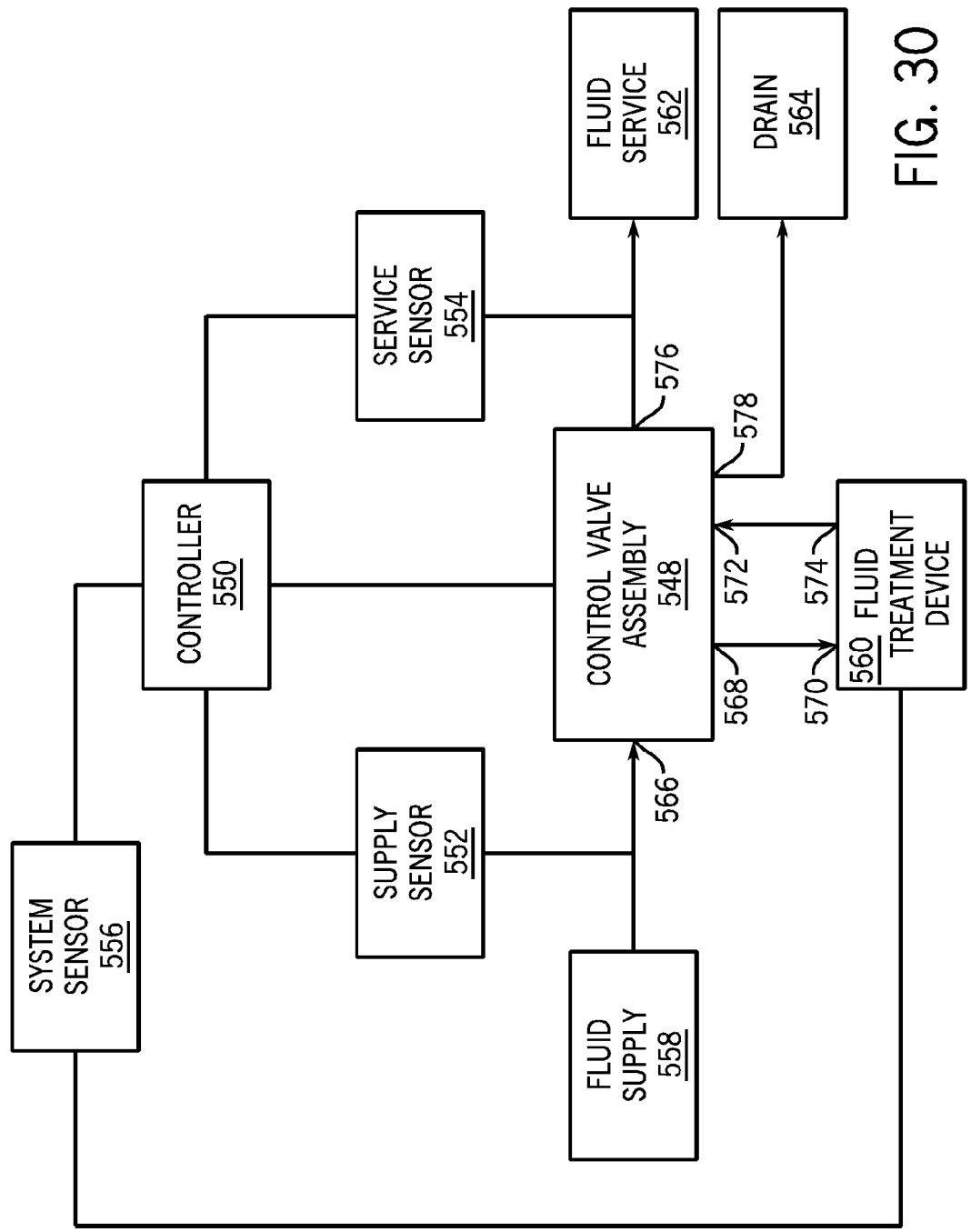
FIG. 30 is a schematic of an example fluid treatment system.

Operation of the control valve assembly concept (e.g., adjusting the position of the valve) can be partially or completely automated. FIG. 30 illustrates a control valve assembly 548 in communication with a controller 550 to control the movement of the control valve assembly 548 between various positions (e.g., an off position, a service position, a blend position, a bypass position, a drain position, etc.). While the controller 550 can operate without receiving parameters from sensors (e.g., such as by adjusting the position based on timers, temporal schedules, direct input from a user, etc.), the controller 550 is illustrated as being in communication with a supply sensor 552, a service sensor 554, and a system sensor 556.

The controller 550 is configured to adjust (e.g., translate) the control valve assembly 548 to direct fluid from and between a point of entry 558, a fluid treatment device 560, a point of use 562, and a drain 564. In particular, the control valve assembly 548 includes a supply port 566 in fluid communication with the point of entry 558, an outlet port 568 in fluid communication with a treatment inlet port 570, an inlet port 572 in fluid communication with a treatment outlet port 574, a service port 576 in fluid communication with the point of use 562, and a drain port 578 in communication with the drain 564. As one example adjustment, when the control valve assembly 548 is in the off position, the controller 550 can monitor the service sensor 554 (e.g., a pressure sensor) so that when the service pressure is below a minimum level (indicating that a demand for fluid exists), the controller 550 can adjust the control valve assembly 548 from the off position to the service position.

In one embodiment, the controller 550 can monitor the system sensor 556 for a parameter indicative of the fluid level or pressure in a treated water storage tank. If the controller 550 determines that the demand for treated water (as indicated by a low fluid level or low pressure within the treated water storage tank) exceeds the throughput capacity of the fluid treatment device 560, the controller 550 can adjust the valve to the blend position. Specifically, a motor can be operatively coupled to the valve and the controller 550. The controller 550 communicates with the motor to energize the motor and thus adjust the control valve assembly 548 to the blend position, or a particular position within a range of blend positions depending on the calculated fluid demand. In the blend position, both the supply fluid and the treated fluid are directed through the service port 576 so that a blended fluid (comprising the supply fluid and the treated fluid) is directed from the valve body to the point of use 562, either directly or indirectly via a treated water storage tank.

If the controller 550 determines that the blend position is still insufficient to meet or maintain current fluid demands, the controller 550 can adjust the control valve assembly 548 to the bypass position, so that supply fluid is routed from the supply port 566 to the service port 576, without being inhibited by the limited throughput of the fluid treatment device 560. Fluid communication with the fluid treatment device 560 can be restored, for instance, when the service sensor 554 (e.g., a flow meter) monitored by the controller 550 indicates a reduced demand that will allow the fluid treatment device 560 to again treat at least a portion of the supply fluid entering the control valve assembly 548.

Alternatively, the service sensor 554 can include a conductivity sensor providing a parameter indicative of the conductivity of the fluid flowing through the service port 576. If the controller 550 monitoring the service sensor 554 determines that the conductivity of the service fluid is outside of an acceptable range, the controller 550 can actuate the control valve assembly 548 to the blend position or the service position, in order to maintain the integrity of the service fluid at the expense of decreased fluid throughput. In another example, if the controller 550 monitoring the service sensor 554 determines that the conductivity of the service fluid is outside of an acceptable range, the controller 550 can determine that regeneration of the fluid treatment device 560 is required and move the control valve assembly 548 to the drain position.

In some embodiments, when the control valve assembly 548 is in the blend position, the supply sensor 552 connected to the controller 550 communicates a supply parameter to the controller 550, and the service sensor 554, which is also connected to the controller 550, communicates a service parameter to the controller 550. The controller 550 is configured to monitor the supply parameter and the service parameter of the blended fluid, and to determine or calculate a difference between the supply parameter and the service parameter. The difference is then compared to a threshold or desired level and the position of the control valve assembly 548 is adjusted to alter the blend position accordingly to target the threshold. In some forms, this logic can define a control loop carried out by the controller 550 as a technique to monitor and maintain the properties of the fluid exiting the control valve assembly 548 at a threshold, a level, or within a range.

The controller 550 can be configured to communicate with a variety of sensor types. For instance, the supply sensor 552, the service sensor 554, and the system sensor 556 can include one or more of the following types of sensors: a system temperature sensor (e.g., to sense the ambient temperature), a system pressure sensor (e.g., to sense the pressure within a system storage tank), a system fluid volume sensor (e.g., to sense the fluid volume or level within a system storage tank), a fluid temperature sensor (e.g., to sense the temperature of the supply fluid), a flow sensor (e.g., to sense the flow rate of fluid entering or exiting the control valve assembly 548), a flow pressure sensor (e.g., to sense the pressure of the fluid entering or exiting the control valve assembly 548), a conductivity sensor (e.g., to sense the conductivity of the fluid flowing through the control valve assembly 548), and a pH sensor (e.g., to sense the pH of the fluid flowing through the control valve assembly 548).

In some embodiments, the controller 550 can monitor the sensors and adjust the position of the control valve assembly 548 in response to the sensed parameters. For instance, the controller 550 can monitor an ambient temperature sensor and adjust the control valve assembly 548 from an off position to a drain position if the ambient temperature exceeds a threshold, in order to use the supply fluid as a heat sink to extract heat from the control valve assembly 548 and/or the fluid treatment device 560. In other embodiments, the controller 550 can monitor a temperature of the supply fluid and adjust the control valve assembly 548 if the temperature of the supply fluid exceeds a threshold, in order to prevent supply fluid having an excessive temperature from flowing through the fluid treatment device 560 and potentially damaging the fluid treatment device 560. In yet other embodiments, the controller 550 can monitor a flow meter for a parameter indicative of slow supply fluid flow or fast service fluid flow, and adjust the position of the control valve assembly 548 to direct additional fluid through the control valve assembly 548 as needed. The parameter can also be indicative of a no flow condition, at which power to the fluid treatment device 560 can be reduced or turned off until fluid demand is again indicated.

Figure 31:
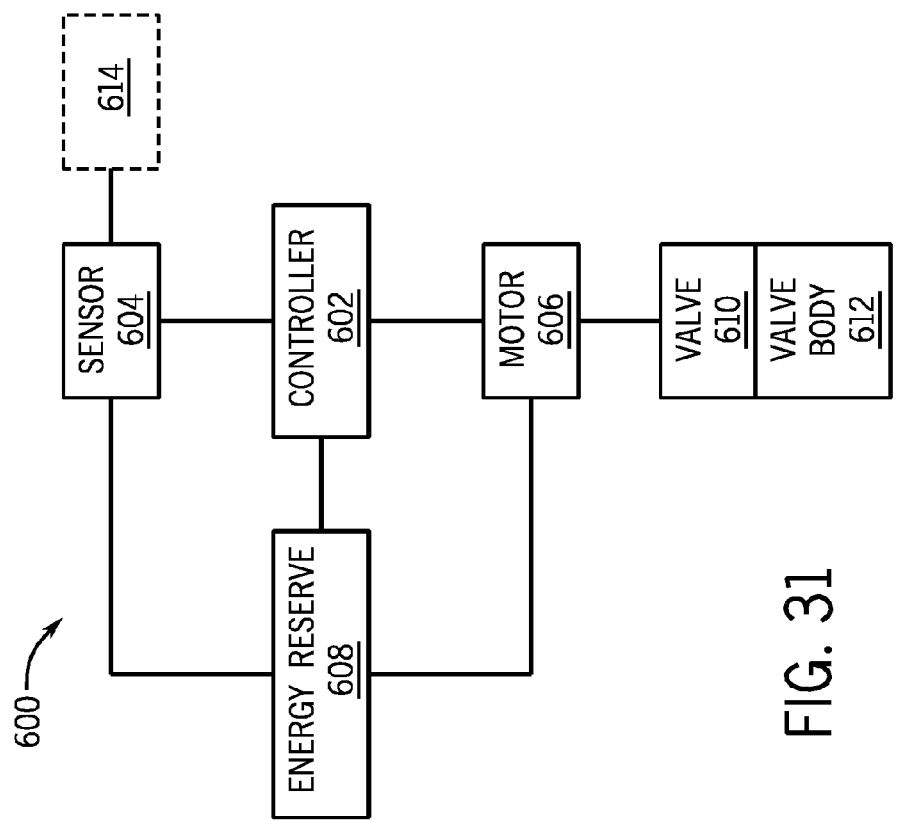
FIG. 31 is a schematic of an example control valve assembly.

FIG. 31 shows a simplified schematic of another embodiment of a control valve assembly 600. A controller 602 is in communication with a sensor 604, a motor 606, and an energy reserve 608. The motor 606 is coupled to a valve 610 that is seated within a valve body 612. Energizing the motor 606 can selectively move the valve 610 between an operating position and a fault position. In the operating position, the control valve assembly 600 can be in, for instance, the service position, the blend position, the bypass position, or the drain position discussed above. Similarly, depending on the application requirements, the fault position can be, for instance, the off position, the service position, the blend position, the bypass position, or the drain position. The position of the valve 610 that is associated with the operating position and the service position can be selected depending on, for instance, the type of water treatment system the control valve assembly 600 is coupled to and/or the type of fault condition encountered by the control valve assembly 600.

The energy reserve 608 is shown operationally coupled to the controller 602, the sensor 604, and the motor 606. As a result, the energy reserve 608 can provide energy to operate the coupled devices if the control valve assembly 600 experiences a fault condition in the form of a line energy loss (e.g., line power to the controller 602 is interrupted temporarily or for an extended period). The energy reserve 608 can include various energy storage devices, such as a battery or a capacitor that are of sufficient capacity (e.g., amp-hours) to power at least one of the controller 602, the motor 606, and the sensor 604 to move the valve 610 to the desired fault position after a loss of line energy.

The sensor 604 can be any suitable type of sensor (e.g., a line energy sensor, a valve position sensor, a temperature sensor, a flow sensor, a current sensor, a pressure sensor, etc.) that senses some property 614 of the control valve assembly 600 or the overall water treatment system that the control valve assembly 600 is integrated into. The controller 602 monitors the sensor 604 to receive a fault signal from the sensor 604 that indicates a fault condition of the control valve assembly 600 or the overall water treatment system. In response to the fault signal, the controller 602 can energize the motor 606 (e.g., an electric motor or a hydraulically actuated motor) to drive the valve 610 to the fault position.

In one embodiment, the sensor 604 can be a conductivity sensor that provides a fault signal when the conductivity sensor fails to communicate (or indicates a fault in the conductivity sensor). The controller 602, in response to the fault signal, actuates the motor 606 to drive the valve 610 to the blend position (i.e., one type of fault position), and can also indicate (e.g., via a display, audible tone, etc.) that a fault of the control valve assembly 600 has occurred. In the blend position, a blended fluid including the supply fluid and the treated fluid is directed from the valve body 612 to the point of use.

In another embodiment, the sensor 604 can include a line energy sensor that provides a fault signal indicative of a loss of line energy to the control valve assembly 600. The energy reserve 608 can be electrically integrated to provide near continuous (i.e., substantially uninterrupted) power to the controller 602, the sensor 604, and the motor 606. In response to the fault signal, the controller 602 can control the motor 606 to drive the valve 610 to the fault position, such as a bypass position, by drawing on power supplied by the energy reserve 608. When line energy to the control valve assembly 600 is interrupted, the control valve assembly 600 can be moved to the bypass position via energy provided by the energy reserve 608, so that fluid can pass through the control valve assembly 600 to the point of use even if the control valve assembly 600 is without line power.

While FIG. 31 schematically shows the energy reserve 608 and the sensor 604 as separate from the controller 602, one or both can be integral with the controller 602. In one embodiment, the energy reserve 608 is integral with the controller 602 (e.g., an on-board capacitor or battery). Other embodiments of the control valve assembly 600 include a motor having a sensor (e.g., a Hall effect sensor) that is in communication with the controller 602 and also operationally coupled to the energy reserve 608. The controller 602 can monitor the sensor to adjust the position of the valve 610 from an operating position to the desired fault position, even in situations of line energy loss.

Figure 32:
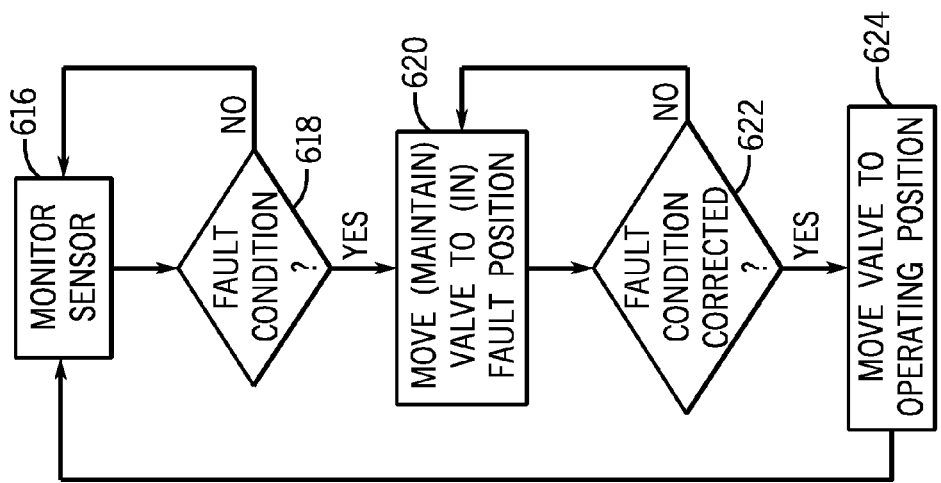
FIG. 32 is a flow chart illustrating operation of an example control valve assembly.

FIG. 32 is a flow chart showing an example fault control loop executed by the controller 602. The controller 602 monitors the sensor 604 at Step 616 for a fault signal indicating a fault condition (e.g., excess motor temperature, line energy loss, no fluid flow, etc.). If no fault condition is identified at Step 618, the controller 602 returns to monitoring the sensor 604 for a fault signal at Step 616. If a fault condition is identified at Step 618, the controller 602 moves the valve 610 to the fault position at Step 620. The fault position can be predetermined or selected in accordance with logic that factors the specific type of water treatment device and the instant fault condition. The controller 602 can adjust the position of the valve 610 by energizing the motor 606 to drive the valve 610 from the operating position to the appropriate fault position.

At Step 622, the controller 602 continues to monitor the sensor 604 to determine if the fault condition has been corrected. If the fault condition remains, the valve 610 is maintained in the fault position. If the fault condition was indicative of a loss of line energy, the controller 602 can be configured to shut down once the valve 610 is in the fault position (e.g., the bypass position). If the fault condition has been corrected, the controller 602 can be configured to move the valve 610 to the operating position at Step 624. The controller 602 then resumes monitoring the sensor 604 at Step 616. The fault condition may also be remedied with user interaction. For instance, the controller 602 can include a display that provides information regarding the fault condition and an input device that requires that a user acknowledge or take additional action to remedy the fault before the controller 602 resumes operation of the control valve assembly 600.

In some embodiments, the controller 602 can compare a current position of the valve 610 to the desired fault position (e.g., a blend position) and adjust the position of the valve 610 from the current position to the fault position. The controller 602 can monitor the current position of the valve 610 using various techniques, including a magnetic pickup with pulses corresponding to linear movement of the valve 610, optical sensors, and other position sensors.

The controller 602 can also include application-specific logic that is tailored to the type of system (e.g., electrochemical deionization device, capacitive deionization device, water softener, water filter, etc.) that the control valve assembly 600 is in communication with. For instance, if the system includes an electrochemical deionization device and the fault condition indicates a line energy loss, the controller 602 can control the motor 606 to move the valve 610 to the bypass position to allow supply fluid to flow uninhibited through the control valve assembly 600 to the point of use. Alternatively, if the system includes a water filter, the controller 602 can control the motor 606 to move the valve 610 to a service position when a jammed valve 610 fault condition is indicated in order to maintain some level of filtration.

The sensor 604 can be monitoring a variety of aspects of the overall water treatment system. For instance, the sensor 604 can include a flow meter within the valve body 612, at the point of entry, or at the point of use that can be monitored by the controller 602 to determine if there is an unexpected flow of fluid (e.g., flow to the point of use when the valve 610 is in the off position). In another embodiment, the controller 602 may include a timer that monitors the elapsed time to move the valve 610 a full stroke or cycle. This elapsed time can be compared to a predetermined or a typical elapsed time. If the monitored time exceeds the expected time, a fault condition (e.g., indicative of a binding/jammed valve, a motor fault, etc.) can result in the controller 602 moving the valve 610 to the associated fault position (e.g., the off position) where the control valve assembly 600 can be serviced.

In other embodiments, the controller 602 can move the valve 610 to a nominal position at the beginning of a cycle (e.g., at initial power up of the control valve assembly 600, after a drain cycle, etc.). The controller 602 can then move the valve 610 to a first position while monitoring the sensor 604. For instance, the controller 602 may monitor a flow meter and control the motor 606 to drive the valve from an off position to a service position. If the controller 602 receives a fault signal from the flow meter (e.g., a no-flow signal), despite the presumed movement of the valve 610 into the service position, the controller 602 can move the valve 610 to a fault position (e.g., an off position). The communication between the controller 602 and the sensor 604 allows the control valve assembly 600 to establish the desired operating conditions and provides a point of reference to allow the valve 610 to be positioned for flow control, which benefits from accurate positioning. The controller 602 can also be programmed to recalibrate the position of the valve 610 at specific times or intervals (e.g., number of cycles, point in cycle, etc.).

Figure 33:
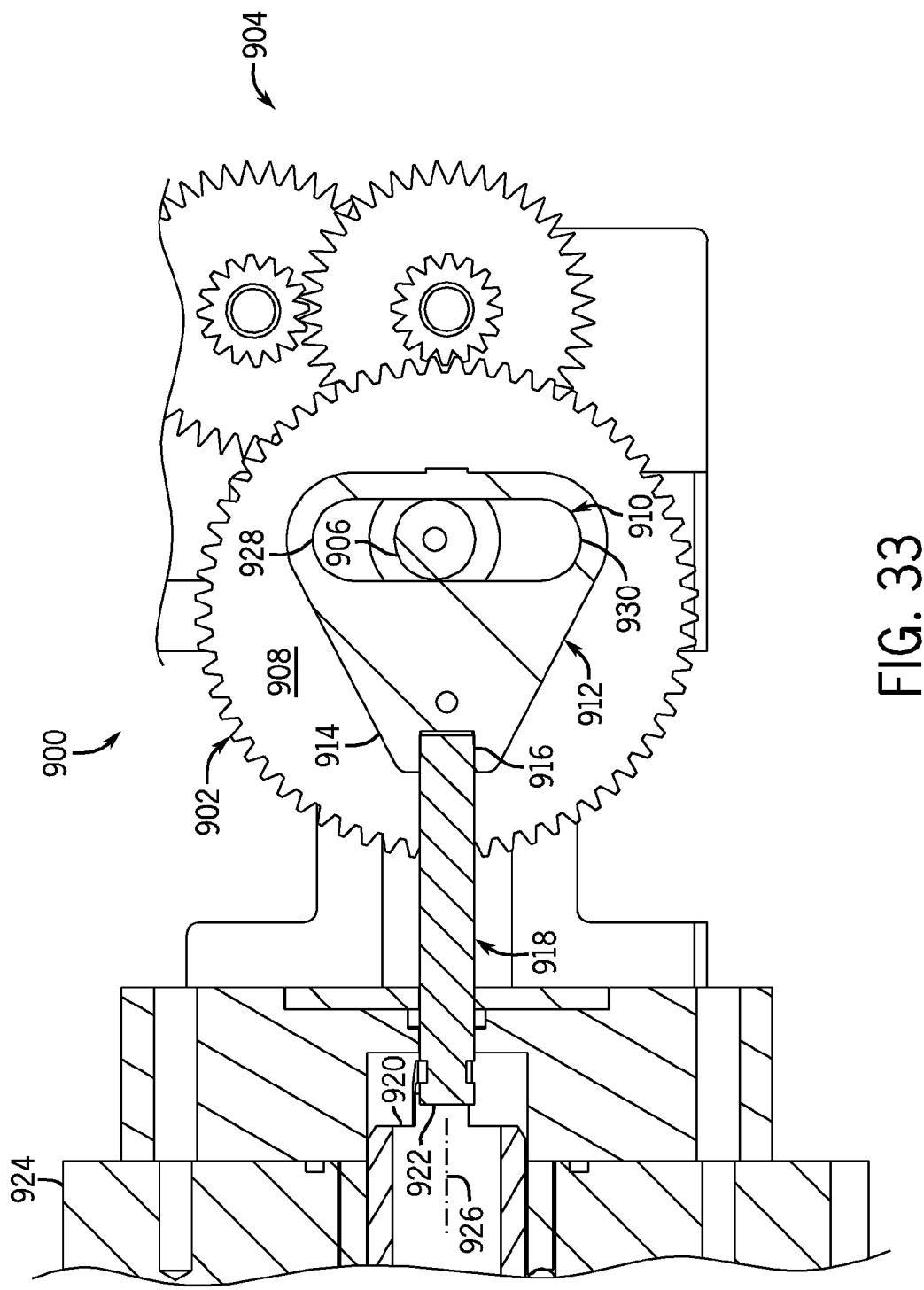
FIG. 33 is a partial cross section view of an alternative motor configuration.

In some alternative embodiments a control valve assembly can incorporate multiple valves, with one valve being adjusted to direct the flow of fluid and another valve being adjusted to influence the flow rate of the fluid. FIG. 33 illustrates an alternative drive configuration. An eccentric drive arrangement 900 includes a drive gear 902 that is engaged by, for example, an electric motor via a gear train 904. The drive gear 902 includes an eccentric mount 906 that protrudes from a side face 908 of the drive gear 902. The eccentric mount 906 is sized to slidably engage a slot 910 formed in a triangular yoke 912. A tapered end 914 of the yoke 912 is fixed coupled to an end 916 of a rod 918. A piston 920 is engaged with an opposite end 922 of the rod 918.

The mechanics of the eccentric drive arrangement 900 cause translation of the piston 920 in response to rotation of the drive gear 902. Specifically, as the eccentric mount 906 on the drive gear 902 traverses a circular path relative to a stationary valve body 924, the yoke 912 is translated along a valve axis 926 as the eccentric mount 906 oscillates between ends 928, 930 of the slot 910. The translation of the yoke 912 results in translation of the attached rod 918 and piston 920, allowing the position of the piston 920 to be adjusted. Alternative motors can also be incorporated into the control valve assembly concept. For instance, hydraulically actuated motors (e.g., chambers and bellows) can be configured to move a piston of an alternative control valve assembly.

Figure 34:
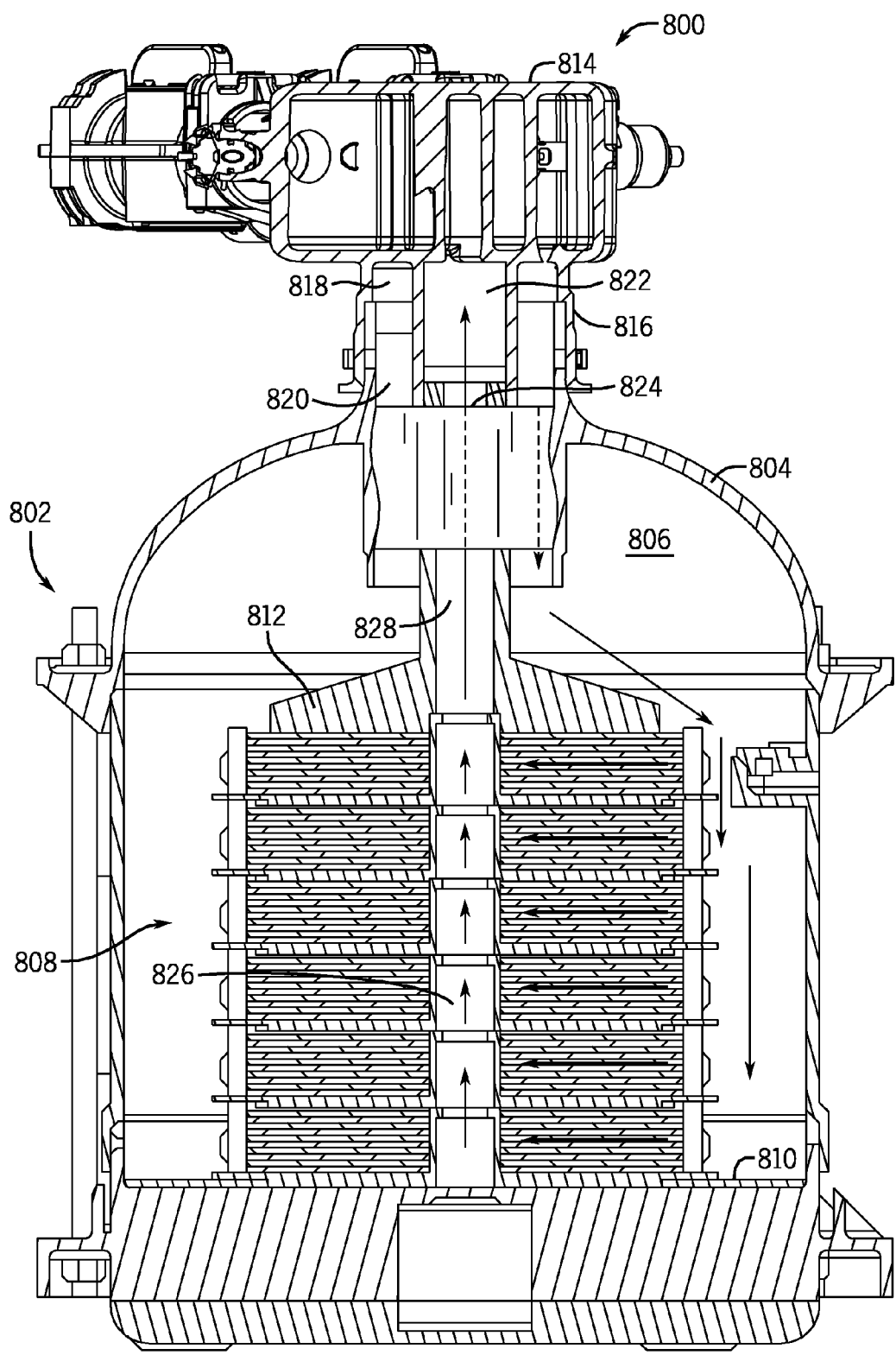
FIG. 34 is a partial section view of an example capacitive deionization device including an example control valve assembly.

FIG. 34 shows an embodiment of a control valve assembly 800 mounted to an embodiment of a capacitive deionization device 802. Similar to the control valve assembly 10, the control valve assembly 800 is in fluid communication with the capacitive deionization device 802. The capacitive deionization device 802 includes a vessel 804 that defines a chamber 806. A series of flow-through capacitors 808 are seated within the chamber 806 on a floor 810 of the chamber 806. The series of flow-through capacitors 808 are compressed between the floor 810 and a compression element 812.

The flow-through capacitor 808 includes a stack of individual fluid processing cells. Each cell in the stack includes one or more of a combination of the following elements: electrode pairs, cation membranes, anion membranes, and flow spacers, which are typically made of a plastic mesh. While the cation and anion membranes may be used to provide improved attachment and storage of the constituents on the electrodes, the membranes are not required and the cells can be manufactured without them. Additionally, the electrode may be constructed to have a two-part electrode construction including a carbon adsorptive electrode layer and a current collector.

In the embodiment shown in FIG. 34, each of these cell elements is in the form of a relatively thin layer (with a central opening) that is disposed in parallel with the other layers and stacked upon one another in a repeating pattern of first electrode/cation membrane/spacer/anion membrane/second electrode/anion membrane/spacer/cation membrane. After the last cation membrane, there can be another first electrode and the pattern can be repeated. Since any flux of charged constituents occurs as the result of a voltage difference created between the first and the second electrodes, electrode layers can form the bottommost and topmost layers of the stack.

The flow-through capacitor 808 includes many electrode pairs. In one embodiment, each electrode pair includes a first electrode (which during treatment acts as a cathode) and a second electrode (which during treatment acts as an anode). The electrodes may be constructed from high-surface area electrically conducting materials such as, for example, activated carbon, carbon black, carbon aerogels, carbon nanofibers, carbon nanotubes, graphite, graphene, or mixtures thereof. In some embodiments, the electrodes can be placed as a separate layer on top of a current collector or can alternatively be coated directly onto the current collector. The electrodes are configured and electrically connected relative to each other to establish a voltage difference or potential there between. The first electrodes in the flow-through capacitor 808 can be connected to one another and are then connected to a power supply. Similarly, the second electrodes in the flow-through capacitor 808 can be connected to one another and are then connected to the power supply. The electrodes can be connected to one another at their outer edges using peripheral tabs that contact one another or using other forms of connection. The stack can be arranged so that nearest neighbor electrodes will be of different kinds (i.e., the first electrodes will be disposed between the second electrodes and vise-versa). In some embodiments, the various electrode sets may be interleaved with one another and arranged so as to place multiple electrode pairs in series with one another.

Regardless of the specific electrical arrangement and connectivity of the electrodes, during operation these first and second electrodes can be differently charged from one another to establish a voltage potential across the electrodes pairs. This voltage potential can be used to either draw charged constituents out of the fluid toward the electrodes (such as during treatment) or release the collected constituents back into the fluid (such as during regeneration, discharge, or cleaning). Cation membranes and anion membranes are positioned adjacent to the first electrode and the second electrode, respectively. The cation membrane and the anion membrane act as charge barriers that can be placed between the electrodes and the centrally-disposed flow spacer. The term "charge barrier" as used herein refers to a layer of material that can hold an electric charge and that is permeable or semi-permeable for ions. Ions with the same charge signs as that in the charge barrier cannot pass through the charge barrier to the corresponding electrode. As a result, ions that are present in the electrode compartment adjacent to the charge barrier and that have the same charge sign as the charge in the charge barrier are at least temporarily retained or trapped in the electrode compartment. A charge barrier may allow an increase in ion removal efficiency as well as a reduction in the overall energy consumption for ion removal.

The plastic mesh flow spacer is disposed between the cation membrane and the anion membrane (and the corresponding electrode pair). This mesh spacer has a pattern similar to a window screen and also has some sections that are thicker than others sections in the height dimension (the height dimension is generally perpendicular to the direction of flow through the spacers) so that, when the spacer layer is lightly compressed between two other layers (e.g., the cation membrane and the anion membrane) fluid is able or permitted to flow across the spacer layer and between the corresponding pairs of electrodes.

A flow-through capacitor will likely include tens or hundreds of electrode pairs to provide an appropriate amount of surface area for deionization of a usable amount of treated fluid. Moreover, as shown in FIG. 34, multiple modules or trays of cell components can be constructed containing a number of electrode pairs that are stacked on one another and the trays separately or aggregately compressed. Additionally, the various layers of the stack are compressed to control the amount of space between the cell components, thereby establishing a cross-section area through which the fluid can flow through the stack. This compression may be done in a number of ways. In one embodiment, a pressure plate (e.g., compression element 812) at the top of the flow-through capacitor can compress the cell components or layers in a direction perpendicular to the direction of fluid flow through the stack. A pressure plate can apply a variable compressive force by mechanical fastening (e.g., employing a threaded screw element which may be tightened or loosened to adjust compressive force). In other embodiments, the stack may be divided into multiple portions with each portion being separately compressible.

The control valve assembly 800 shown in FIG. 34 includes a valve body 814 with a collar 816 that is mounted on the vessel 804. An outlet port 818 of the control valve assembly 800 is in fluid communication with a treatment inlet port 820 of the capacitive deionization device 802, and an inlet port 822 is in fluid communication with the treatment outlet port 824 of the capacitive deionization device 802.

When the control valve assembly 800 is in the service position or the blend position, supply fluid flowing from the control valve assembly 800 flows through the outlet port 818, into the treatment inlet port 820, and into the chamber 806 of the vessel 804. The supply fluid flows radially inward through the flow-through capacitors 808 toward a central column 826. Treated fluid then flows along the central column 826 a toward passageway 828 formed through the compression element 812. The passageway 828 defines the treatment outlet port 824 that is in fluid communication with the inlet port 822 of the control valve assembly 800. Treated fluid flows into the inlet port 822 and is directed through the control valve assembly 800 to the point of use. In some instances or operational cycles, fluid can be directed through the flow-through capacitor 808 in a reverse direction. In some embodiments, to achieve a desired flow pattern within the flow-through capacitor 808, there can be multiple water inlets or structures that promote an even or otherwise desirable fluid flow pattern through the flow spacers in the stack. There can be additional structural elements that are used to position, electrically connect, and/or compress some or all of the cell elements in the stack.

It will be appreciated by those skilled in the art that while the invention has been described above in connection with particular embodiments and examples, the invention is not necessarily so limited, and that numerous other embodiments, examples, uses, modifications, and departures from the embodiments, examples, and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:
1. A control valve assembly comprising:
a controller;
a valve body;

a valve seated within the valve body and movable between an operating position and a fault position;
a motor in communication with the controller and coupled to the valve to move the valve between the operating position and the fault position; and
a sensor in communication with the controller, the sensor providing a fault signal to the controller indicating a fault condition of the control valve assembly;
the controller operating the motor to drive the valve to the fault position in response to the fault signal, the controller monitoring the sensor during the fault condition and operating the motor to drive the valve to the operating position if the fault condition has been corrected.

2. The control valve assembly of claim 1 and further comprising an energy reserve coupled to at least one of the controller and the motor.

3. The control valve assembly of claim 2 wherein:
the energy reserve is at least one of a battery and a capacitor; and
the motor is at least one of an electrically actuated motor and a hydraulically actuated motor.

4. The control valve assembly of claim 2 wherein the energy reserve and the sensor are integral with the controller.

5. The control valve assembly of claim 1 and further comprising an energy reserve coupled to the controller and the motor; and wherein the fault signal indicates a line energy loss to the control valve assembly and the energy reserve supplies energy to the controller and the motor so that the controller controls the motor to drive the valve to the fault position.

6. The control valve assembly of claim 1 wherein the sensor is at least one of a line energy sensor, a valve position sensor, a temperature sensor, a flow sensor, a motor current sensor, and a pressure sensor.

7. The control valve assembly of claim 1 wherein the fault position is one of an off position, a bypass position, a service position, a blend position, and a drain position.

8. A control valve assembly capable of being in fluid communication with a point of entry, a point of use, and a fluid treatment device, the point of entry providing a supply fluid, the fluid treatment device including a treatment inlet port for receiving the supply fluid and a treatment outlet port for supplying a treated fluid, the assembly comprising:
a controller;
a valve body including
a supply port in fluid communication with the point of entry to direct the supply fluid from the point of entry to the valve body;
an outlet port in fluid communication with the treatment inlet port to direct the supply fluid from the valve body to the fluid treatment device;
an inlet port in fluid communication with the treatment outlet port to direct the treated fluid from the fluid treatment device to the valve body; and
a service port in fluid communication with the point of use to direct at least one of the supply fluid and the treated fluid from the valve body to the point of use;
a valve seated within the valve body and movable between an operating position and a fault position;
a motor in communication with the controller and coupled to the valve to move the valve between the operating position and the fault position; and
a sensor in communication with the controller and providing a fault signal to the controller indicating a fault condition of the control valve assembly;
the controller operating the motor to drive the valve to the fault position in response to the fault signal, the controller monitoring the sensor during the fault condition and operating the motor to drive the valve to the operating position if the fault condition has been corrected.

9. The control valve assembly of claim 8 wherein the operating position includes a blend position at which both the supply fluid and the treated fluid are directed through the service port so that a blended fluid including the supply fluid and the treated fluid is directed from the valve body to the point of use.

10. The control valve assembly of claim 8 and further comprising an energy reserve coupled to at least one of the controller and the motor.

11. The control valve assembly of claim 10 wherein:
the energy reserve is at least one of a battery and a capacitor;
the motor is at least one of an electrically actuated motor and a hydraulically actuated motor; and
the energy reserve and the sensor are integral with the controller.

12. The control valve assembly of claim 8 and further comprising an energy reserve coupled to the controller and the motor; and wherein the fault signal indicates a line energy loss to the control valve assembly and the energy reserve supplies energy to the controller and the motor so that the controller controls the motor to drive the valve to the fault position.

13. The control valve assembly of claim 8 wherein the sensor is at least one of a line energy sensor, a valve position sensor, a temperature sensor, a flow sensor, a motor current sensor, and a pressure sensor.

14. The control valve assembly of claim 8 wherein the fault position is one of an off position, a bypass position, a service position, a blend position, and a drain position.

15. An electrochemical deionization system including an electrochemical deionization device between a point of entry and a point of use, the system comprising:
a controller;
a valve body coupled to the electrochemical deionization device;
a valve movably positioned inside the valve body, the valve having an operating position and a fault position;
a sensor in communication with the controller, the sensor providing a fault signal to the controller indicating a fault condition of the electrochemical deionization system; and
a motor in communication with the controller and coupled to the valve to move the valve between the operating position and the fault position in response to the controller receiving the fault signal from the sensor, the controller monitoring the sensor during the fault condition and operating the motor to drive the valve to the operating position if the fault condition has been corrected.

16. The system of claim 15 and further comprising an energy reserve coupled to at least one of the controller and the motor.

17. The system of claim 16 wherein:
the energy reserve is at least one of a battery and a capacitor; and
the motor is at least one of an electrically actuated motor and a hydraulically actuated motor.

18. The system of claim 16 wherein the energy reserve and the sensor are integral with the controller.

19. The system of claim 15 and further comprising an energy reserve coupled to the controller and the motor; and wherein the fault signal indicates a line energy loss to the controller and the energy reserve supplies energy to the controller and the motor so that the controller controls the motor to drive the valve to the fault position.

20. The system of claim 15 wherein the sensor is at least one of a line energy sensor, a valve position sensor, a temperature sensor, a flow sensor, a motor current sensor, and a pressure sensor.

21. The system of claim 15 wherein the fault position is one of an off position, a bypass position, a service position, a blend position, and a drain position.

22. A method of fault detection for a control valve assembly providing fluid from a point of entry to a point of use, the method comprising:
  monitoring a sensor for a fault signal indicating a fault condition;
  adjusting a position of a valve within a valve body between an operating position and a fault position in response to the fault signal;
  monitoring the sensor during the fault condition for the fault signal; and
  adjusting the position of the valve within the valve body from the fault position to the operating position if the fault condition has been corrected.

23. The method of claim 22 and further comprising monitoring the sensor and energizing a motor coupled to the valve to adjust the position of the valve between the operating position and the fault position in response to the fault signal.

24. The method of claim 23 and further comprising supplying an energy reserve coupled to the motor so that when the fault signal indicates a line energy loss the energy reserve supplies energy to the motor to drive the valve to the fault position.

25. The method of claim 22 and further comprising shutting down the control valve assembly when the valve is in the fault position.

26. The method of claim 22 and further comprising comparing a current position of the valve to the fault position and adjusting the position of the valve to the fault position.

27. The method of claim 22 and further comprising adjusting the valve to the fault position includes adjusting the valve to one of a service position, a blend position, a bypass position, and a drain position.

28. The method of claim 27 and further comprising adjusting the valve to the bypass position when the fault condition is a line energy loss to the control valve assembly.

29. A control valve assembly capable of being in fluid communication with a point of entry, a point of use, and a fluid treatment device, the point of entry providing a supply fluid, the fluid treatment device including a treatment inlet port for receiving the supply fluid and a treatment outlet port for supplying a treated fluid, the assembly comprising:
  a controller;
  a valve body including
    a supply port in fluid communication with the point of entry to direct the supply fluid from the point of entry to the valve body;
    an outlet port in fluid communication with the treatment inlet port to direct the supply fluid from the valve body to the fluid treatment device;
    an inlet port in fluid communication with the treatment outlet port to direct the treated fluid from the fluid treatment device to the valve body; and
    a service port in fluid communication with the point of use to direct at least one of the supply fluid and the treated fluid from the valve body to the point of use;
  a valve seated within the valve body and movable between an operating position and a fault position;
  a motor in communication with the controller and coupled to the valve to move the valve between the operating position and the fault position; and
  a sensor in communication with the controller and providing a fault signal to the controller indicating a fault condition of the control valve assembly;
  the controller operating the motor to drive the valve to the fault position in response to the fault signal; and
  the operating position includes a blend position at which both the supply fluid and the treated fluid are directed through the service port so that a blended fluid including the supply fluid and the treated fluid is directed from the valve body to the point of use.

* * * * *